US009732979B2

(12) United States Patent
Fadell et al.

(10) Patent No.: US 9,732,979 B2
(45) Date of Patent: Aug. 15, 2017

(54) HVAC CONTROL SYSTEM ENCOURAGING ENERGY EFFICIENT USER BEHAVIORS IN PLURAL INTERACTIVE CONTEXTS

(71) Applicant: Google Inc., Mountain View, CA (US)

(72) Inventors: Anthony Michael Fadell, Portola Valley, CA (US); Yoky Matsuoka, Palo Alto, CA (US); David Sloo, Menlo Park, CA (US); Michael Plitkins, Berkeley, CA (US); Michael James Matas, San Francisco, CA (US); Matthew Lee Rogers, Los Gatos, CA (US); Evan J. Fisher, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 15/258,422

(22) Filed: Sep. 7, 2016

(65) Prior Publication Data

US 2016/0377307 A1 Dec. 29, 2016

Related U.S. Application Data

(63) Continuation of application No. 14/496,782, filed on Sep. 25, 2014, now Pat. No. 9,476,606, which is a (Continued)

(51) Int. Cl.

| | |
|---|---|
| ***G05D 23/19*** | (2006.01) |
| ***F24F 11/00*** | (2006.01) |

(Continued)

(52) U.S. Cl.

CPC ........ *F24F 11/006* (2013.01); *F24F 11/0009* (2013.01); *F24F 11/02* (2013.01);

(Continued)

(58) Field of Classification Search

None

See application file for complete search history.

(56) References Cited

U.S. PATENT DOCUMENTS

| | | | |
|---|---|---|---|
| 4,316,577 | A | 2/1982 | Adams et al. |
| 4,621,336 | A | 11/1986 | Brown |

(Continued)

FOREIGN PATENT DOCUMENTS

| | | |
|---|---|---|
| CA | 2202008 | 2/2000 |
| DE | 19609390 A1 | 9/1997 |

(Continued)

OTHER PUBLICATIONS

Energy Joule. Datasheet [online]. Ambient Devices, No Date Given, [retrieved on Aug. 1, 2012]. Retrieved from the Internet: <URL: http://web.archive.org/web/20110723210421/http://www.ambientdevices.com/products/energyjoule.html>.

(Continued)

*Primary Examiner* — Tuan S Nguyen

(74) *Attorney, Agent, or Firm* — Kilpatrick Townsend & Stockton LLP

(57) ABSTRACT

Methods and devices for controlling a heating, ventilation, and air conditioning (HVAC) system by a thermostat are provided. Input can be received from a user via a thermostat, the input being indicative of an adjustment of an HVAC-related setting. On a real-time basis, the HVAC-related setting that is being adjusted can be compared against a feedback criterion designed to indicate a circumstance under which feedback is to be presented to the user. The circumstance can be indicative of an achievement of a HVAC-related setting of a predetermined responsibility level with respect to an energy usage of the HVAC system. Upon a real-time determination that the feedback criterion is satisfied, visual feedback can be caused to be presented to the user in real-time. The real-time feedback can include a (Continued)

visual icon having a visual appeal corresponding to a desirability of the satisfaction of the feedback criterion.

20 Claims, 23 Drawing Sheets

Related U.S. Application Data continuation of application No. 13/632,118, filed on Sep. 30, 2012, now Pat. No. 8,850,348, which is a continuation-in-part of application No. 13/434,560, filed on Mar. 29, 2012, now Pat. No. 9,453,655, which is a continuation-in-part of application No. 13/269,501, filed on Oct. 7, 2011, now Pat. No. 8,918,219.

(60) Provisional application No. 61/429,093, filed on Dec. 31, 2010.

(51) Int. Cl.
*G06F 3/0362* (2013.01)
*G06F 3/0484* (2013.01)
*G06F 3/048* (2013.01)
*F24F 11/02* (2006.01)
*G05B 19/409* (2006.01)
*G09G 5/37* (2006.01)
*G06F 3/0481* (2013.01)

(52) U.S. Cl.
CPC ....... *G05B 19/409* (2013.01); *G05D 23/1902* (2013.01); *G05D 23/1905* (2013.01); *G06F 3/0362* (2013.01); *G06F 3/048* (2013.01); *G06F 3/04847* (2013.01); *G09G 5/37* (2013.01); *F24F 2011/0057* (2013.01); *F24F 2011/0068* (2013.01); *F24F 2011/0075* (2013.01); *F24F 2011/0091* (2013.01); *G05B 2219/2614* (2013.01); *G06F 3/04817* (2013.01); *G09G 2320/0613* (2013.01)

(56) References Cited

U.S. PATENT DOCUMENTS 4,751,961 A 6/1988 Levine et al.
4,768,706 A 9/1988 Parfitt
4,847,781 A 7/1989 Brown, III et al.
5,005,365 A 4/1991 Lynch
D321,903 S 11/1991 Chepaitis
5,224,649 A 7/1993 Brown et al.
D341,848 S 11/1993 Bigelow et al.
5,294,047 A 3/1994 Schwer et al.
5,303,612 A 4/1994 Odom et al.
5,395,042 A 3/1995 Riley et al.
5,460,327 A 10/1995 Hill et al.
5,462,225 A 10/1995 Massara et al.
5,482,209 A 1/1996 Cochran et al.
5,485,954 A 1/1996 Guy et al.
5,544,036 A 8/1996 Brown, Jr. et al.
5,555,927 A 9/1996 Shah
5,603,451 A 2/1997 Helander et al.
5,627,531 A 5/1997 Posso et al.
5,673,850 A 10/1997 Uptegraph
5,761,083 A 6/1998 Brown, Jr. et al.
D396,488 S 7/1998 Kunkler
5,808,602 A 9/1998 Sellers
5,816,491 A 10/1998 Berkeley et al.
5,918,474 A 7/1999 Khanpara et al.
5,931,378 A 8/1999 Schramm
5,959,621 A 9/1999 Nawaz et al.
5,973,662 A 10/1999 Singers et al.
5,977,964 A 11/1999 Williams et al.
6,020,881 A 2/2000 Naughton et al.
6,032,867 A 3/2000 Dushane et al.
6,062,482 A 5/2000 Gauthier et al.
6,066,843 A 5/2000 Scheremeta
D428,399 S 7/2000 Kahn et al.
6,122,603 A 9/2000 Budike, Jr.
6,164,374 A 12/2000 Rhodes et al.
6,206,295 B1 3/2001 LaCoste
6,211,921 B1 4/2001 Cherian et al.
6,213,404 B1 4/2001 Dushane et al.
6,216,956 B1 4/2001 Ehlers et al.
6,286,764 B1 9/2001 Garvey et al.
6,298,285 B1 10/2001 Addink et al.
6,311,105 B1 10/2001 Budike, Jr.
D450,059 S 11/2001 Itou
6,349,883 B1 2/2002 Simmons et al.
6,351,693 B1 2/2002 Monie et al.
6,356,204 B1 3/2002 Guindi et al.
6,370,894 B1 4/2002 Thompson et al.
6,415,205 B1 7/2002 Myron et al.
6,453,687 B2 9/2002 Sharood et al.
D464,660 S 10/2002 Weng et al.
6,478,233 B1 11/2002 Shah
6,502,758 B2 1/2003 Cottrell
D471,825 S 3/2003 Peabody
6,574,581 B1 6/2003 Bohrer et al.
6,595,430 B1 7/2003 Shah
6,622,925 B2 9/2003 Carner et al.
D480,401 S 10/2003 Kahn et al.
6,636,197 B1 10/2003 Goldenberg et al.
6,641,054 B2 11/2003 Morey
6,641,055 B1 11/2003 Tiernan
6,643,567 B2 11/2003 Kolk et al.
6,644,557 B1 11/2003 Jacobs
6,645,066 B2 11/2003 Gutta et al.
D485,279 S 1/2004 DeCombe
6,726,112 B1 4/2004 Ho
D491,956 S 6/2004 Ombao et al.
6,769,482 B2 8/2004 Wagner et al.
6,785,630 B2 8/2004 Kolk et al.
D497,617 S 10/2004 Decombe et al.
6,814,299 B1 11/2004 Carey
6,824,069 B2 11/2004 Rosen
6,851,621 B1 2/2005 Wacker et al.
D503,631 S 4/2005 Peabody
6,891,838 B1 5/2005 Petite et al.
6,904,385 B1 6/2005 Budike, Jr.
6,951,306 B2 10/2005 DeLuca
D511,527 S 11/2005 Hernandez et al.
6,975,958 B2 12/2005 Bohrer et al.
6,990,821 B2 1/2006 Singh et al.
7,000,849 B2 2/2006 Ashworth et al.
7,024,336 B2 4/2006 Salsbury et al.
7,028,912 B1 4/2006 Rosen
7,038,667 B1 5/2006 Vassallo et al.
7,055,759 B2 6/2006 Wacker et al.
7,083,109 B2 8/2006 Pouchak
7,108,194 B1 9/2006 Hankins, II
7,111,788 B2 9/2006 Reponen
7,114,554 B2 10/2006 Bergman et al.
7,140,551 B2 11/2006 de Pauw et al.
7,141,748 B2 11/2006 Tanaka et al.
7,142,948 B2 11/2006 Metz
7,149,727 B1 12/2006 Nicholls et al.
7,149,729 B2 12/2006 Kaasten et al.
7,152,806 B1 12/2006 Rosen
7,156,318 B1 1/2007 Rosen
7,159,789 B2 1/2007 Schwendinger et al.
7,159,790 B2 1/2007 Schwendinger et al.
7,181,317 B2 2/2007 Amundson et al.
7,188,482 B2 3/2007 Sadegh et al.
7,222,494 B2 5/2007 Peterson et al.
7,222,800 B2 5/2007 Wruck
7,225,054 B2 5/2007 Amundson et al.
D544,877 S 6/2007 Sasser
7,258,280 B2 8/2007 Wolfson
D550,691 S 9/2007 Hally et al.
7,264,175 B2 9/2007 Schwendinger et al.
7,274,972 B2 9/2007 Amundson et al.
7,287,709 B2 10/2007 Proffitt et al.

(56) References Cited

U.S. PATENT DOCUMENTS 7,299,996 B2 11/2007 Garrett et al.
7,302,642 B2 11/2007 Smith et al.
7,333,880 B2 2/2008 Brewster et al.
7,346,467 B2 3/2008 Bohrer et al.
D566,587 S 4/2008 Rosen
7,379,791 B2 5/2008 Tamarkin et al.
RE40,437 E 7/2008 Rosen
7,418,663 B2 8/2008 Pettinati et al.
7,427,926 B2 9/2008 Sinclair et al.
7,434,742 B2 10/2008 Mueller et al.
7,451,937 B2 11/2008 Flood et al.
7,455,240 B2 11/2008 Chapman, Jr. et al.
D588,152 S 3/2009 Okada
7,509,753 B2 3/2009 Nicosia et al.
D589,792 S 4/2009 Clabough et al.
D590,412 S 4/2009 Saft et al.
7,516,106 B2 * 4/2009 Ehlers ................. F24F 11/0012 705/412
D593,120 S 5/2009 Bouchard et al.
D594,015 S 6/2009 Singh et al.
D595,309 S 6/2009 Sasaki et al.
7,555,364 B2 6/2009 Poth et al.
D596,194 S 7/2009 Vu et al.
D597,101 S 7/2009 Chaudhri et al.
7,558,648 B2 7/2009 Hoglund et al.
D598,463 S 8/2009 Hirsch et al.
7,571,014 B1 8/2009 Lambourne et al.
7,575,179 B2 8/2009 Morrow et al.
D599,810 S 9/2009 Scalisi et al.
7,584,899 B2 9/2009 de Pauw et al.
7,600,694 B2 10/2009 Helt et al.
D603,277 S 11/2009 Clausen et al.
D603,421 S 11/2009 Ebeling et al.
D604,740 S 11/2009 Matheny et al.
7,614,567 B2 11/2009 Chapman, Jr. et al.
7,620,996 B2 11/2009 Torres et al.
D607,001 S 12/2009 Ording
7,624,931 B2 12/2009 Chapman, Jr. et al.
7,634,504 B2 12/2009 Amundson
7,641,126 B2 1/2010 Schultz et al.
7,644,869 B2 1/2010 Hoglund et al.
7,667,163 B2 2/2010 Ashworth et al.
D613,301 S 4/2010 Lee et al.
D614,194 S 4/2010 Guntaur et al.
D614,196 S 4/2010 Guntaur et al.
7,693,582 B2 4/2010 Bergman et al.
7,703,694 B2 4/2010 Mueller et al.
D614,976 S 5/2010 Skafdrup et al.
D615,546 S 5/2010 Lundy et al.
D616,460 S 5/2010 Pearson et al.
7,721,209 B2 5/2010 Tilton
7,726,581 B2 6/2010 Naujok et al.
D619,613 S 7/2010 Dunn
7,784,704 B2 8/2010 Harter
7,802,618 B2 9/2010 Simon et al.
D625,325 S 10/2010 Vu et al.
D625,734 S 10/2010 Kurozumi et al.
D626,133 S 10/2010 Murphy et al.
7,823,076 B2 10/2010 Borovsky et al.
RE41,922 E 11/2010 Gough et al.
7,845,576 B2 12/2010 Siddaramanna et al.
7,848,900 B2 12/2010 Steinberg et al.
7,849,698 B2 12/2010 Harrod et al.
7,854,389 B2 12/2010 Ahmed
D630,649 S 1/2011 Tokunaga et al.
7,890,195 B2 2/2011 Bergman et al.
7,900,849 B2 3/2011 Barton et al.
7,904,209 B2 3/2011 Podgorny et al.
7,904,830 B2 3/2011 Hoglund et al.
7,908,116 B2 3/2011 Steinberg et al.
7,908,117 B2 3/2011 Steinberg et al.
D638,835 S 5/2011 Akana et al.
D640,269 S 6/2011 Chen
D640,273 S 6/2011 Arnold et al.
D640,278 S 6/2011 Woo
D640,285 S 6/2011 Woo
D641,373 S 7/2011 Gardner et al.
7,984,384 B2 7/2011 Chaudhri et al.
D643,045 S 8/2011 Woo
8,010,237 B2 8/2011 Cheung et al.
8,019,567 B2 9/2011 Steinberg et al.
D648,735 S 11/2011 Arnold et al.
D651,529 S 1/2012 Mongell et al.
8,090,477 B1 1/2012 Steinberg
8,091,375 B2 1/2012 Crawford
8,131,497 B2 3/2012 Steinberg et al.
8,131,506 B2 3/2012 Steinberg et al.
8,136,052 B2 3/2012 Shin et al.
D656,950 S 4/2012 Shallcross et al.
D656,952 S 4/2012 Weir et al.
8,155,900 B1 4/2012 Adams
8,156,060 B2 4/2012 Borzestowski et al.
8,166,395 B2 4/2012 Omi et al.
D658,674 S 5/2012 Shallcross et al.
8,174,381 B2 5/2012 Imes et al.
8,180,492 B2 5/2012 Steinberg
8,185,164 B2 5/2012 Kim
8,195,313 B1 6/2012 Fadell et al.
D663,743 S 7/2012 Tanghe et al.
D663,744 S 7/2012 Tanghe et al.
D664,559 S 7/2012 Ismail et al.
8,219,249 B2 7/2012 Harrod et al.
8,223,134 B1 7/2012 Forstall et al.
8,234,581 B2 7/2012 Kake
D664,978 S 8/2012 Tanghe et al.
D665,397 S 8/2012 Naranjo et al.
8,243,017 B2 8/2012 Brodersen et al.
8,253,704 B2 8/2012 Jang
8,253,747 B2 8/2012 Niles et al.
8,280,536 B1 10/2012 Fadell et al.
8,281,244 B2 10/2012 Neuman et al.
D671,136 S 11/2012 Barnett et al.
8,316,022 B2 11/2012 Matsuda et al.
D673,171 S 12/2012 Peters et al.
D673,172 S 12/2012 Peters et al.
8,341,557 B2 12/2012 Pisula et al.
8,442,695 B2 5/2013 Imes et al.
8,510,255 B2 8/2013 Fadell et al.
8,571,518 B2 10/2013 Imes et al.
8,727,611 B2 5/2014 Huppi et al.
8,850,348 B2 9/2014 Fadell et al.
8,893,032 B2 11/2014 Bruck et al.
8,918,219 B2 12/2014 Sloo et al.
9,453,655 B2 9/2016 Bruck et al.
9,476,606 B2 10/2016 Fadell et al.
2002/0005435 A1 1/2002 Cottrell
2002/0022991 A1 2/2002 Sharood et al.
2002/0178047 A1 11/2002 Or
2003/0034898 A1 2/2003 Shamoon et al.
2003/0042320 A1 3/2003 Decker
2003/0093186 A1 5/2003 Patterson et al.
2003/0112262 A1 6/2003 Adatia et al.
2004/0034484 A1 2/2004 Solomita, Jr. et al.
2004/0055446 A1 3/2004 Robbin et al.
2004/0164238 A1 8/2004 Xu et al.
2004/0225955 A1 11/2004 Ly
2004/0249479 A1 12/2004 Shorrock
2004/0256472 A1 12/2004 DeLuca
2004/0260427 A1 12/2004 Wimsatt
2004/0262410 A1 12/2004 Hull
2005/0071780 A1 3/2005 Muller et al.
2005/0119766 A1 6/2005 Amundson et al.
2005/0119793 A1 6/2005 Amundson et al.
2005/0128067 A1 6/2005 Zakrewski
2005/0150968 A1 7/2005 Shearer
2005/0189429 A1 9/2005 Breeden
2005/0192915 A1 9/2005 Ahmed et al.
2005/0194456 A1 9/2005 Tessier et al.
2005/0195757 A1 9/2005 Kidder et al.
2005/0204997 A1 9/2005 Fournier
2005/0280421 A1 12/2005 Yomoda et al.
2006/0186214 A1 8/2006 Simon et al.
2006/0196953 A1 9/2006 Simon et al.
2007/0001830 A1 1/2007 Dagci et al.

(56) References Cited

U.S. PATENT DOCUMENTS

2007/0045430 A1 3/2007 Chapman et al.
2007/0045431 A1 3/2007 Chapman, Jr. et al.
2007/0045433 A1 3/2007 Chapman et al.
2007/0045444 A1 3/2007 Gray et al.
2007/0050732 A1 3/2007 Chapman et al.
2007/0057079 A1 3/2007 Stark et al.
2007/0158442 A1 7/2007 Chapman et al.
2007/0158444 A1 7/2007 Naujok et al.
2007/0173978 A1 7/2007 Fein et al.
2007/0205297 A1 9/2007 Finkam et al.
2007/0225867 A1 9/2007 Moorer et al.
2007/0227721 A1 10/2007 Springer et al.
2007/0228183 A1 10/2007 Kennedy et al.
2007/0241203 A1 10/2007 Wagner et al.
2007/0257120 A1 11/2007 Chapman et al.
2007/0278320 A1 12/2007 Lunacek et al.
2008/0006709 A1 1/2008 Ashworth et al.
2008/0015740 A1 1/2008 Osann
2008/0048046 A1 2/2008 Wagner et al.
2008/0054082 A1 3/2008 Evans et al.
2008/0054084 A1 3/2008 Olson
2008/0099568 A1 5/2008 Nicodem et al.
2008/0183335 A1 7/2008 Poth et al.
2008/0221737 A1 9/2008 Josephson et al.
2008/0245480 A1 10/2008 Knight et al.
2008/0273754 A1 11/2008 Hick et al.
2008/0290183 A1 11/2008 Laberge et al.
2008/0317292 A1 12/2008 Baker et al.
2009/0001180 A1 1/2009 Siddaramanna et al.
2009/0099699 A1 4/2009 Steinberg et al.
2009/0125151 A1 5/2009 Steinberg et al.
2009/0140056 A1 6/2009 Leen
2009/0140057 A1 6/2009 Leen
2009/0140060 A1 6/2009 Stoner et al.
2009/0140064 A1 6/2009 Schultz et al.
2009/0143916 A1 6/2009 Boll et al.
2009/0171862 A1 7/2009 Harrod et al.
2009/0195349 A1 8/2009 Frader-Thompson et al.
2009/0254225 A1 10/2009 Boucher et al.
2009/0259713 A1 10/2009 Blumrich et al.
2009/0263773 A1 10/2009 Kotlyar et al.
2009/0273610 A1 11/2009 Busch et al.
2009/0283603 A1 11/2009 Peterson et al.
2009/0297901 A1 12/2009 Kilian et al.
2009/0327354 A1 12/2009 Resnick et al.
2010/0019051 A1 1/2010 Rosen
2010/0025483 A1 2/2010 Hoeynck et al.
2010/0050004 A1 2/2010 Hamilton, II et al.
2010/0070084 A1 3/2010 Steinberg et al.
2010/0070085 A1 3/2010 Harrod et al.
2010/0070086 A1 3/2010 Harrod et al.
2010/0070089 A1 3/2010 Harrod et al.
2010/0070093 A1 3/2010 Harrod et al.
2010/0070234 A1 3/2010 Steinberg et al.
2010/0070907 A1 3/2010 Harrod et al.
2010/0084482 A1 4/2010 Kennedy et al.
2010/0104074 A1 4/2010 Yang
2010/0106305 A1 4/2010 Pavlak et al.
2010/0106322 A1 4/2010 Grohman
2010/0107070 A1 4/2010 Devineni et al.
2010/0107076 A1 4/2010 Grohman et al.
2010/0167783 A1 7/2010 Alameh et al.
2010/0168924 A1 7/2010 Tessier et al.
2010/0179704 A1 7/2010 Ozog
2010/0198425 A1 8/2010 Donovan
2010/0262298 A1 10/2010 Johnson et al.
2010/0262299 A1 10/2010 Cheung et al.
2010/0276482 A1* 11/2010 Raihi .................... G07F 15/003 235/375
2010/0280667 A1 11/2010 Steinberg
2010/0282857 A1 11/2010 Steinberg
2010/0289643 A1 11/2010 Trundle et al.
2010/0308119 A1 12/2010 Steinberg et al.
2010/0318227 A1 12/2010 Steinberg et al.
2011/0015797 A1 1/2011 Gilstrap
2011/0015798 A1 1/2011 Golden et al.
2011/0015802 A1 1/2011 Imes
2011/0022242 A1 1/2011 Bukhin et al.
2011/0046756 A1 2/2011 Park
2011/0046792 A1 2/2011 Imes et al.
2011/0046805 A1 2/2011 Bedros et al.
2011/0046806 A1 2/2011 Nagel et al.
2011/0054710 A1 3/2011 Imes et al.
2011/0077758 A1 3/2011 Tran et al.
2011/0077896 A1 3/2011 Steinberg et al.
2011/0095897 A1 4/2011 Sutrave
2011/0106328 A1 5/2011 Zhou et al.
2011/0166828 A1 7/2011 Steinberg et al.
2011/0167369 A1 7/2011 Van Os
2011/0184563 A1 7/2011 Foslien et al.
2011/0185895 A1 8/2011 Freen
2011/0257795 A1 10/2011 Narayanamurthy et al.
2011/0290893 A1 12/2011 Steinberg
2011/0307103 A1 12/2011 Cheung et al.
2011/0307112 A1 12/2011 Barrilleaux
2012/0017611 A1 1/2012 Coffel et al.
2012/0036250 A1* 2/2012 Vaswani ................ G01D 4/004 709/224
2012/0046792 A1 2/2012 Secor
2012/0053745 A1 3/2012 Ng
2012/0065935 A1 3/2012 Steinberg et al.
2012/0068854 A1* 3/2012 Shiflet .................... G06Q 50/06 340/870.02
2012/0085831 A1 4/2012 Kopp
2012/0086562 A1 4/2012 Steinberg
2012/0089523 A1 4/2012 Hurri et al.
2012/0101637 A1 4/2012 Imes et al.
2012/0130513 A1* 5/2012 Hao ....................... G05B 15/02 700/90
2012/0131504 A1 5/2012 Fadell et al.
2012/0143536 A1* 6/2012 Greaves ................. G06Q 50/06 702/60
2012/0158350 A1 6/2012 Steinberg et al.
2012/0166616 A1 6/2012 Meehan
2012/0221151 A1 8/2012 Steinberg
2012/0252430 A1 10/2012 Imes et al.
2012/0274602 A1 11/2012 Bita
2013/0055132 A1 2/2013 Foslien
2013/0090767 A1 4/2013 Bruck et al.
2013/0116953 A1 5/2013 Pollard
2013/0185491 A1 7/2013 Lin et al.
2013/0263034 A1 10/2013 Bruck et al.

FOREIGN PATENT DOCUMENTS

EP 434926 A2 7/1991
EP 1906069 12/1991
EP 720077 A2 7/1996
EP 802471 B1 8/1999
EP 1065079 A2 1/2001
EP 1703356 9/2006
EP 1731984 A1 12/2006
EP 2157492 A2 2/2010
GB 2212317 B 5/1992
JP 59106311 A 6/1984
JP 1252850 10/1989
JP 10023565 A 1/1998
JP 2002087050 A 3/2002
JP 2003054290 A 2/2003
NL 1024986 C2 6/2005
WO 0248851 A2 6/2002
WO 2009073496 A2 6/2009
WO 2010033563 A1 3/2010
WO 2011128416 A2 10/2011
WO 2011149600 A2 12/2011
WO 2012024534 A2 2/2012
WO 2013058820 4/2013

OTHER PUBLICATIONS

Akhlaghinia, et al., Occupancy Monitoring in Intelligent Environment through Integrated Wireless Localizing Agents, IEEE, 2009, 7 pages.

(56) References Cited

OTHER PUBLICATIONS

Allen, et al., Real-Time Earthquake Detection and Hazard Assessment by ElarmS Across California, Geophysical Research Letters, vol. 36, L00B08, 2009, pp. 1-6.
Aprilaire Electronic Thermostats Model 8355 User's Manual, Research Products Corporation, Dec. 2000, 16 pages.
Arens et al., Demand Response Electrical Appliance Manager—User Interface Design, Development and Testing, Poster, Demand Response Enabling Technology Development, University of California Berkeley, Retrieved from dr.berkeley.edu/dream/posters/2005_6GUIposter.pdf, 2005, 1 page.
Arens et al., Demand Response Enabled Thermostat—Control Strategies and Interface, Demand Response Enabling Technology Development Poster, University of California Berkeley, Retrieved from dr.berkeley.edu/dream/posters/2004_11CEC_TstatPoster.pdf, 2004, 1 page.
Arens et al., Demand Response Enabling Technology Development, Phase I Report: Jun. 2003-Nov. 2005, Jul. 27, P:/DemandRes/UC Papers/DR-Phase1Report-Final DraftApril24-26.doc, University of California Berkeley, pp. 1-108.
Arens et al., New Thermostat Demand Response Enabling Technology, Poster, University of California Berkeley, Jun. 10, 2004.
Auslander et al., UC Berkeley DR Research Energy Management Group, Power Point Presentation, DR ETD Workshop, State of California Energy Commission, Jun. 11, 2007, pp. 1-35.
Bourke, Server Load Balancing, O'Reilly & Associates, Inc., Aug. 2001, 182 pages.
Braeburn 5300 Installer Guide, Braeburn Systems, LLC, Dec. 9, 2009, 10 pages.
Braeburn Model 5200 Braeburn Systems, LLC, Jul. 20, 2011, 11 pages.
Chatzigiannakis, et al., Priority Based Adaptive coordination of Wireless Sensors and Actors, Q2SWinet '06, Oct. 2006, pp. 37-44.
Chen et al., Demand Response-Enabled Residential Thermostat Controls, Abstract, ACEEE Summer Study on Energy Efficiency in Buildings, Mechanical Engineering Dept. and Architecture Dept., University of California Berkeley, 2008, pp. 1-24 through 1-36.
De Almeida et al., Advanced Monitoring Technologies for the Evaluation of Demand-Side Management Programs, Energy, vol. 19, No. 6, 1994, pp. 661-678.
Deleeuw, Ecobee WiFi Enabled Smart Thermostat Part 2: The Features Review, retrieved from <URL:http://www.homenetworkenabled.com/content.php?136-ecobee-VViFi-enabled-Smart-Thermostat-Part-2- The-Features-review> [retrieved on Jan. 8, 2013], Dec. 2, 2011, 5 pages.
Ecobee Smart Si Thermostat Installation Manual, Ecobee, Apr. 3, 2012, 40 pages.
Ecobee Smart Si Thermostat User Manual, Ecobee, Apr. 3, 2012, 44 pages.
Ecobee Smart thermostat Installation Manual, Jun. 29, 2011, 20 pages.
Ecobee Smart Thermostat User Manual, May 11, 2010, 20 pages.
Electric Heat Lock Out on Heat Pumps, Washington State University Extension Energy Program, Apr. 2010, pp. 1-3.
First Office Action dated Sep. 25, 2015, for Chinese Patent Application No. 201380029046.X, filed Mar. 29, 2013, 8 pages (with English Translation.).
Gao, et al., The Self-Programming Thermostat: Optimizing Setback Schedules Based on Home Occupancy Patterns, In Proceedings of the First ACM Workshop on Embedded Sensing Systems for Energy-Efficiency in Buildings, Nov. 3, 2009, 6 pages.
Gevorkian, Alternative Energy Systems in Building Design, 2009, pp. 195-200.
Green, Thermo Heat Tech Cool, Popular Mechanics Electronic Thermostat Guide, Oct. 1985, pp. 155-158.
Hoffman et al., Integration of Remote Meter Reading, Load Control and Monitoring of Customers' Installations for Customer Automation with Telephone Line Signaling, Electricity Distribution, 1989. CIRED 1989. 10th International Conference on, May 8-12, 1989, pp. 421-424.
Honeywell CT2700, An Electronic Round Programmable Thermostat—User's Guide, Honeywell, Inc., 1997, 8 pages.
Honeywell CT8775A,C, The digital Round Non-Programmable Thermostats—Owner's Guide, Honeywell International Inc., 2003, 20 pages.
Honeywell Installation Guide FocusPRO TH6000 Series, Honeywell International, Inc., Jan. 5, 2012, 24 pages.
Honeywell Operating Manual FocusPRO TH6000 Series, Honeywell International, Inc., Mar. 25, 2011, 80 pages.
Honeywell Prestige THX9321-9421 Operating Manual, Honeywell International, Inc., Jul. 6, 2011, 120 pages.
Honeywell T8700C, An Electronic Round Programmable Thermostat—Owner's Guide, Honeywell, Inc., 1997, 12 pages.
Honeywell T8775 The Digital Round Thermostat, Honeywell, 2003, 2 pages.
Honeywell T8775A,C Digital Round Thermostat Manual No. 69-1679EF-1, www.honeywell.com/yourhome, Jun. 2004, pp. 1-16.
Honeywell THX9321 Prestige 2.0 and TXH9421 Prestige IAQ 2.0 with EIM Product Data, Honeywell International, Inc., 68-0311, Jan. 2012, 126 pages.
Hunter Internet Thermostat Installation Guide, Hunter Fan Co., Aug. 14, 2012, 8 pages.
ICY3815TT-001 Timer-Thermostat Package Box, Product Bar Code No. 8717953007902, No Date Given, 2 pages.
International Preliminary Report on Patentability issued Apr. 22, 2014, for International Patent Application No. PCT/US2012/030084, filed Mar. 22, 2012, all pages.
International Search Report and Written Opinion mailed Jul. 6, 2012, for International Patent Application No. PCT/US2012/030084 filed Mar. 22, 2012, all pages.
Introducing the New Smart Si Thermostat, Datasheet [online]. Ecobee, No Date Given [retrieved on Feb. 25, 2013]. Retrieved from the Internet: <URL: https://www.ecobee.com/solutions/home/smart-si/>.
Lennox ComfortSense 5000 Owners guide, Lennox Industries, Inc., Feb. 2008, 32 pages.
Lennox ComfortSense 7000 Owners Guide, Lennox Industries, Inc., May 2009, 15 pages.
Lennox iComfort Manual, Lennox Industries, Inc., Dec. 2010, 20 pages.
Levy, A Vision of Demand Response—2016, The Electricity Journal, vol. 19, Issue 8, Oct. 2006, pp. 12-23.
Loisos, et al., Buildings End-Use Energy Efficiency: Alternatives to Compressor Cooling, California Energy Commission, Public Interest Energy Research, Jan. 2000, 80 pages.
Lopes, Case Studies in Advanced Thermostat Control for Demand Response, AEIC Load Research Conference, St. Louis, MO, Jul. 2004, 36 pages.
Lu, et al., The Smart Thermostat: Using Occupancy Sensors to Save Energy in Homes, in Proceedings of the 8th ACM Conference on Embedded Networked Sensor Systems, Nov. 3-5, 2010, pp. 211-224.
Lux PSPU732T Manual, LUX Products Corporation, Jan. 6, 2009, 48 pages.
Martinez, SCE Energy$mart Thermostat Program, Advanced Load Control Alliance, Oct. 5, 2004, 20 pages.
Matty, Advanced Energy Management for Home Use, IEEE Transaction on Consumer Electronics, vol. 35, No. 3, Aug. 1989, pp. 584-588.
Meier et al., Thermostat Interface Usability: A Survey, Ernest Orlando Lawrence Berkeley National Laboratory, Environmental Energy Technologies Division, Berkeley California, Sep. 2010, pp. 1-73.
Motegi et al., Introduction to Commercial Building Control Strategies and Techniques for Demand Response, Demand Response Research Center, May 22, 2007, 35 pages.
Mozer, The Neural Network House: An Environmental that Adapts to its Inhabitants, Proceedings of the American Association for Artificial Intelligence SS-98-02-, 1998, pp. 110-114.
NetX RP32-Wifi Network Thermostat consumer Brochure, Network Thermostat, May 2011, 2 pages.
NetX RP32-Wifi Network Thermostat Specification Sheet, Network Thermostat, Feb. 28, 2012, 2 pages.

(56) References Cited

OTHER PUBLICATIONS

Peffer et al., A Tale of Two Houses: The Human Dimension of Demand Response Enabling Technology from a Case Study of Adaptive Wireless Thermostat, Abstract, ACEEE Summer Study on Energy Efficiency in Buildings, Architecture Dept. and Mechanical Engineering Dept., University of California Berkeley., 2008, pp. 7-242 through 7-253.
Peffer et al., Smart Comfort At Home: Design of a Residential Thermostat to Achieve Thermal Comfort, and Save Money and Peak Energy, University of California Berkeley, Mar. 2007, 1 page.
RobertShaw Product Manual 9620, Maple Chase Company, Jun. 12, 2001, 14 pages.
RobertShaw Product Manual 9825i2, Maple Chase Company, Jul. 17, 2006, 36 pages.
Ros, et al., Multi-Sensor Human Tracking with the Bayesian Occupancy Filter, IEEE, 2009, 8 pages.
Salus, S-Series Digital Thermostat Instruction Manual-ST620 Model No. Instruction Manual, www.salus-tech.com, Version 005, Apr. 29, 2010, 24 pages.
Sanford, iPod (Click Wheel) (2004), www.apple-history.com [retrieved on Apr. 9, 2012]. Retrieved from: http://apple-history.com/ipod, 2 pages.
SCE Energy$mart Thermostat Study for Southern California Edison—Presentation of Study Results, Population Research Systems, Project #1010, Nov. 10, 2004 51 pages.
SYSTXCCUIZ01-V Infinity Control Installation Instructions, Carrier Corp., May 31, 2012, 20 pages.
T8611G Chronotherm IV Deluxe Programmable Heat Pump Thermostat Product Data, Honeywell International, Inc., Oct. 1997, 24 pages.
TB-PAC, PB-PHP, Base Series Programmable Thermostats, Carrier Corp., May 14, 2012, 8 pages.
The Clever Thermostat User Manual and Installation Guide, ICY BV ICY3815 Timer-Thermostat, 2009, pp. 1-36.
The Clever Thermostat, ICY BV Web Page, http://www.icy.nl/en/consumer/products/clever-thermostat, 2012 ICY BV, 1 page.
The Perfect Climate Comfort Center PC8900A W8900A-C Product Data Sheet, Honeywell International Inc., Apr. 2001, 44 pages.
TP-PAC, TP-PHP, TP-NAC, TP-NHP Performance Series AC/HP Thermostat Installation Instructions, Carrier corp., Sep. 2007, 56 pages.
Trane Communicating Thermostats for Fan Coil, Trane, May 2011, 32 pages.
Trane Communicating thermostats for Heat Pump Control, Trane, May 2011, 32 pages.
Trane Install XL600 Installation Manual, Trane, Mar. 2006, 16 pages.
Trane XL950 Installation Guide, Trane, Mar. 2011, 20 pages.
U.S. Appl. No. 60/512,886, Volkswagen Rotary Knob for Motor Vehicle—English Translation of German Application filed Oct. 20, 2003.
Venstar T2900 Manual, Venstar, Inc., Apr. 2008, 113 pages.
Venstar T5800 Manual, Venstar, Inc., Sep. 7, 2011, 63 pages.
VisionPRO TH8000 Series Installation Guide, Honeywell International, Inc., Jan. 2012, 12 pages.
VisionPRO TH8000 Series Operating Manual, Honeywell International, Inc., Mar. 2011, 96 pages.
VisionPRO Wi-Fi Programmable Thermostat User Guide, Honeywell International, Inc., Aug. 2012, 48 pages.
White Rodgers (Emerson) Model 1F81-261 Installation and Operating Instructions, White Rodgers Apr. 15, 2010, 8 pages.
White Rodgers (Emerson) Model IF98EZ-1621 Homeowner's User Guide, White Rodgers, Jan. 25, 2012, 28 pages.
Wong, et al,. Maximum Likelihood Estimation of ARMA Model with Error Processes for Replicated Observations, National University of Singapore, Department of Economics, Working Paper No. 0217, Feb. 2002, pp. 1-19.
Wright et al., DR ETD—Summary of New Thermostat, TempNode, & New Meter (UC Berkeley Project), Power Point Presentation, Public Interest Energy Research, University of California Berkeley. Retrieved from: http://dr.berkeley.edu/dream/presentations/2005_6CEC.pdf, 2005, pp. 1-49.
Hai Lin, et al., Internet Based Monitoring and controls for HVAC applications, Jan. 2002, IEEE, p. 49-54.
Second Office Action dated Jan. 21, 2016, for Chinese Patent Application No. 201380029046.X, filed Mar. 29, 2013, all pages (with English Translation.)
EP Patent Application No. 13769316.4 filed Jan. 14, 2016, Extended European Search Report mailed Jan. 25, 2016, all pages.
International Preliminary Report on Patentability mailed Oct. 9, 2014, for International Patent Application No. PCT/US2013/034718, filed Mar. 29, 2013, all pages.
International Search Report and Written Opinion mailed Sep. 6, 2013, for International Patent Application No. PCT/US2013/034718 filed Mar. 29, 2013, all pages.

* cited by examiner

MISC. LEGACY APPLIANCE
NEST/CLOUD
INTERNET
POOL HEATER
IRRIGATION
HVAC
WF
IR
120V

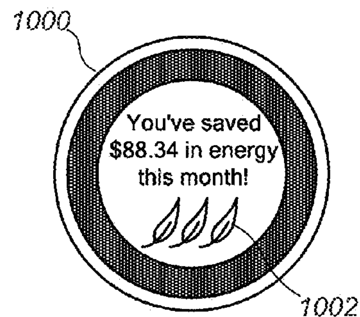
FIG. 10A
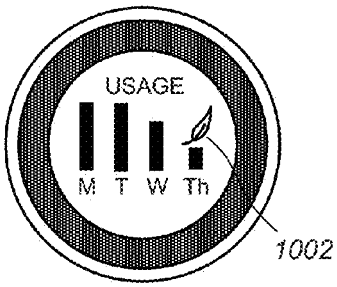
FIG. 10B
You are in
89th percentile
in cooling
efficiency!
1002
FIG. 10C
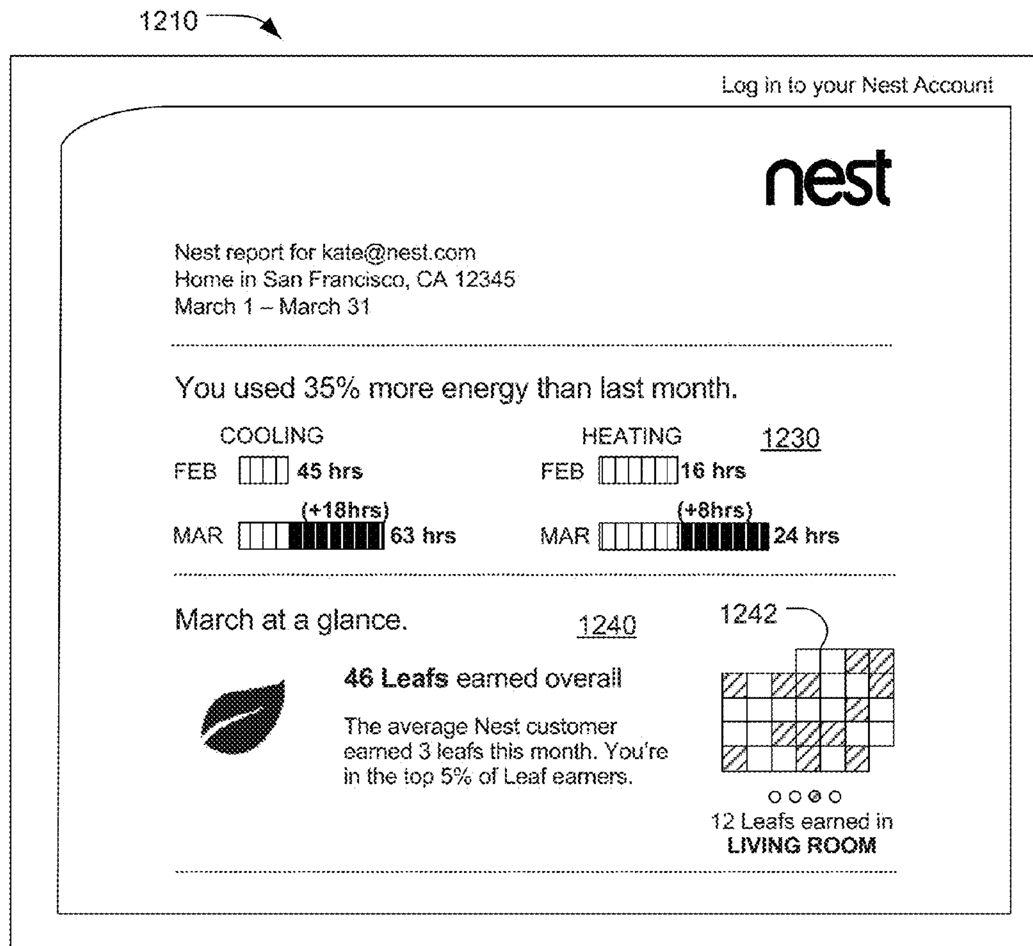
FIG. 12

HVAC CONTROL SYSTEM ENCOURAGING ENERGY EFFICIENT USER BEHAVIORS IN PLURAL INTERACTIVE CONTEXTS

CROSS-REFERENCE TO RELATED APPLICATIONS

This patent application is a continuation of U.S. Ser. No. 14/496,782 filed on Sep. 25, 2014, which is a continuation of U.S. Ser. No. 13/632,118 filed on Sep. 30, 2012, which is a continuation-in-part of U.S. Ser. No. 13/434,560 filed Mar. 29, 2012, which is a continuation-in-part of U.S. Ser. No. 13/269,501 filed Oct. 7, 2011, which claims the benefit of U.S. Prov. Ser. No. 61/429,093 filed Dec. 31, 2010. The subject matter of this patent application is also related to the subject matter of U.S. Prov. Ser. No. 61/627,996 filed Oct. 21, 2011. Each of the above-identified applications is hereby incorporated by reference in its entirety for all purposes.

FIELD

This patent specification relates to systems, methods, and related computer program products for presenting feedback to users to indicate whether the users' usage behaviors are responsible (e.g., with regard to environmental, fiscal or health concerns). More particularly, this patent specification relates to a dynamic presenting feedback (e.g., via one or more visual icons) on a device itself or an interface tied to the device (e.g., a web-based or smart-device interface that can control the device) that identifies desirable changes to device settings.

BACKGROUND

Users can use a variety of devices to control home operations. For example, thermostats can be used to control home temperatures, refrigerators can be used to control refrigerating temperatures, and light switches can be used to control light power states and intensities. Extreme operation of the devices can frequently lead to immediate user satisfaction. For example, users can enjoy bright lights, warm temperatures in the winter, and very cold refrigerator temperatures. Unfortunately, the extreme operation can result in deleterious costs. Excess energy can be used, which can contribute to harmful environmental consequences. Further, device parts' (e.g., light bulbs' or fluids') life cycles can be shortened, which can result in excess waste.

Typically, these costs are ultimately shouldered by users. Users may experience high electricity bills or may need to purchase parts frequently. Unfortunately, these user-shouldered costs are often time-separated from the behaviors that led to them. Further, the costs are often not tied to particular behaviors, but rather to a group of behaviors over a time span. Thus, users may not fully appreciate which particular behaviors most contributed to the costs. Further, unless users have experimented with different behavior patterns, they may be unaware of the extent to which their behavior can influence the experienced costs. Therefore, users can continue to obliviously operate devices irresponsibly, thereby imposing higher costs on themselves and on society.

SUMMARY

Provided according to one or more embodiments are systems, methods, computer program products, and related business methods for providing feedback (e.g., via one or more visual icons) to users indicating whether or a degree to which they are responsibly operating a device. The feedback can be instantaneous and/or delayed. In the instantaneous scenario, the feedback can be presented immediately responsive to a setting change made by a user or learned based on a user's behavior over a time period. For example, if a user lowers a thermostat setpoint temperature in the winter by a sufficient amount and/or to a sufficiently low temperature, a positive indicator can be instantly presented on the thermostat. As another example, if the thermostat learns that the user can accept a lower temperature at night in the winter than a previous setpoint temperature, an icon can be immediately presented during one or more subsequent nights. In the delayed scenario, the feedback can summarize whether or a degree to which a user's device settings behavior was responsible or desirable over a time period (e.g., over the course of a day).

The feedback can be presented based on relative or absolute criteria. Relative criteria can indicate that, e.g., positive feedback should be presented when a user's behavior has improved relative to the user's past behavior. This can encourage a given user to consistently improve how responsibly the device is being used. Absolute criteria can indicate that positive feedback should always be awarded, e.g., if particular settings are received or learned. Absolute criteria can be useful in that a degree to which a user can responsibly operate a device can practically or physically saturate.

Criteria can further be set and/or adjusted to encourage responsible use changes. Specifically, it can be advantageous to ensure that feedback is presented each user or a given fraction of the users at least a threshold percentage of the time. Users can therefore become aware of the feedback, understand that it is attainable and become motivated to attempt to achieve positive feedback. It can also be advantageous to limit the presentation of feedback to a given user or set of users. Otherwise, users can desensitize to the feedback.

The feedback can be presented on a device itself or via interfaces tied to the device. For example, a web-based or smart-device-based interface can be tied to the device. The interface and/or the device can allow a user to set settings on the device, view past usage patterns, and/or view usage schedules (e.g., as programmed by the user or as learned). In some embodiments, the feedback is consistently presented across the device and one or more interfaces. Thus, for example, regardless as to whether a user responsibly changes a setting on a device itself or via an interface, the feedback can be instantly presented to the user. As another example, if a user responsibly changes a setting on a device, thereby responsibly affecting a future usage schedule, the interface can be configured to immediately present the feedback with respect to the influenced schedule. In instances in which feedback is presented based on relative criteria, this consistent operation can require that the device and a central server reliably communicate explicit or learned setting changes such that any subsequent changes can instantly result in the appropriate feedback presentation.

In some embodiments, presented feedback is positive feedback. Thus, a user can be presented with a pleasant image, such as a green leaf, when acting responsibly. It will be appreciated that negative feedback (e.g., a smokestack icon) can alternatively or additionally be presented. Further, feedback can be graded or non-binary. For example, as a user's behavior approaches a desirable level, an icon can become darker or larger or more icons can appear. It has been found particularly advantageous to provide, in conjunction with a user input mechanism that is continuously adjustable (e.g., by virtue of a rotatable ring or knob that is continuously rotatable or a slider switch that is continuously slidable), a user interface dynamic/effect/feel in which a particular degree, amount, or intensity of feedback pleasantness (for example, the visual intensity, size, etc. of the green leaf) will appear to vary continuously according to a continuous degree of greenness or responsibility represented by the continuous input being provided. Thus, for example, for a scenario according to one or more embodiments in which an intelligent thermostat has computed an environmentally responsible setpoint temperature for a particular household time or condition, it has been found particularly advantageous for a user interface associated with the thermostat to be configured such that, if the user manually actuates its continuously adjustable input component (e.g., turns a manual adjustment knob or slider) to adjust the setpoint temperature to within a certain threshold (one or two degrees F., for example) of the environmentally responsible setpoint temperature, the green leaf can start to "fade in" in appearance from being invisible to being partially visible, and then as the user continues to adjust the setpoint temperature to arrive at the environmentally responsible setpoint temperature, the green leaf becomes fully visible. Although the scope of the present teachings is not so limited, this dynamic/effect has been found especially advantageous for household thermostats by synergistically harnessing the effects of (a) intrinsic visual interest in the dynamic fading or brightening of the green leaf itself, (b) stimulated user consciousness that their immediate action at that immediate point in time is affecting the environment in some way, (c) a feeling of enablement that they have the ability, by their immediate input actions, to affect the environment in a positive way, and (d) a feeling of user satisfaction that they have "done the right thing" when they achieve the full-brightness leaf. Advantageously, this synergistic combination of effects on the user psyche/emotion has the very practical and beneficial impact of causing the HVAC setpoint temperature to be more environmentally responsible than it would otherwise be, thereby causing their HVAC system to use less energy, causing their energy costs to be reduced, and furthering overall progress toward a more sustainable planet. It will further be appreciated that, while disclosures herein can refer to visual feedback (e.g., icons), non-visual feedback (e.g., audial cues) can alternatively or additionally be used.

According to one or more preferred embodiments, an instant visual icon is presented to a user when the user has adjusted a setting (e.g., changing a setpoint temperature immediately, changing a scheduled setpoint temperature, setting a threshold for using various device operations, etc.) of a smart-home device in a manner that will conserve energy. Additionally, when a device learns a schedule change that will conserve energy based on a user's usage patterns, an instant visual icon is presented the next time or the next few times that the scheduled change is effected. Further, the icon can be presented within a schedule in association with the portion of the schedule responsibly changed. Further yet, an overall icon can be presented to reflect instances in which a user's device setting behavior was responsible across a time period (e.g., over the course of a day). The overall icon presentation can be influenced by how frequently an instant icon was presented during the time period.

In some instances, a thermostat for controlling the operation of a heating, ventilation, and air conditioning (HVAC) system can be provided. The thermostat can include a housing and a user-interface component coupled to the housing. The user-interface component can include a mechanically movable input component and an electronic display, and can be configured to receive an input from a user. The input can be indicative of an adjustment of an HVAC-related setting and can include a continuous mechanical movement of the mechanically movable input component according to which the HVAC-related setting is correspondingly adjusted. The thermostat can also include a processing component coupled to the user-interface component. The processing component can be configured to compare on a real-time basis the HVAC-related setting that is being adjusted against a feedback criterion. The feedback criterion can be designed to indicate a circumstance under which feedback is to be presented to the user. The circumstance can be indicative of an achievement of an HVAC-related setting of a predetermined responsibility level with respect to an energy usage of the HVAC system controlled by the thermostat. The processing component can be further configured to determine, in real-time and based on the comparison, whether the feedback criterion is satisfied, and upon a determination that the feedback criterion is satisfied, cause visual feedback to be presented to the user in real-time. The real-time feedback can include a visual icon having a visual appeal corresponding to a desirability of the satisfaction of the feedback criterion.

In some instances, a method for control of an HVAC system by a thermostat is provided. The thermostat can include one or more intelligent components and a display. The method can include receiving an input from a user, the input being indicative of an adjustment of an HVAC-related setting. The input can be virtual or physical movement of a part of the thermostat, such that a movement of the part of thermostat corresponds to an adjustment of the HVAC-related setting. The method can further include comparing on a real-time basis the HVAC-related setting that is being adjusted against a feedback criterion. The feedback criterion can be designed to indicate a circumstance under which feedback is to be presented to the user. The circumstance can be indicative of an achievement of a HVAC-related setting of a predetermined responsibility level with respect to an energy usage of the HVAC system controlled by the thermostat. The method can also include determining, in real-time and based on the comparison, whether the feedback criterion is satisfied, and upon a determination that the feedback criterion is satisfied, causing visual feedback to be presented to the user in real-time. The real-time feedback can include a visual icon having a visual appeal corresponding to a desirability of the satisfaction of the feedback criterion.

In some instances, a thermostat system for controlling the operation of an HVAC system is provided. The thermostat system can include a user-interface component including a mechanically movable input component and an electronic display. The user-interface component can be configured to receive an input from a user. The input can be indicative of an adjustment of an HVAC-related setting and can include a non-discrete mechanical movement of the mechanically movable input component according to which the HVAC-related setting is correspondingly adjusted. The thermostat system can further include one or more intelligent components coupled to the user-interface component. The one or more intelligent components can be configured to determine the HVAC-related setting based on the detected movement of the user-interface component and compare on a real-time basis the HVAC-related setting that is being adjusted against a feedback criterion. The feedback criterion can be designed to indicate a circumstance under which feedback is to be presented to the user. The circumstance can be indicative of an achievement of a HVAC-related setting of a predetermined responsibility level with respect to an energy usage of the HVAC system controlled by the thermostat. The one or more intelligent components can further be configured to determine, in real-time and based on the comparison, whether the feedback criterion is satisfied, and upon a determination that the feedback criterion is satisfied, cause visual feedback to be presented to the user in real-time. The real-time feedback can include a visual icon having a visual appeal corresponding to a desirability of the satisfaction of the feedback criterion.

BRIEF DESCRIPTION OF THE DRAWINGS

The inventive body of work will be readily understood by referring to the following detailed description in conjunction with the accompanying drawings, in which:

FIGS. 10A-10C illustrate instances in which feedback can be provided via a device and can be associated with non-current actions;

FIG. 12 shows an example of an email 1210 that can be automatically generated and sent to users to report behavioral patterns, such as those relating to energy consumption, according to some embodiments of the invention;

DETAILED DESCRIPTION OF THE INVENTION

Figure 1:
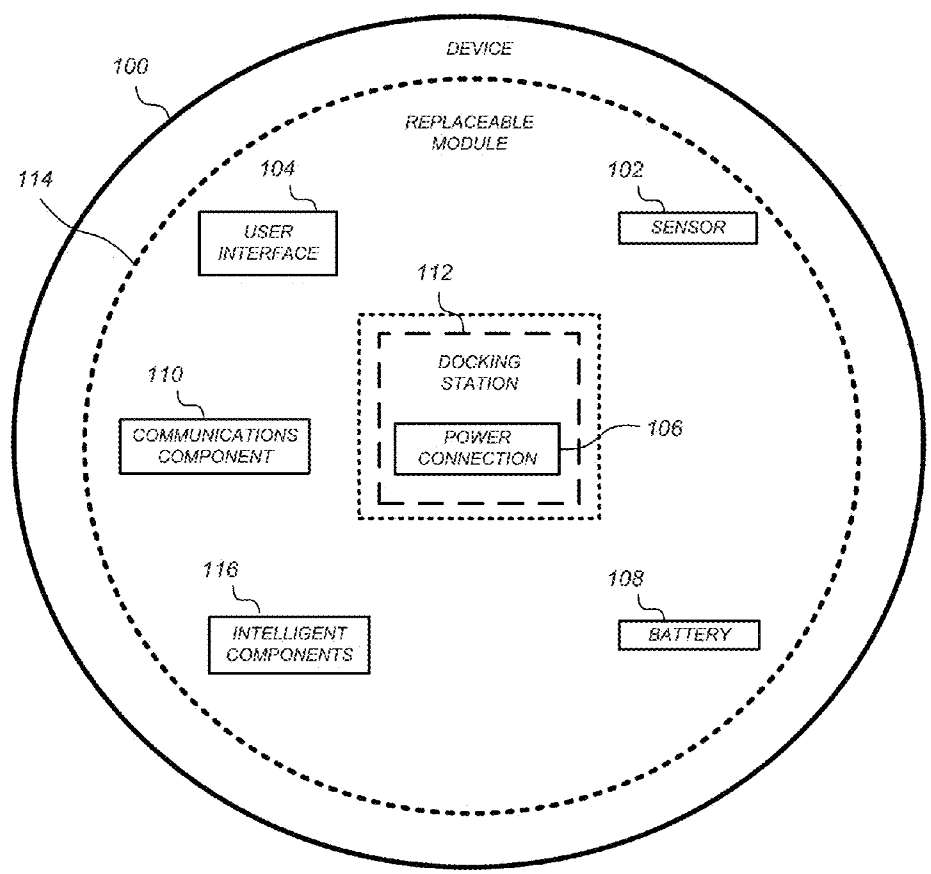
FIG. 1 illustrates an example of general device components which can be included in an intelligent, network-connected device.

Provided according to one or more embodiments are systems, methods, computer program products, and related business methods for providing feedback responsive to users' device-usage behaviors that encourage users to operate the device in a responsible manner, such as an environmentally responsible manner. The feedback can include presentation of pleasant icons subsequent to receipt of responsible user behaviors. For example, a green-leaf icon can be presented after a user has changed a setting on a device in an environmentally responsible manner that will save energy consumption relative to a previous setting. Not only can the feedback therefore produce utilitarian benefits, but the user can also be spared excess energy charges and can positively attribute the savings to the device. Feedback presentation can effectively convey to a user the types of setting adjustments that are responsible and/or an effect of a particular setting adjustment. For example, feedback can be selectively or differentially provided depending on a magnitude of an adjustment or whether a setting adjustment has any practical effect. To illustrate, in some embodiments, changing a cooling temperature setpoint on a thermostat on a cool summer evening from 85 degrees to 90 degrees can have no actual consequence since the air conditioner would not run in either circumstance; thus, positive feedback may not be provided in this instance. It will be appreciated that feedback can be used to promote various behaviors, such as energy conservation, healthy habits, and fiscal responsibility. The feedback can be generated based on individual's usage patterns (e.g., to promote continued improvement with regard to responsible usage), a group of users' usage patterns, external data (e.g., identifying instantaneous societal or system-wide concerns or pressures) and/or fixed criteria. Feedback can be instantly provided following specific user behaviors or learned behaviors or provided after a delay. In preferred embodiments, the feedback is presented in a manner that associates the feedback with particular behaviors or groups of behaviors such that a user can recognize specific behaviors giving rise to the feedback.

Feedback can be provided in response to users' operation of smart-home devices. Embodiments described further herein are but representative examples of devices, methods, systems, services, and/or computer program products that can be used in conjunction with an extensible devices and services platform that, while being particularly applicable and advantageous in the smart home context, is generally applicable to any type of enclosure or group of enclosures (e.g., offices, factories or retail stores), vessels (e.g., automobiles or aircraft), or other resource-consuming physical systems that will be occupied by humans or with which humans will physically or logically interact. It will be appreciated that devices referred to herein need not be within an enclosure or vessel. For example, a device can be on an exterior surface, nearby or connected to an enclosure or vessel. As another example, a device can include a portable device, such as a cell phone or laptop, that is configured to be carried by a user. Thus, although particular examples are set forth in the context of a smart home, it is to be appreciated that the scope of applicability of the described extensible devices and services platform is not so limited.

As described further herein, one or more intelligent, multi-sensing, network-connected devices can be used to promote user comfort, convenience, safety and/or cost savings. FIG. 1 illustrates an example of general device components which can be included in an intelligent, network-connected device 100 (i.e., "device"). Each of one, more or all devices 100 within a system of devices can include one or more sensors 102, a user-interface component 104, a power supply (e.g., including a power connection 106 and/or battery 108), a communications component 1010, a modularity unit (e.g., including a docking station 112 and replaceable module 114) and intelligence components 116. Particular sensors 102, user-interface components 104, power-supply configurations, communications components 110, modularity units and/or intelligence components 116 can be the same or similar across devices 100 or can vary depending on device type or model.

By way of example and not by way of limitation, one or more sensors 102 in a device 100 may be able to, e.g., detect acceleration, temperature, humidity, water, supplied power, proximity, external motion, device motion, sound signals, ultrasound signals, light signals, fire, smoke, carbon monoxide, global-positioning-satellite (GPS) signals, or radio-frequency (RF) or other electromagnetic signals or fields. Thus, for example, sensors 102 can include temperature sensor(s), humidity sensor(s), hazard-related sensor(s) or other environmental sensor(s), accelerometer(s), microphone(s), optical sensors up to and including camera(s) (e.g., charged-coupled-device or video cameras), active or passive radiation sensors, GPS receiver(s) or radio-frequency identification detector(s). While FIG. 1 illustrates an embodiment with a single sensor, many embodiments will include multiple sensors. In some instances, device 100 includes one or more primary sensors and one or more secondary sensors. The primary sensor(s) can sense data central to the core operation of the device (e.g., sensing a temperature in a thermostat or sensing smoke in a smoke detector). The secondary sensor(s) can sense other types of data (e.g., motion, light or sound), which can be used for energy-efficiency objectives or smart-operation objectives. In some instances, an average user may even be unaware of an existence of a secondary sensor.

One or more user-interface components 104 in device 100 may be configured to receive input from a user and/or present information to a user.

User-interface component 104 can also include one or more user-input components to receive information from a user. The received input can be used to determine a setting. The user-input components can include a mechanical or virtual component that can respond to a user's motion thereof. For example, a user can mechanically move a sliding component (e.g., along a vertical or horizontal track) or rotate a rotatable ring (e.g., along a circular track), or a user's motion along a touchpad can be detected. Such motions can correspond to a setting adjustment, which can be determined based on an absolute position of a user-interface component 104 or based on a displacement of a user-interface components 104 (e.g., adjusting a setpoint temperature by 1 degree F. for every 10° rotation of a rotatable-ring component). Physically and virtually movable user-input components can allow a user to set a setting along a portion of an apparent continuum. Thus, the user is not confined to choose between two discrete options (e.g., as would be the case if up and down buttons were used) but can quickly and intuitively define a setting along a range of possible setting values. For example, a magnitude of a movement of a user-input component can be associated with a magnitude of a setting adjustment, such that a user can dramatically alter a setting with a large movement or finely tune a setting with s small movement.

User-interface components 104 can further or alternatively include one or more buttons (e.g., up and down buttons), a keypad, a numberpad, a switch, a microphone, and/or a camera (e.g., to detect gestures). In one embodiment, user-input component 104 includes a click-and-rotate annular ring component, wherein a user can interact with the component by rotating the ring (e.g., to adjust a setting) and/or by clicking the ring inwards (e.g., to select an adjusted setting or to select an option). In another embodiment, user-input component 104 includes a camera, such that gestures can be detected (e.g., to indicate that a power or alarm state of a device is to be changed). In some instances, device 100 has only one primary input component, which may be used to set a plurality of types of settings. User-interface components 104 can also be configured to present information to a user via, e.g., a visual display (e.g., a thin-film-transistor display or organic light-emitting-diode display) and/or an audio speaker.

A power-supply component in device 100 may include a power connection 106 and/or local battery 108. For example, power connection 106 can connect device 100 to a power source such as a line voltage source. In some instances, connection 106 to an AC power source can be used to repeatedly charge a (e.g., rechargeable) local battery 108, such that battery 108 can later be used to supply power if needed in the event of an AC power disconnection or other power deficiency scenario.

A communications component 110 in device 100 can include a component that enables device 100 to communicate with a central server or a remote device, such as another device described herein or a portable user device. Communications component 110 can allow device 100 to communicate via, e.g., Wi-Fi, ZigBee, 3G/4G wireless, CAT6 wired Ethernet, HomePlug or other powerline communications method, telephone, or optical fiber, by way of non-limiting examples. Communications component 110 can include a wireless card, an Ethernet plug, or another transceiver connection.

A modularity unit in device 100 can include a static physical connection, and a replaceable module 114. Thus, the modularity unit can provide the capability to upgrade replaceable module 114 without completely reinstalling device 100 (e.g., to preserve wiring). The static physical connection can include a docking station 112 (which may also be termed an interface box) that can attach to a building structure. For example, docking station 112 could be mounted to a wall via screws or stuck onto a ceiling via adhesive. Docking station 112 can, in some instances, extend through part of the building structure. For example, docking station 112 can connect to wiring (e.g., to 120V line voltage wires) behind the wall via a hole made through a wall's sheetrock. Docking station 112 can include circuitry such as power-connection circuitry 106 and/or AC-to-DC powering circuitry and can prevent the user from being exposed to high-voltage wires. In some instances, docking stations 112 are specific to a type or model of device, such that, e.g., a thermostat device includes a different docking station than a smoke detector device. In some instances, docking stations 112 can be shared across multiple types and/or models of devices 100.

Replaceable module 114 of the modularity unit can include some or all sensors 102, processors, user-interface components 104, batteries 108, communications components 110, intelligence components 116 and so forth of the device. Replaceable module 114 can be configured to attach to (e.g., plug into or connect to) docking station 112. In some instances, a set of replaceable modules 114 are produced, with the capabilities, hardware and/or software varying across the replaceable modules 114. Users can therefore easily upgrade or replace their replaceable module 114 without having to replace all device components or to completely reinstall device 100. For example, a user can begin with an inexpensive device including a first replaceable module with limited intelligence and software capabilities. The user can then easily upgrade the device to include a more capable replaceable module. As another example, if a user has a Model #1 device in their basement, a Model #2 device in their living room, and upgrades their living-room device to include a Model #3 replaceable module, the user can move the Model #2 replaceable module into the basement to connect to the existing docking station. The Model #2 replaceable module may then, e.g., begin an initiation process in order to identify its new location (e.g., by requesting information from a user via a user interface).

Intelligence components 116 of the device can support one or more of a variety of different device functionalities. Intelligence components 116 generally include one or more processors configured and programmed to carry out and/or cause to be carried out one or more of the advantageous functionalities described herein. The intelligence components 116 can be implemented in the form of general-purpose processors carrying out computer code stored in local memory (e.g., flash memory, hard drive, random access memory), special-purpose processors or application-specific integrated circuits, combinations thereof, and/or using other types of hardware/firmware/software processing platforms. The intelligence components 116 can furthermore be implemented as localized versions or counterparts of algorithms carried out or governed remotely by central servers or cloud-based systems, such as by virtue of running a Java virtual machine (JVM) that executes instructions provided from a cloud server using Asynchronous Javascript and XML (AJAX) or similar protocols. By way of example, intelligence components 116 can be intelligence components 116 configured to detect when a location (e.g., a house or room) is occupied, up to and including whether it is occupied by a specific person or is occupied by a specific number of people (e.g., relative to one or more thresholds). Such detection can occur, e.g., by analyzing microphone signals, detecting user movements (e.g., in front of a device), detecting openings and closings of doors or garage doors, detecting wireless signals, detecting an IP address of a received signal, or detecting operation of one or more devices within a time window. Intelligence components 116 may include image-recognition technology to identify particular occupants or objects.

In some instances, intelligence components 116 can be configured to predict desirable settings and/or to implement those settings. For example, based on the presence detection, intelligence components 116 can adjust device settings to, e.g., conserve power when nobody is home or in a particular room or to accord with user preferences (e.g., general at-home preferences or user-specific preferences). As another example, based on the detection of a particular person, animal or object (e.g., a child, pet or lost object), intelligence components 116 can initiate an audio or visual indicator of where the person, animal or object is or can initiate an alarm or security feature if an unrecognized person is detected under certain conditions (e.g., at night or when lights are out). As yet another example, intelligence components 116 can detect hourly, weekly or even seasonal trends in user settings and adjust settings accordingly. For example, intelligence components 116 can detect that a particular device is turned on every week day at 6:30 am, or that a device setting is gradually adjusted from a high setting to lower settings over the last three hours. Intelligence components 116 can then predict that the device is to be turned on every week day at 6:30 am or that the setting should continue to gradually lower its setting over a longer time period.

In some instances, devices can interact with each other such that events detected by a first device influences actions of a second device. For example, a first device can detect that a user has pulled into a garage (e.g., by detecting motion in the garage, detecting a change in light in the garage or detecting opening of the garage door). The first device can transmit this information to a second device, such that the second device can, e.g., adjust a home temperature setting, a light setting, a music setting, and/or a security-alarm setting. As another example, a first device can detect a user approaching a front door (e.g., by detecting motion or sudden light-pattern changes). The first device can, e.g., cause a general audio or visual signal to be presented (e.g., such as sounding of a doorbell) or cause a location-specific audio or visual signal to be presented (e.g., to announce the visitor's presence within a room that a user is occupying).

Figure 2:
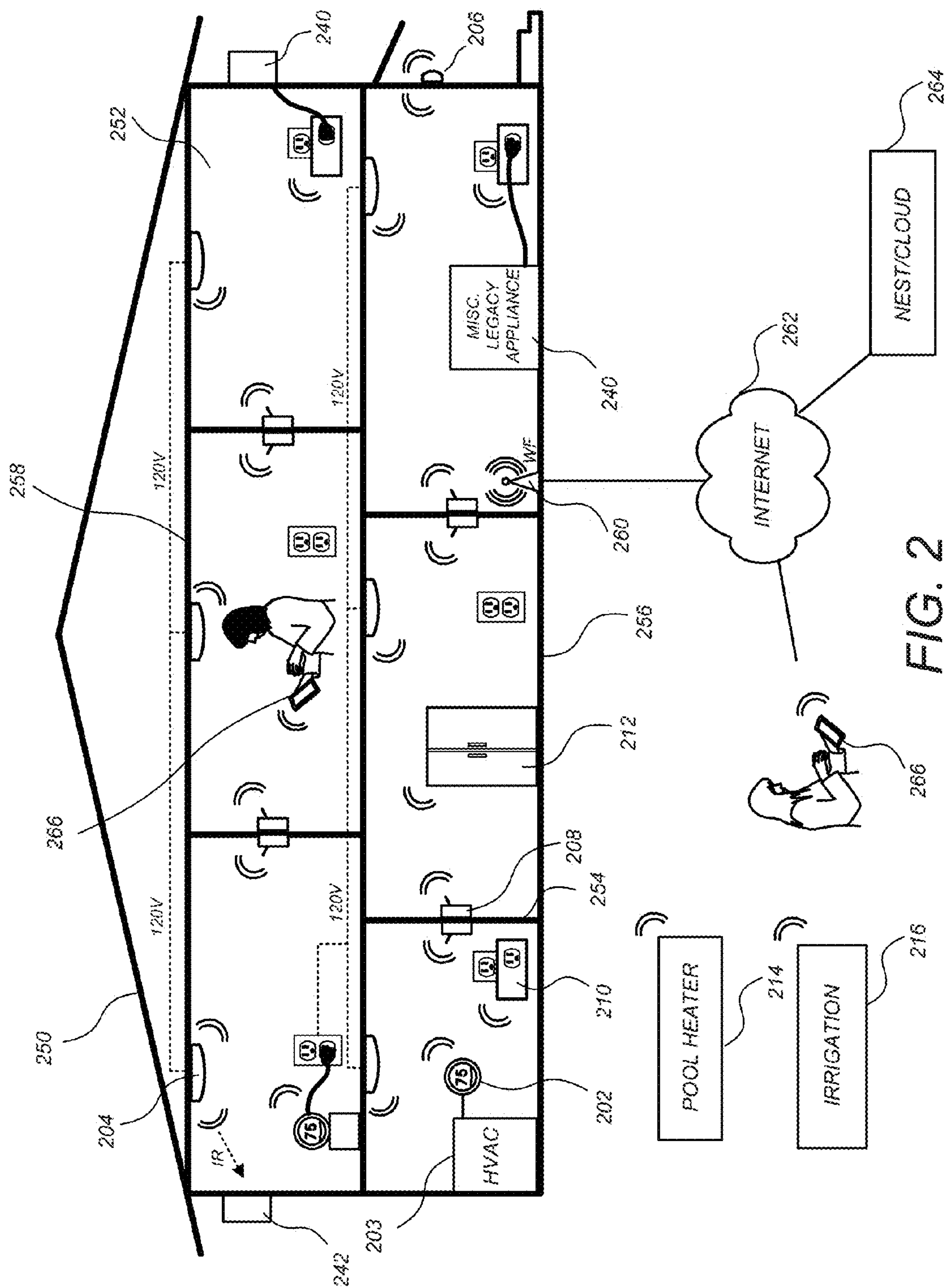
FIG. 2 illustrates an example of a smart home environment within which one or more of the devices, methods, systems, services, and/or computer program products described further herein can be applicable.

FIG. 2 illustrates an example of a smart home environment within which one or more of the devices, methods, systems, services, and/or computer program products described further herein can be applicable. The depicted smart home environment includes a structure 250, which can include, e.g., a house, office building, garage, or mobile home. It will be appreciated that devices can also be integrated into a smart home environment that does not include an entire structure 250, such as an apartment, condominium, or office space. Further, the smart home environment can control and/or be coupled to devices outside of the actual structure 250. Indeed, several devices in the smart home environment need not physically be within the structure 250 at all. For example, a device controlling a pool heater or irrigation system can be located outside of the structure 250.

The depicted structure 250 includes a plurality of rooms 252, separated at least partly from each other via walls 254. The walls 254 can include interior walls or exterior walls. Each room can further include a floor 256 and a ceiling 258. Devices can be mounted on, integrated with and/or supported by a wall 254, floor 256 or ceiling 258.

The smart home depicted in FIG. 2 includes a plurality of devices, including intelligent, multi-sensing, network-connected devices that can integrate seamlessly with each other and/or with cloud-based server systems to provide any of a variety of useful smart home objectives. One, more or each of the devices illustrated in the smart home environment and/or in the figure can include one or more sensors, a user interface, a power supply, a communications component, a modularity unit and intelligent software as described with respect to FIG. 1. Examples of devices are shown in FIG. 2.

An intelligent, multi-sensing, network-connected thermostat 202 can detect ambient climate characteristics (e.g., temperature and/or humidity) and control a heating, ventilation and air-conditioning (HVAC) system 203. One or more intelligent, network-connected, multi-sensing hazard detection units 204 can detect the presence of a hazardous substance and/or a hazardous condition in the home environment (e.g., smoke, fire, or carbon monoxide). One or more intelligent, multi-sensing, network-connected entryway interface devices 206, which can be termed a "smart doorbell", can detect a person's approach to or departure from a location, control audible functionality, announce a person's approach or departure via audio or visual means, or control settings on a security system (e.g., to activate or deactivate the security system).

Each of a plurality of intelligent, multi-sensing, network-connected wall light switches 208 can detect ambient lighting conditions, detect room-occupancy states and control a power and/or dim state of one or more lights. In some instances, light switches 208 can further or alternatively control a power state or speed of a fan, such as a ceiling fan. Each of a plurality of intelligent, multi-sensing, network-connected wall plug interfaces 210 can detect occupancy of a room or enclosure and control supply of power to one or more wall plugs (e.g., such that power is not supplied to the plug if nobody is at home). The smart home may further include a plurality of intelligent, multi-sensing, network-connected appliances 212, such as refrigerators, stoves and/or ovens, televisions, washers, dryers, lights (inside and/or outside the structure 250), stereos, intercom systems, garage-door openers, floor fans, ceiling fans, whole-house fans, wall air conditioners, pool heaters 214, irrigation systems 216, security systems, and so forth. While descriptions of FIG. 2 can identify specific sensors and functionalities associated with specific devices, it will be appreciated that any of a variety of sensors and functionalities (such as those described throughout the specification) can be integrated into the device.

In addition to containing processing and sensing capabilities, each of the devices 202, 204, 206, 208, 210, 212, 214 and 216 can be capable of data communications and information sharing with any other of the devices 202, 204, 206, 208, 210, 212, 214 and 216 devices, as well as to any cloud server or any other device that is network-connected anywhere in the world. The devices can send and receive communications via any of a variety of custom or standard wireless protocols (Wi-Fi, ZigBee, 6LoWPAN, etc.) and/or any of a variety of custom or standard wired protocols (CAT6 Ethernet, HomePlug, etc.). The wall plug interfaces 210 can serve as wireless or wired repeaters, and/or can function as bridges between (i) devices plugged into AC outlets and communicating using Homeplug or other power line protocol, and (ii) devices that not plugged into AC outlets.

For example, a first device can communicate with a second device via a wireless router 260. A device can further communicate with remote devices via a connection to a network, such as the Internet 262. Through the Internet 262, the device can communicate with a central server or a cloud-computing system 264. The central server or cloud-computing system 264 can be associated with a manufacturer, support entity or service provider associated with the device. For one embodiment, a user may be able to contact customer support using a device itself rather than needing to use other communication means such as a telephone or Internet-connected computer. Further, software updates can be automatically sent from the central server or cloud-computing system 264 to devices (e.g., when available, when purchased, or at routine intervals).

By virtue of network connectivity, one or more of the smart-home devices of FIG. 2 can further allow a user to interact with the device even if the user is not proximate to the device. For example, a user can communicate with a device using a computer (e.g., a desktop computer, laptop computer, or tablet) or other portable electronic device (e.g., a smartphone) 266. A webpage or app can be configured to receive communications from the user and control the device based on the communications and/or to present information about the device's operation to the user. For example, the user can view a current setpoint temperature for a device and adjust it using a computer. The user can be in the structure during this remote communication or outside the structure.

The smart home also can include a variety of non-communicating legacy appliances 140, such as old conventional washer/dryers, refrigerators, and the like which can be controlled, albeit coarsely (ON/OFF), by virtue of the wall plug interfaces 210. The smart home can further include a variety of partially communicating legacy appliances 242, such as IR-controlled wall air conditioners or other IR-controlled devices, which can be controlled by IR signals provided by the hazard detection units 204 or the light switches 208.

Figure 3:
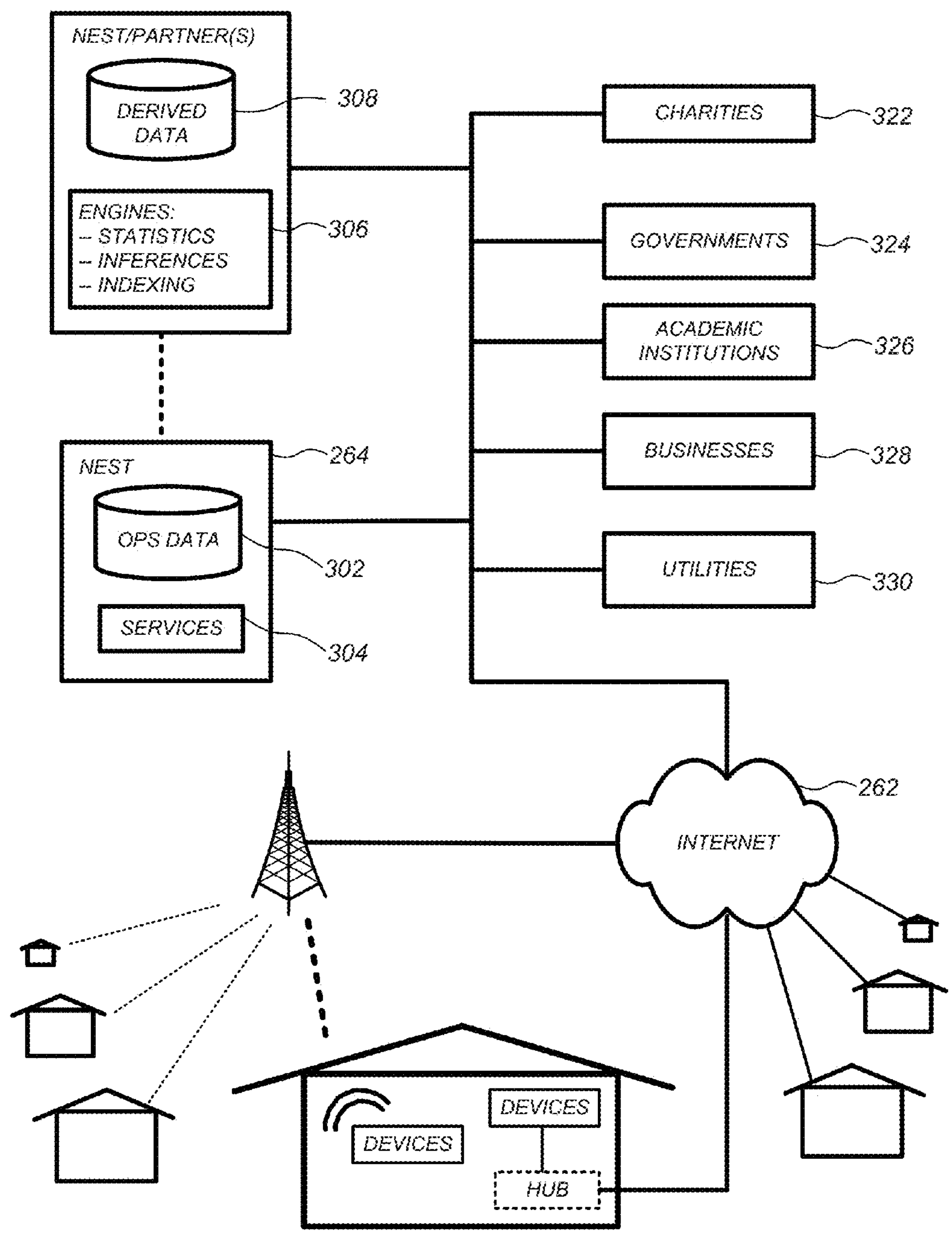
FIG. 3 illustrates a network-level view of an extensible devices and services platform with which a smart home environment can be integrated.

FIG. 3 illustrates a network-level view of an extensible devices and services platform with which the smart home of FIGS. 1 and/or 2 can be integrated. Each of the intelligent, network-connected devices from FIG. 2 can communicate with one or more remote central servers or cloud computing systems 264. The communication can be enabled by establishing connection to the Internet 262 either directly (for example, using 3G/4G connectivity to a wireless carrier), though a hubbed network (which can be scheme ranging from a simple wireless router, for example, up to and including an intelligent, dedicated whole-home control node), or through any combination thereof.

The central server or cloud-computing system 264 can collect operation data 302 from the smart home devices. For example, the devices can routinely transmit operation data or can transmit operation data in specific instances (e.g., when requesting customer support). The central server or cloud-computing architecture 264 can further provide one or more services 304. The services 304 can include, e.g., software update, customer support, sensor data collection/logging, remote access, remote or distributed control, or use suggestions (e.g., based on collected operation data 304 to improve performance, reduce utility cost, etc.). Data associated with the services 304 can be stored at the central server or cloud-computing system 264 and the central server or cloud-computing system 264 can retrieve and transmit the data at an appropriate time (e.g., at regular intervals, upon receiving request from a user, etc.).

One salient feature of the described extensible devices and services platform, as illustrated in FIG. 3, is a processing engine 306, which can be concentrated at a single server or distributed among several different computing entities without limitation. Processing engine 306 can include engines configured to receive data from a set of devices (e.g., via the Internet or a hubbed network), to index the data, to analyze the data and/or to generate statistics based on the analysis or as part of the analysis. The analyzed data can be stored as derived data 308. Results of the analysis or statistics can thereafter be transmitted back to a device providing ops data used to derive the results, to other devices, to a server providing a webpage to a user of the device, or to other non-device entities. For example, use statistics, use statistics relative to use of other devices, use patterns, and/or statistics summarizing sensor readings can be transmitted. The results or statistics can be provided via the Internet 262. In this manner, processing engine 306 can be configured and programmed to derive a variety of useful information from the operational data obtained from the smart home. A single server can include one or more engines.

The derived data can be highly beneficial at a variety of different granularities for a variety of useful purposes, ranging from explicit programmed control of the devices on a per-home, per-neighborhood, or per-region basis (for example, demand-response programs for electrical utilities), to the generation of inferential abstractions that can assist on a per-home basis (for example, an inference can be drawn that the homeowner has left for vacation and so security detection equipment can be put on heightened sensitivity), to the generation of statistics and associated inferential abstractions that can be used for government or charitable purposes. For example, processing engine 306 can generate statistics about device usage across a population of devices and send the statistics to device users, service providers or other entities (e.g., that have requested or may have provided monetary compensation for the statistics). As specific illustrations, statistics can be transmitted to charities 322, governmental entities 324 (e.g., the Food and Drug Administration or the Environmental Protection Agency), academic institutions 326 (e.g., university researchers), businesses 328 (e.g., providing device warranties or service to related equipment), or utility companies 330. These entities can use the data to form programs to reduce energy usage, to preemptively service faulty equipment, to prepare for high service demands, to track past service performance, etc., or to perform any of a variety of beneficial functions or tasks now known or hereinafter developed.

Figure 4:
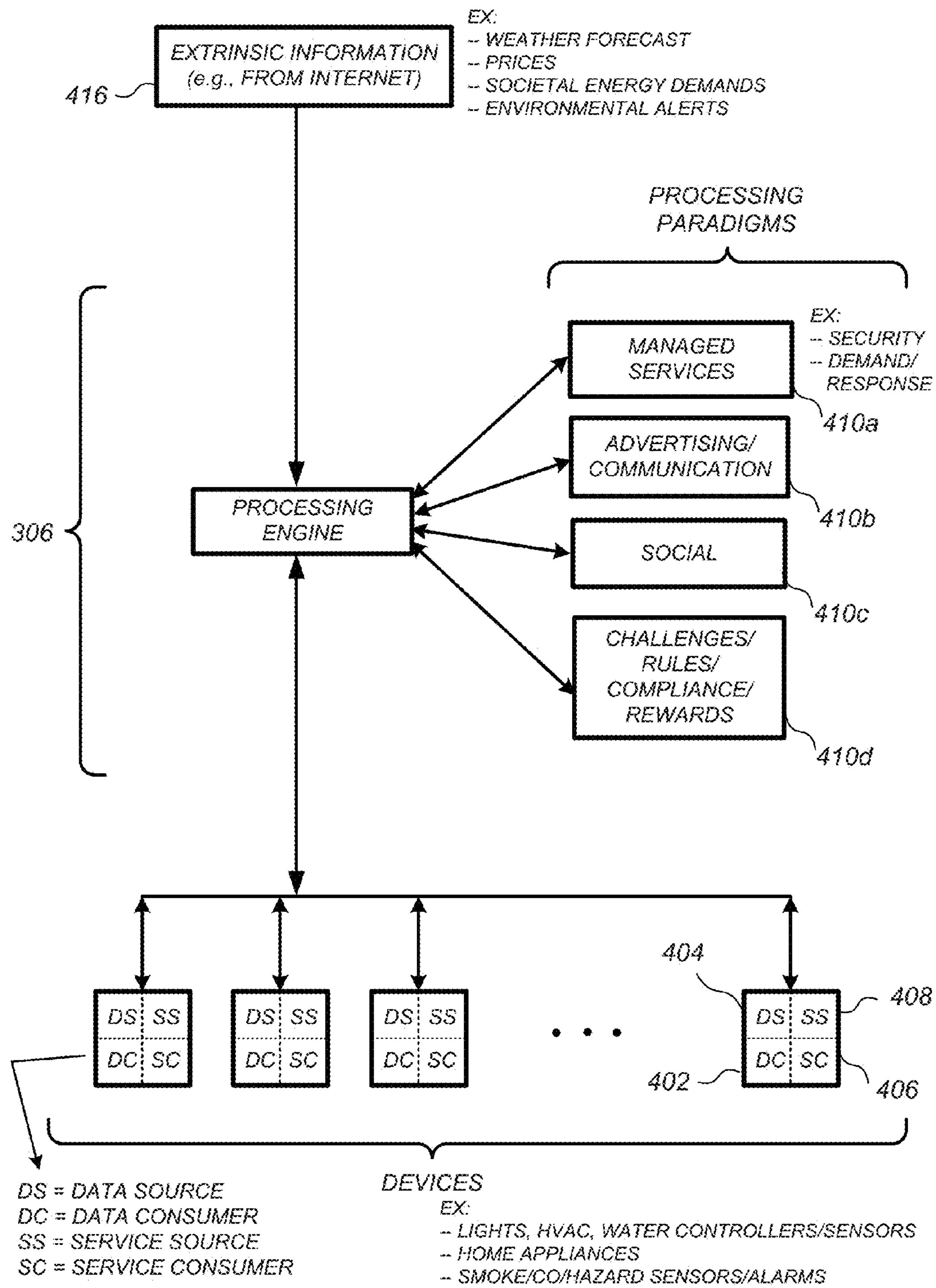
FIG. 4 illustrates an abstracted functional view of the extensible devices and services platform of FIG. 3.

FIG. 4 illustrates an abstracted functional view of the extensible devices and services platform of FIG. 3, with particular reference to the processing engine 306 as well as the devices of the smart home. Even though the devices situated in the smart home will have an endless variety of different individual capabilities and limitations, they can all be thought of as sharing common characteristics in that each of them is a data consumer 402 (DC), a data source 404 (DS), a services consumer 406 (SC), and a services source 408 (SS). Advantageously, in addition to providing the essential control information needed for the devices to achieve their local and immediate objectives, the extensible devices and services platform can also be configured to harness the large amount of data that is flowing out of these devices. In addition to enhancing or optimizing the actual operation of the devices themselves with respect to their immediate functions, the extensible devices and services platform can also be directed to "repurposing" that data in a variety of automated, extensible, flexible, and/or scalable ways to achieve a variety of useful objectives. These objectives may be predefined or adaptively identified based on, e.g., usage patterns, device efficiency, and/or user input (e.g., requesting specific functionality).

For example, FIG. 4 shows processing engine 306 as including a number of paradigms 410. Processing engine 306 can include a managed services paradigm 410*a* that monitors and manages primary or secondary device functions. The device functions can include ensuring proper operation of a device given user inputs, estimating that (e.g., and responding to) an intruder is or is attempting to be in a dwelling, detecting a failure of equipment coupled to the device (e.g., a light bulb having burned out), implementing or otherwise responding to energy demand response events, or alerting a user of a current or predicted future event or characteristic. Processing engine 306 can further include an advertising/communication paradigm 410*b* that estimates characteristics (e.g., demographic information), desires and/or products of interest of a user based on device usage. Services, promotions, products or upgrades can then be offered or automatically provided to the user. Processing engine 306 can further include a social paradigm 410*c* that uses information from a social network, provides information to a social network (for example, based on device usage), and/or processes data associated with user and/or device interactions with the social network platform. For example, a user's status as reported to their trusted contacts on the social network could be updated to indicate when they are home based on light detection, security system inactivation or device usage detectors. As another example, a user may be able to share device-usage statistics with other users. Processing engine 306 can include a challenges/rules/compliance/rewards paradigm 410*d* that informs a user of challenges, rules, compliance regulations and/or rewards and/or that uses operation data to determine whether a challenge has been met, a rule or regulation has been complied with and/or a reward has been earned. The challenges, rules or regulations can relate to efforts to conserve energy, to live safely (e.g., reducing exposure to toxins or carcinogens), to conserve money and/or equipment life, to improve health, etc.

Processing engine 306 can integrate or otherwise utilize extrinsic information 416 from extrinsic sources to improve the functioning of one or more processing paradigms. Extrinsic information 416 can be used to interpret operational data received from a device, to determine a characteristic of the environment near the device (e.g., outside a structure that the device is enclosed in), to determine services or products available to the user, to identify a social network or social-network information, to determine contact information of entities (e.g., public-service entities such as an emergency-response team, the police or a hospital) near the device, etc., to identify statistical or environmental conditions, trends or other information associated with a home or neighborhood, and so forth.

An extraordinary range and variety of benefits can be brought about by, and fit within the scope of, the described extensible devices and services platform, ranging from the ordinary to the profound. Thus, in one "ordinary" example, each bedroom of the smart home can be provided with a smoke/fire/CO alarm that includes an occupancy sensor, wherein the occupancy sensor is also capable of inferring (e.g., by virtue of motion detection, facial recognition, audible sound patterns, etc.) whether the occupant is asleep or awake. If a serious fire event is sensed, the remote security/monitoring service or fire department is advised of how many occupants there are in each bedroom, and whether those occupants are still asleep (or immobile) or whether they have properly evacuated the bedroom. While this is, of course, a very advantageous capability accommodated by the described extensible devices and services platform, there can be substantially more "profound" examples that can truly illustrate the potential of a larger "intelligence" that can be made available. By way of perhaps a more "profound" example, the same data bedroom occupancy data that is being used for fire safety can also be "repurposed" by the processing engine 306 in the context of a social paradigm of neighborhood child development and education. Thus, for example, the same bedroom occupancy and motion data discussed in the "ordinary" example can be collected and made available for processing (properly anonymized) in which the sleep patterns of schoolchildren in a particular ZIP code can be identified and tracked. Localized variations in the sleeping patterns of the schoolchildren may be identified and correlated, for example, to different nutrition programs in local schools.

Figure 5:
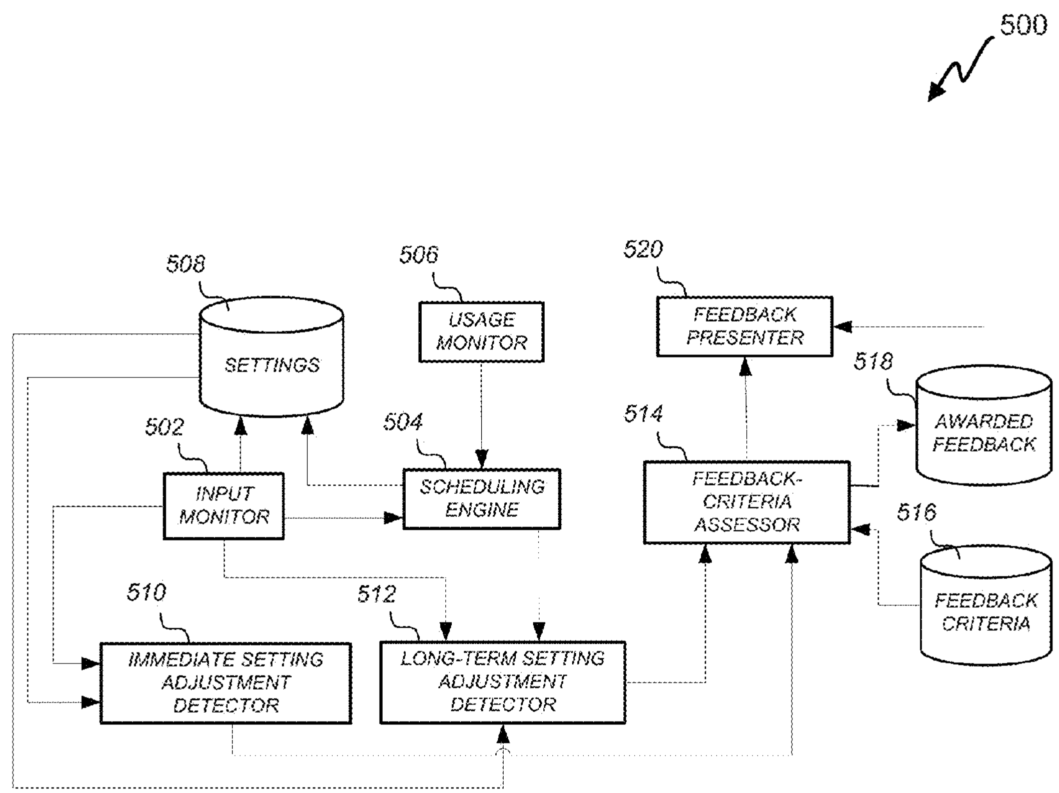
FIG. 5 illustrates components of feedback engine according to an embodiment of the invention.

FIG. 5 illustrates components of a feedback engine 500 according to an embodiment of the invention. In some instances, a device (e.g., a smart-home device, such as device 100) includes feedback engine 500 (e.g., as part of intelligent components 116). In some instances, processing engine 306 of FIG. 3, supra, includes feedback engine 500. In some instances, both a device and processing engine 306 include feedback engine 500 (e.g., such that feedback can be presented on a device itself or on an interface tied to the device and/or such that feedback can be responsive to input or behaviors detected via the device or via the interface). In some instances, one or both of a device and processing engine 306 includes some, but not all, components of feedback engine 500.

Feedback engine 500 can include an input monitor that monitors input received from a user. The input can include input received via a device itself or an interface tied to a device. The input can include, e.g., rotation of a rotatable component, selection of an option (e.g., by clicking a clickable component, such as a button or clickable ring), input of numbers and/or letters (e.g., via a keypad), etc. The input can be tied to a function. For example, rotating a ring clockwise can be associated with increasing a setpoint temperature.

In some instances, an input's effect is to adjust a setting with immediate consequence (e.g., a current setpoint temperature, a current on/off state of a light, a zone to be currently watered by a sprinkler system, etc.). In some instances, an input's effect is to adjust a setting with delayed or long-term consequence. For example, the input can alter a start or stop time in a schedule, a threshold (e.g., an alarm threshold), or a default value associated with a particular state (e.g., a power state or temperature associated with a device when a user is determined to be away or not using the device). In some instances, the input's effect is to both adjust a setting with immediate consequence and a setting with a delayed or long-term consequence. For example, a user can adjust a current setpoint temperature, which can also influence a learned schedule thereby also affecting setpoint temperatures at subsequent schedule times.

Figure 6A:
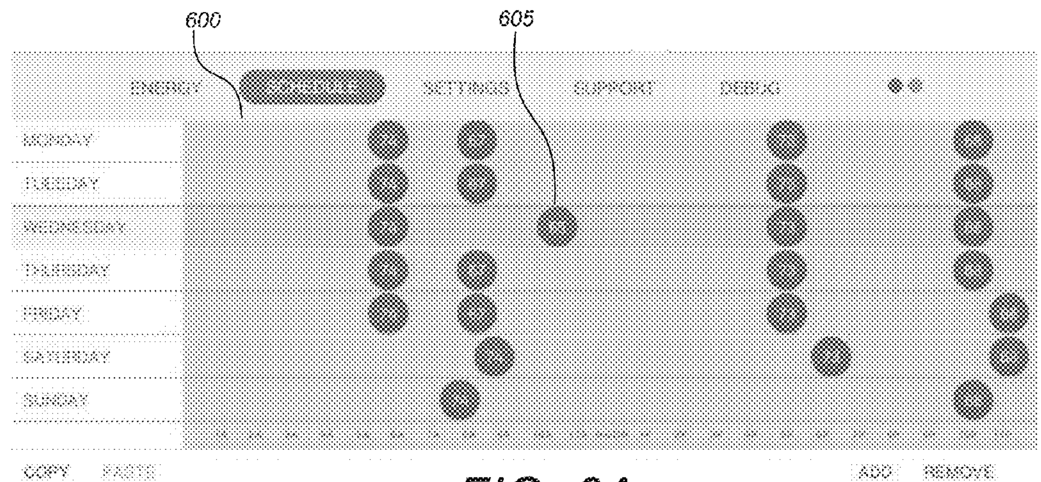
FIGS. 6A-6D show examples of an adjustable schedule 600.
Figure 6B:
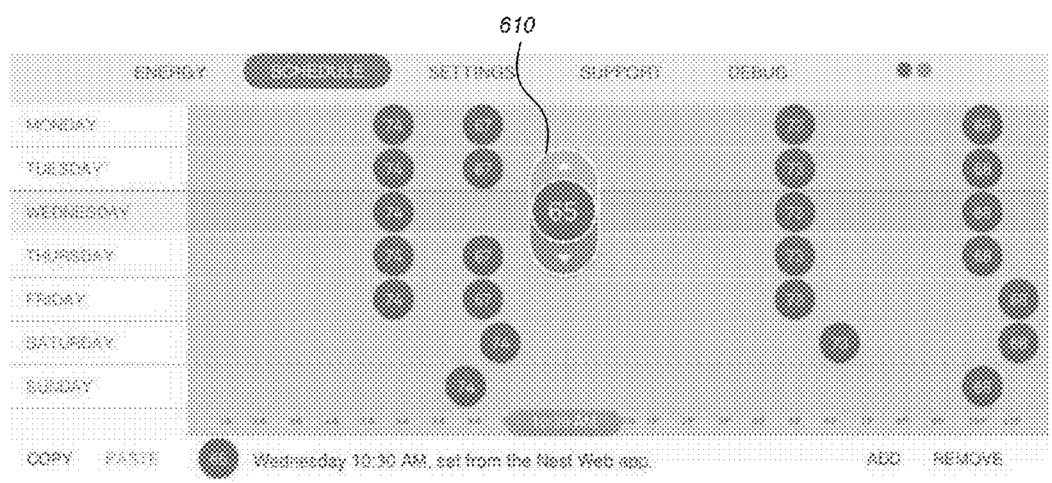
Figure 6C:
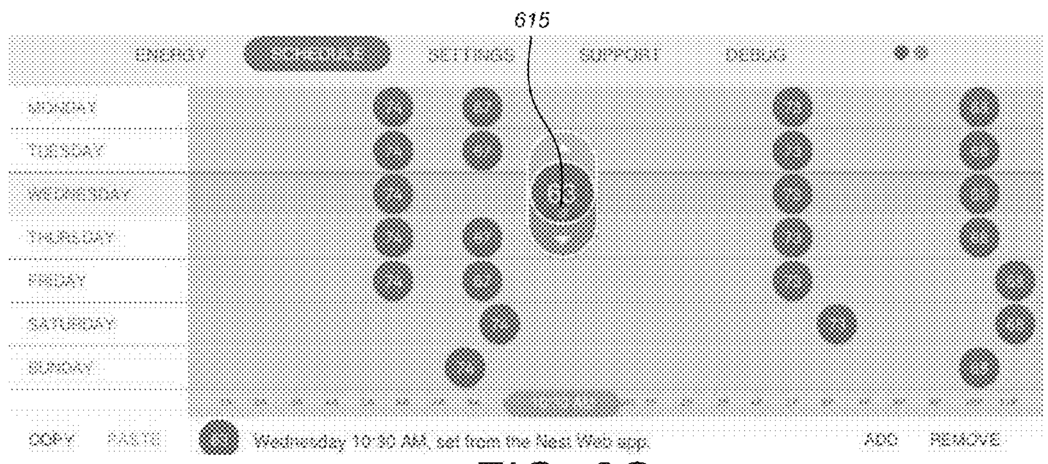

Feedback engine 500 can include a scheduling engine 504 that generates or updates a schedule for a device. FIGS. 6A-6C show examples of an adjustable schedule 600 which identifies a mapping between times and setpoint temperatures. The schedule shows an icon or other representation (hereinafter "representation") 605 for each of a set of scheduled setpoints. Each scheduled setpoint is characterized by a (i) scheduled setpoint type that represented by a color of the representation 605 (for example, a heating setpoint represented by an orange/red color, a cooling setpoint by a blue color), (ii) a scheduled setpoint temperature value represented numerically on the representation 605, and (iii) an effective time (and day) of the scheduled setpoint. The vertical location of representation 605 indicates a day of the week on which the scheduled setpoint is s to take effect. The horizontal location of representation 605 indicates a time at which the scheduled setpoint is to take effect. The value on representation 605 identifies the setpoint temperature to take effect. Schedule features (e.g., when setpoint-temperature changes should occur and what setpoint temperature should be effected) can be influenced by express user inputs to the schedule itself (e.g., establishing setpoints, removing setpoints, changing setting times or values for the setpoints), by ordinary temperature-setting user inputs (e.g., the user changes the current setpoint temperature by turning the dial on the thermostat or by a smartphone or other remote user interface and a schedule is automatically learned based on usage patterns), and/or by default rules or other methods (e.g., biasing towards low-power operation during particular hours of the day).

The schedule can further be influenced by non-input usage monitored by usage monitor 506. Usage monitor 506 can monitor, e.g., when a system associated with a device or a part of a device is actually operating (e.g., whether a heating, ventilation and air conditioning system is operating or whether an electronic device connected to a power source is being used), when a user is in an enclosure or part of an enclosure influenced by a device (e.g., whether a user is at home when the air conditioning is running or whether a user is in a room with lights on), when a device's operation is of utility (e.g., whether food is in a pre-heated oven), etc. Scheduling engine 504 can adjust a schedule or other settings based on the monitored usage to reduce unnecessary energy consumption. For example, even if a user routinely leaves all light switches on, scheduling engine 504 can adjust a schedule to turn the lights off (e.g., via smart light-switch devices) during portions of the day that usage monitor 506 determines that the user is not at home.

FIGS. 6B-6C illustrate how a user can interact with schedule 600 to expressly adjust scheduled setpoints. FIG. 6B shows a display to be presented to a user upon a user selection of a schedule setpoint. For example, the user can select the scheduled setpoint by clicking on or touching representation 605 (e.g., shown via a web or app interface). Subsequent to the selection, a temperature-adjusting feature 610 can be presented. Temperature-adjusting feature 610 can include one or more arrows (e.g., as shown in FIG. 6B) or a non-discrete feature, such as a line or arc, with various different positions along the feature being associated with different temperatures.

A user can interact with temperature-adjusting feature 610 to adjust a setpoint temperature of an associated scheduled setpoint. In FIG. 6B, each selection of the arrow can cause the setpoint temperature of an associated scheduled setpoint to be adjusted by a fixed amount. For example, a user could twice select (e.g., press/click) the down arrow of temperature-adjusting feature 610 shown in FIG. 6B to adjust an associated heating setpoint temperature from 65 degrees F. to 63 degrees F. (as shown in FIG. 6C). As described in further detail herein, if the adjustment is sufficient to satisfy a feedback criterion (e.g., indicating that positive feedback is to be presented upon a change of a setpoint temperature that is at least a threshold, directional amount), a feedback icon 615 can be presented on schedule 600. Thus, the user receives immediate feedback about a responsibility of the adjustment.

Figure 6D:
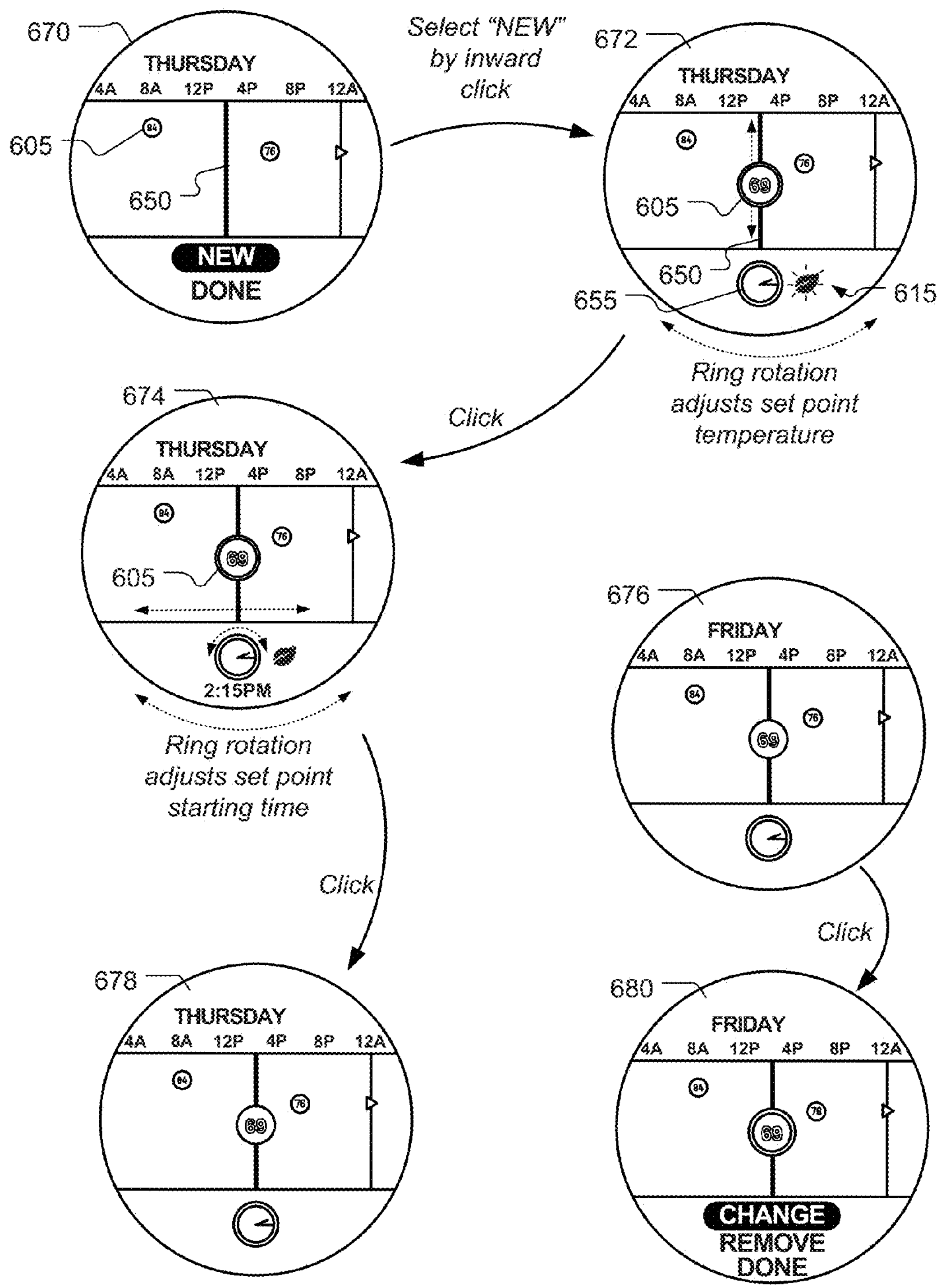

FIG. 6D illustrates another example of how a user can interact with schedule 600 to expressly create and adjust scheduled setpoints. In this instance, a week-long schedule is shown in a horizontal orientation. The week-long schedule begins with Monday, and continues to translate in response to a user's action (e.g., rotation of a rotatable ring) to a position that corresponds to the current time and day of the week, which in this example is 2:15 PM on Thursday. Again, the horizontally-oriented schedule has a plot area in which the vertical axis represents the temperature value of the setpoints and the horizontal axis represents the effective time (including the day) of the setpoints. The schedule display includes a day of the week label, labels for each 4 hours (e.g. 12A, 4A, 8A, 12P, 4P, 8P and 12P), a central horizontal cursor bar 650 marking the current schedule time, as well as a small analog clock 655 that displays hands indicating the current schedule time. Setpoints are again represented with circles with numbers corresponding to the setpoint temperature, and having a position corresponding to the setpoint temperature and the time that the setpoint becomes effective.

While FIG. 6B illustrates an example of adjusting the setpoint temperature of an existing scheduled setpoint, FIG. 6D illustrates other examples of creating a new scheduled setpoint (screens 670-672-674-678, respectively) and modifying an existing scheduled setpoint (screens 676-680). If the horizontal cursor bar 650 is not positioned on an existing setpoint, such as shown in screen 670, and a selection (e.g., an inward click) is received, a create new setpoint option will be offered, as in screen 670 of FIG. 6D. In screen 672, if the user selects "NEW" then a new setpoint representation 605 will appear on the time cursor bar 650, as shown in screen 672. For some embodiments, this "birth" of the new setpoint representation 605 proceeds by virtue of an animation similar to that illustrated in the commonly assigned U.S. Ser. No. 29/399,637, wherein, as soon as the user clicks on "NEW," a very small disk (much smaller than the representation 605 at screen 672) appears near the top of the cursor bar 650, and then progressively grows into its full-size version 605 as it visibly "slides" downward to "land" at a vertical location corresponding to a starting temperature setpoint value. For some embodiments, the starting temperature setpoint value is equal to that of an immediately preceding setpoint in the schedule. User input, such as rotation of a rotatable ring, will then adjust the setpoint temperature of the new setpoint representation 605 upward or downward from that starting temperature setpoint value. According to some embodiments, a feedback icon 615 is displayed immediately just as the new setpoint temperature corresponds to energy-saving (and/or cost saving) parameters, which aids the user in making energy-saving decisions. Once the temperature for the new setpoint is satisfactory, an inward click allows adjustment of the setpoint time via the rotatable ring, as shown in screens 674 and 678.

For changing a setpoint temperature of an existing setpoint, if the time cursor bar 650 is positioned on an existing setpoint, such as shown in screen 676, a user selection (e.g., an inward click) brings up the screen 680 in which the user can choose to change the setpoint, remove the setpoint or exit out of the schedule viewer/editor. If the user selects "CHANGE" then the user can make adjustments to the temperature and start time similar to the methods shown in screens 672 and 674, respectively, with an instant-feedback leaf (not shown) being presented immediately as the setpoint temperature is moved past a responsible value.

According to some embodiments, setpoints must be created on even quarter-hours (i.e. on the hour, or 15, 30 or 45 minutes past), and two setpoints cannot be created or moved to be less than 60 minutes apart. Although the examples shown herein display a week-long schedule, according to other embodiments, other time periods can be used for the displayed schedule, such as daily, 3-day, two weeks, etc.

Settings can be stored in one or more settings databases 508. It will be appreciated that a schedule can be understood to include a set of settings (e.g., start and stop times, values associated with time blocks, etc.). Thus, settings database 508 can further store schedule information and/or schedules. Settings database 508 can be updated to include revised immediate-effect settings, delayed settings or scheduled settings determined based on user input, monitored usage or learned schedules. Settings database 508 can further store historical settings, dates and times that settings were adjusted and events causing the adjustment (e.g., learned scheduled changes, express user input, etc.).

Feedback engine 500 can include one or more setting adjustment detectors. As depicted in FIG. 5, feedback engine 500 includes an immediate setting adjustment detector 510 that detects adjustments to settings that result in an immediate consequence and a long-term setting adjustment detector 512 that detects adjustments to settings that result in a delayed or long-term consequence. Setting adjustments that result in an immediate consequence can include, e.g., adjusting a current setpoint temperature, or changing a current mode (e.g., from a heating or cooling mode to an away mode). Thus, the effect of these adjustments is an immediate adjustment of a current setpoint temperature or other operation feature of a controlled HVAC system. Setting adjustments that result in an immediate consequence can include, e.g., adjusting a schedule (e.g., adjusting a value or time of a scheduled setpoint, adding a new scheduled setpoint or deleting a scheduled setpoint) or adjusting a lockout temperature (described in further detail below in reference to FIG. 8).

An adjustment can be quantified by accessing a new setting (e.g., from input monitor 502 or scheduling engine 504) and comparing the new setting to a historical setting (e.g., stored in settings database 508), by comparing multiple settings within settings database 508 (e.g., a historical and new setting), by quantifying a setting change based on input (e.g., a degree of a rotation), etc. For example, at 3:30 pm, an enclosure's setpoint temperature may be set to 74 degrees F. based on a schedule. If a user then adjusts the setpoint temperature to 72 degrees F., the adjusted temperature (72 degrees F.) can be compared to the previously scheduled temperature (74 degrees F.), which in some instances (absent repeated user setpoint modifications), amounts to comparing the setpoint temperature before the adjustment to the setpoint temperature after the adjustment. As another example, a user can interact with a schedule to change a heating setpoint temperature scheduled to take effect on Wednesday at 10:30 am from 65 degrees F. to 63 degrees F. (e.g., as shown in FIGS. 6B-6C). The old and new temperatures can then be compared. Thus, an adjustment quantification can include comparing but-for and corresponding temperatures: first identifying what a new temperature has been set to, second identifying what the temperature would have otherwise then been (e.g., at a time the temperature is to be effected) if the adjustment had not occurred, and third comparing these temperatures. However, the comparison can be further refined to avoid analysis of a change between multiple repeated adjustments. For example, by comparing a new immediate-effect setpoint temperature to a setpoint temperature scheduled to take effect at that time, positive feedback is not provided in response to a user first irresponsibly setting a current temperature and soon thereafter mitigating this effect.

The detected adjustment (and/or adjusted setting) can be analyzed by a feedback-criteria assessor 514. Feedback-criteria assessor 514 can access feedback criteria stored in a feedback-criteria database 516. The feedback criteria can identify conditions under which feedback is to be presented and/or the type of feedback to be presented. The feedback criteria can be relative and/or absolute. For example, a relative feedback criterion can indicate that feedback is to be presented upon detection of a setting adjustment exceeding a particular value, while an absolute feedback criteria can indicate that feedback is to be presented upon detection of a setting that exceeds a particular value.

For each of one or more criteria, feedback-criteria assessor 514 can compare the quantified adjustment or setting to the criterion (e.g., by comparing the adjustment or setting to a value of the criterion or otherwise evaluate whether the criterion is satisfied) to determine whether feedback is to be presented (i.e., whether a criterion has been satisfied), what type of feedback is to be presented and/or when feedback is to be presented. For example, if feedback is to be presented based on an adjustment to a setting with an immediate consequence that exceeds a given magnitude, feedback-criteria assessor 514 can determine (based on the feedback criteria) that feedback is to be instantly presented for a given time period. If feedback is to be presented based on an adjustment to a setting with delayed consequence of a given magnitude, feedback-criteria assessor 514 can determine (based on the feedback criteria) that feedback is to be presented when the setting takes effect. Feedback-criteria assessor 514 can further determine whether summary feedback or delayed feedback is to be presented. For example, feedback can be presented if settings or setting adjustments over a time period (e.g., throughout a day) satisfy a criterion. This feedback can be presented, e.g., via a report or on a schedule.

As one example, a user may have adjusted a current cooling setpoint temperature from a first value to a second value. Two criteria may be applicable: a first may indicate that feedback is to be immediately presented for a time period if the second value is higher than a first threshold, and a second may indicate that feedback is to be immediately presented for a time period if a difference between the first and second values exceeds a threshold.

Feedback determinations can be stored in an awarded-feedback database 518. The stored information can indicate, e.g., the type of feedback to be presented (e.g., specific icons or sounds, an intensity of the feedback, a number of presented visual or audio signals, etc.), start and stop times for feedback presentations, conditions for feedback presentations, events that led to the feedback, where feedback is to be presented (e.g., on a front display of a device, on a schedule display of a device, on an interface tied t the device, etc.).

A feedback presenter 520 can then present the appropriate feedback or coordinate the feedback presentation. For example, feedback presenter 520 can present an icon on a device for an indicated amount of time or can transmit a signal to a device or central server indicating that the feedback is to be presented (e.g., and additional details, such as the type of feedback to be presented, the presentation duration, etc.). In some instances, feedback presenter 520 analyzes current settings, device operations, times, etc. to determine whether and when the feedback is to be presented. For example, in instances in which feedback is to be presented upon detecting that the device is in an away mode (e.g., subsequent to a setting adjustment that adjusted an away-associated setting), feedback presenter 520 can detect when the device has entered the away mode and thereafter present the feedback.

Figure 7A:
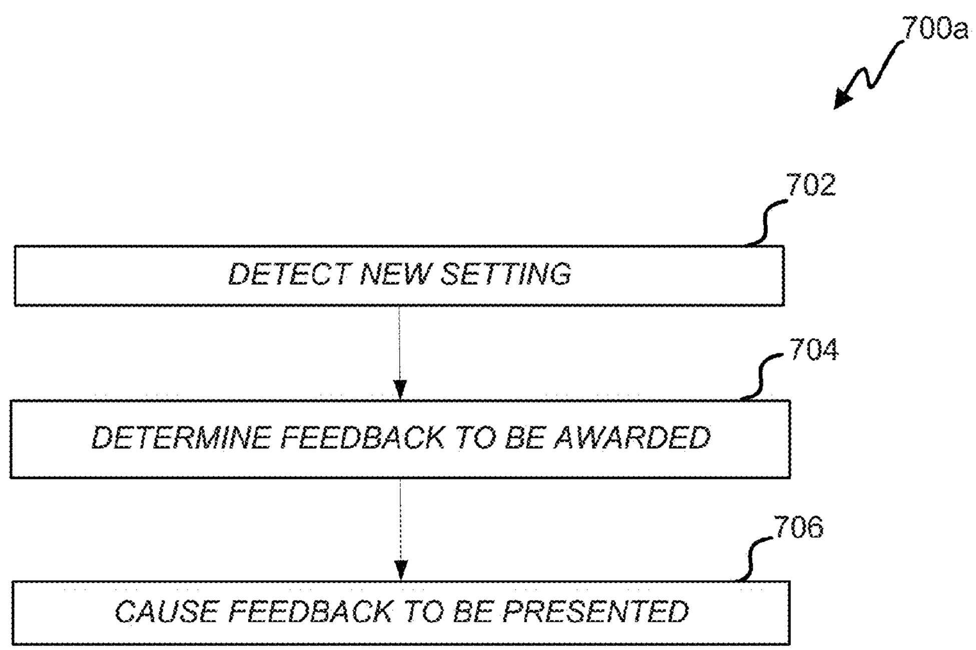
FIGS. 7A-7G illustrate flowcharts for processes of causing device-related feedback to be presented in accordance with an embodiment of the invention.

FIGS. 7A-7F illustrates a flowchart for processes 700*a*-700*f* of causing device-related feedback to be presented in accordance with an embodiment of the invention. In FIG. 7A, at block 702, a new setting is detected. The new setting can include a setting input by a user (e.g., detected by input monitor 502) or a learned setting (e.g., identified by scheduling engine 504 based on user inputs or usage patterns). The new setting can include a new setting not tied to an old setting or an adjustment of an old setting. The new setting can cause an immediate, delayed or long-term consequence.

At block 704, feedback to be awarded is determined (e.g., by feedback-criteria assessor 514). The determination can involve determining whether feedback is to be presented, the type of feedback to be presented and/or when the feedback is to be presented. The determination can involve assessing one or more feedback criteria.

Upon determining that feedback is to be provided, the feedback is caused to be presented (e.g., by feedback presenter 520) at block 06. In some instances, the feedback is visually or audibly presented via a device or via an interface. In some instances, a signal is transmitted (e.g., to a device or central server) indicating that the feedback is to be presented via the device or via an interface controlled by the central server.

Figure 7B:
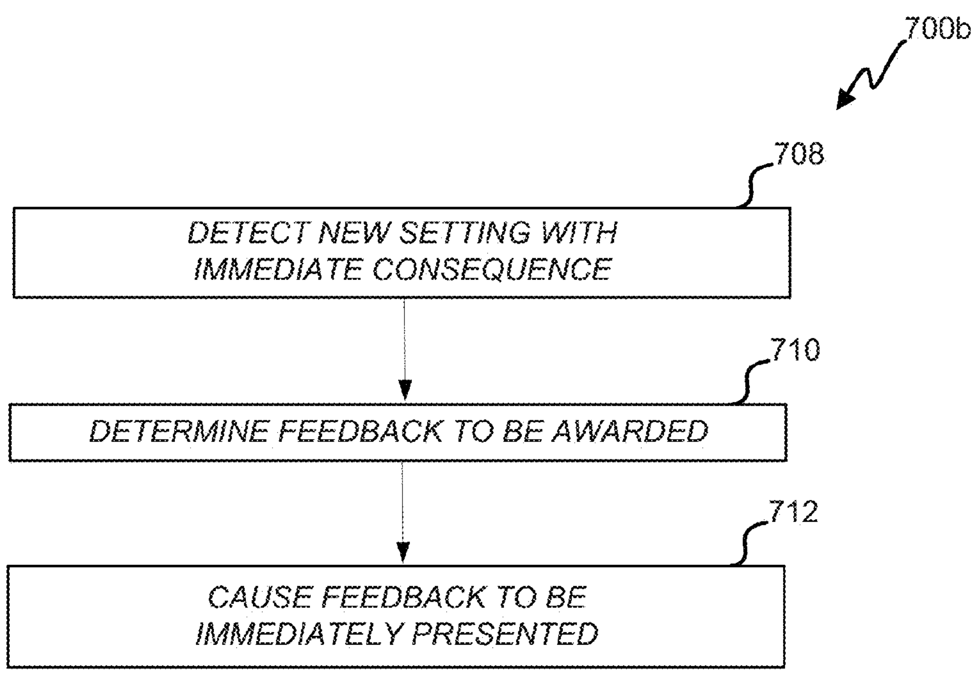

Processes 700*b*-700*f* illustrate specific implementations or extensions of process 700*a*. In FIG. 7B, the detected new setting has an immediate consequence (e.g., immediately changing a setpoint temperature). Thus, at block 712, the feedback can be caused to be presented immediately.

Figure 7C:
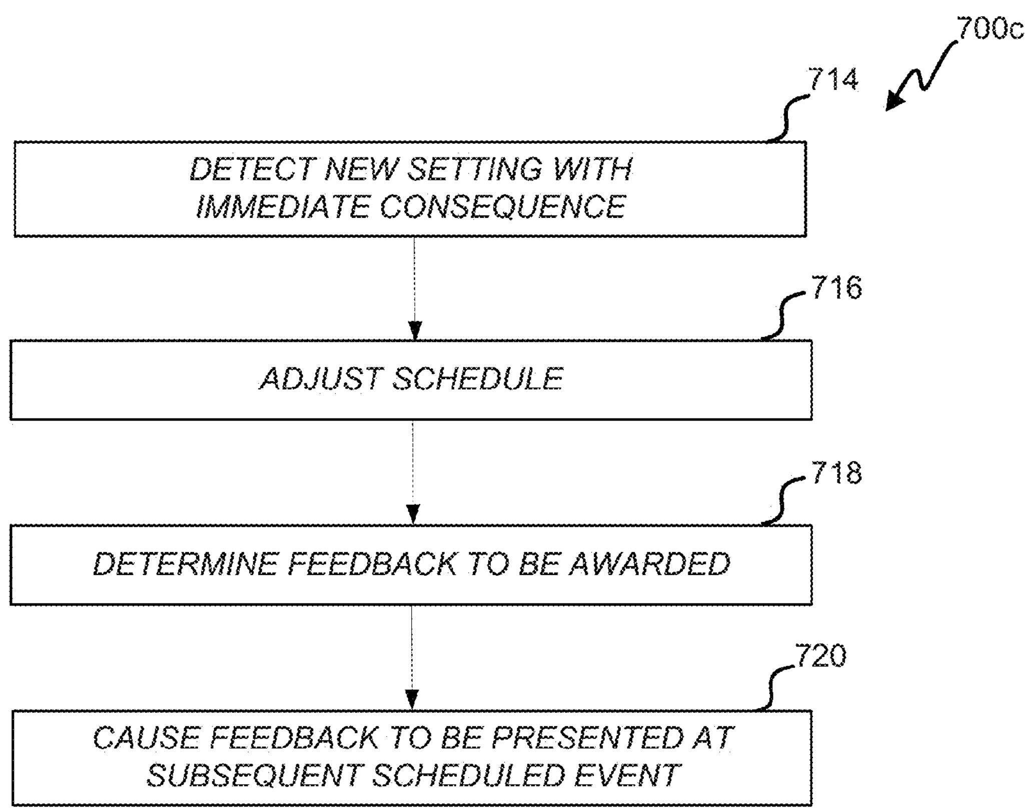

In FIG. 7C, the new setting with an immediate consequence causes a learned schedule to be adjusted at block 716. Thus, at block 720, the feedback can be caused to be presented at and/or during one or more subsequent scheduled events. For example, a user can raise a setpoint temperature from 74 to 76 degrees at 8 pm, causing a schedule to correspondingly adjust a nighttime setpoint temperature. The feedback may then be presented during subsequent nights upon entry of the nighttime time period.

Figure 7D:
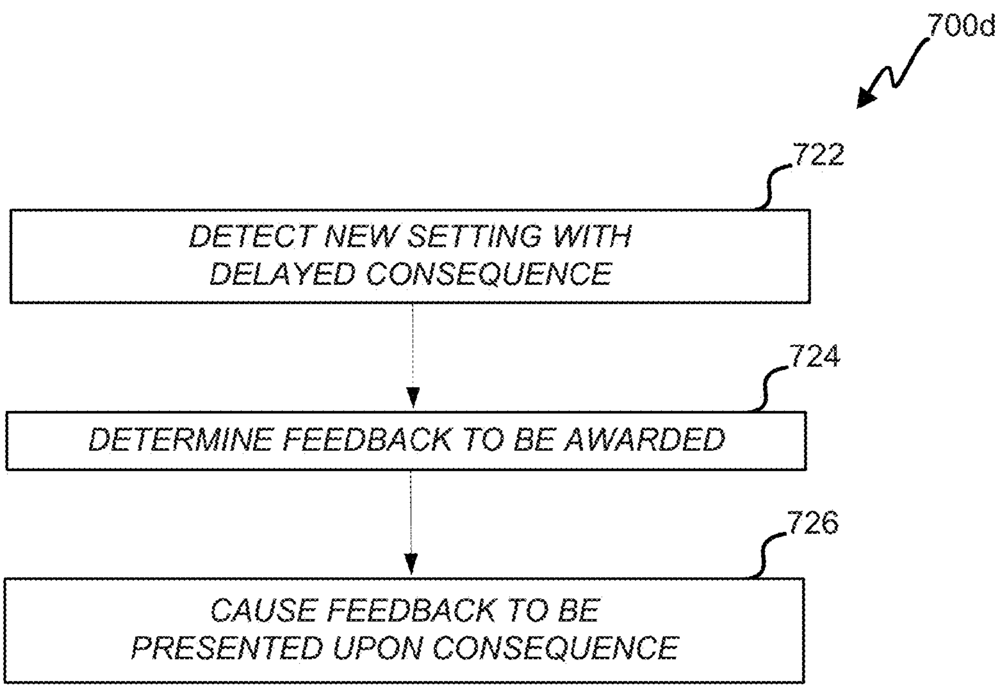

In FIG. 7D, the detected setting has a delayed consequence. For example, a user can set a schedule setting or a user can set a threshold (e.g., influencing when or how a device should operate). At block 726, the feedback can be caused to be presented upon the delayed consequence. In some instances, feedback is also caused to be presented immediately to indicate to the user an effect or responsibility of the new setting.

Figure 7E:
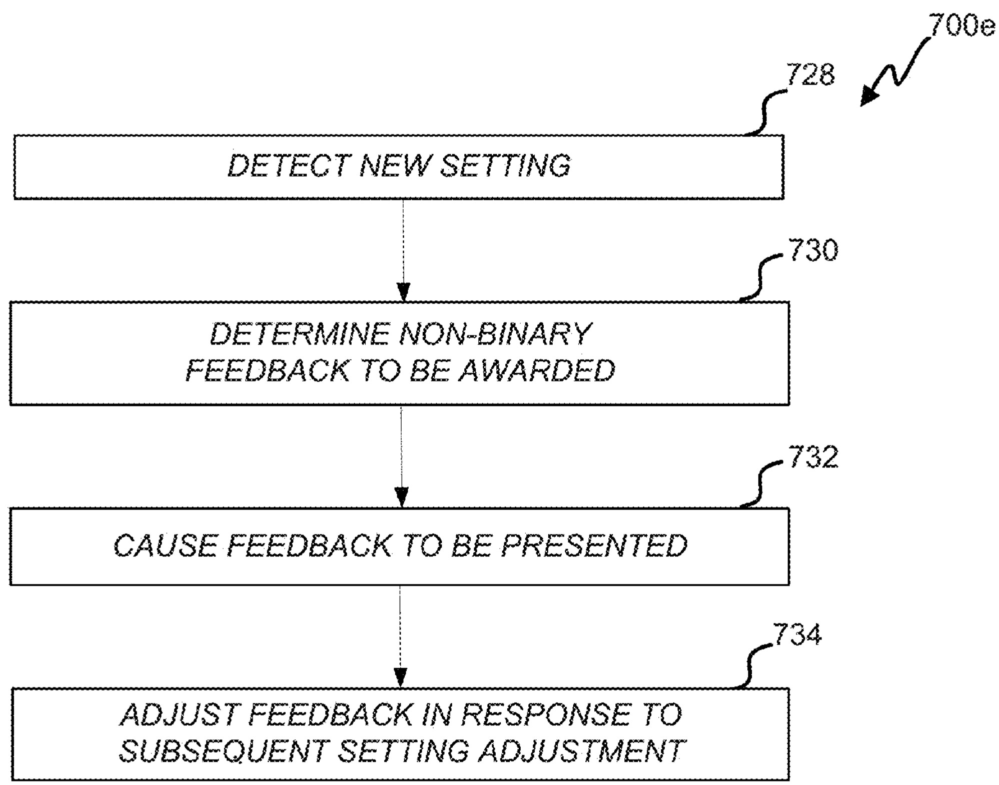

In FIG. 7E, at block 730, it is determined whether and what kind of non-binary feedback to award at block 730. For example, rather than determining whether a signal (e.g., an icon or tone) should or shouldn't be presented, the determination can involve determining an intensity of the signal or a number of signals to be presented. Then, at block 734, the feedback can be dynamically adjusted in response to subsequent setting adjustments.

As a specific illustration, the feedback intensity can depend on how close the new setting is to a threshold or based on a magnitude of a change in the setting. Thus, if, e.g., a temperature setting begins at 72.2 degrees and the user adjusts it to 72.4 degrees, a faded icon can appear. As the user continues to raise the temperature setting, the icon can grow in intensity. Not only does the non-binary feedback provide richer feedback to the user, but it can reduce seeming inconsistencies. For example, if a user's display rounds temperature values to the nearest integer, and a strict feedback criteria requires the temperature be raised by two degrees before feedback is presented, the user may be confused as to why the icon only sometimes appears after adjusting the temperature from "72" to "74" degrees, wherein the inconsistency is explained because the adjustment may or may not actually account for an adjustment of 2.0 or more degrees.

Figure 7F:
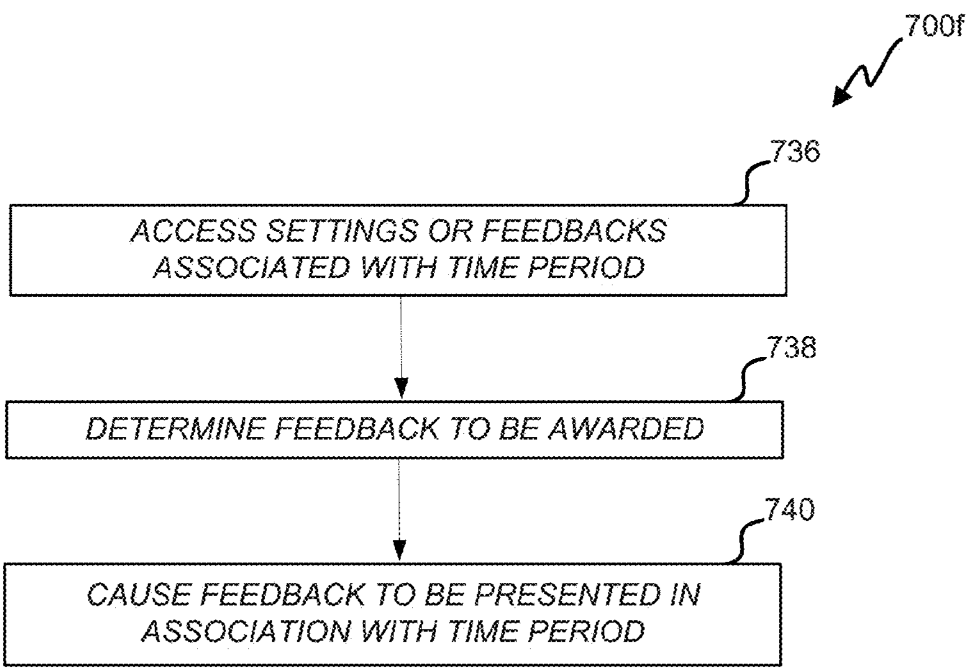

In FIG. 7F, feedback is not tied only to a single adjustment but to a time period. At block 736, settings or feedbacks associated with a time period (e.g., a day) are accessed. At block 738, it is determined whether feedback is to be awarded (and/or the type of feedback to be awarded). The determination can involve, e.g., assessing the types or degrees or feedback associated with the time period. For example, a daily positive feedback can be awarded upon a determination that positive feedback was presented for a threshold amount of time (e.g., two or more hours) over the course of the day. At block 740, feedback is caused to be presented in association with the time period. For example, a visual icon can be presented near a day's representation on a calendar.

Figure 7G:
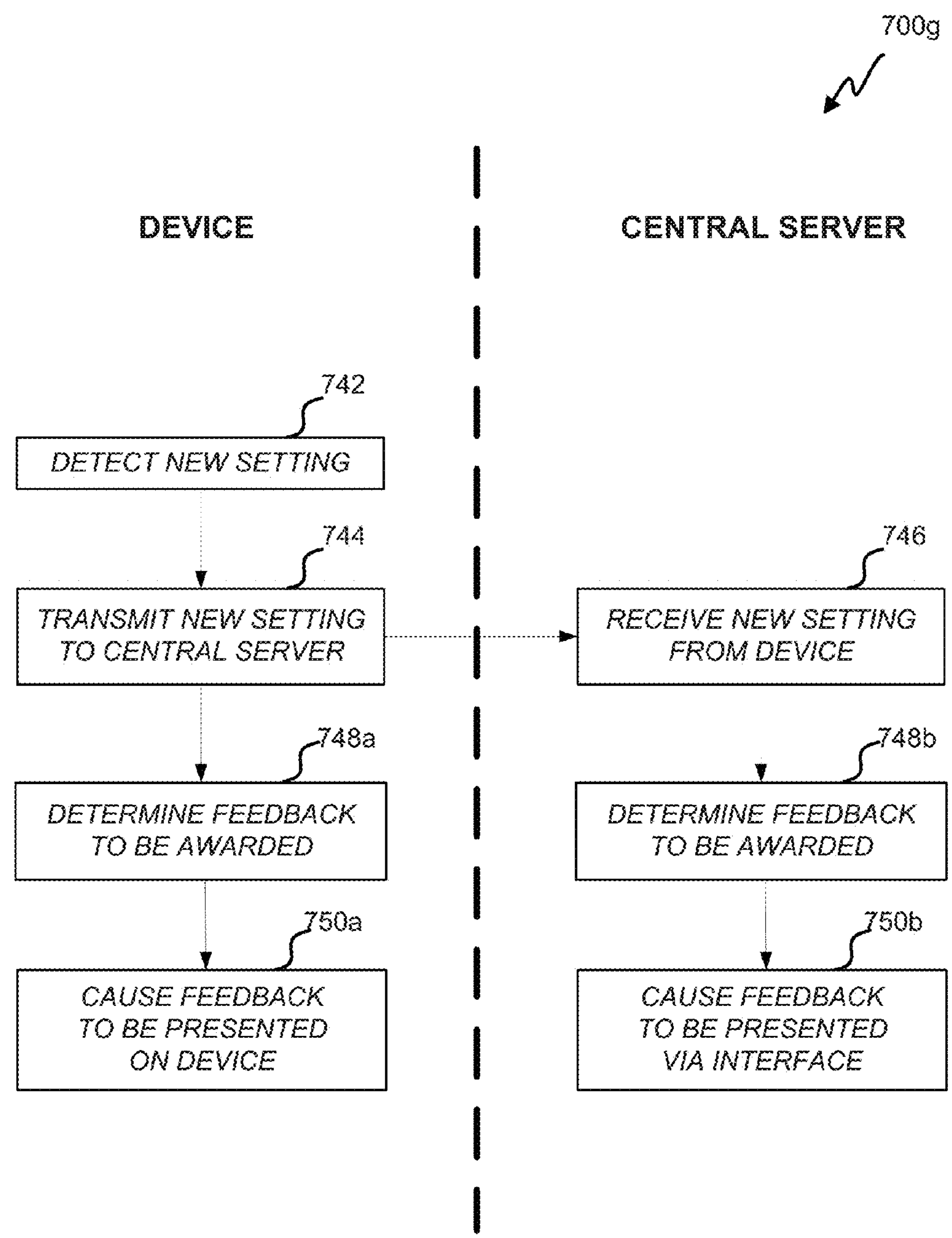

In some instances, a user can interact with a system at multiple points. For example, a user may be able to adjust a setting and/or view settings (i) at the local user interface of a device itself, and (ii) via a remote interface, such as a web-based or app-based interface (hereinafter "remote interface"). If a user adjusts a setting at one of these points, feedback can be presented, in some embodiments, at both points. FIG. 7G illustrates a process for accomplishing this objective. At block 742, a device (e.g., a thermostat) detects a new setting (e.g., based on a user adjustment). At block 744, the device transmits the new setting to a central server (e.g., controlling an interface, such as a web-based or app-based interface). The transmission may occur immediately upon detection of the setting or upon determining that an interface-based session has been initiated or is ongoing.

The central server receives the new setting at block 746. Then both the device and the central server determine whether feedback is to be awarded (at blocks 748*a* and 748*b*). The determination can be based on a comparison of the new setting to one or more criteria (e.g., evaluating the one or more criteria in view of the new setting). If feedback is to be awarded, the device and central server cause feedback to be presented (at blocks 750*a* and 750*b*) both at the device and via the interface. It will be appreciated that a converse process is also contemplated, in which a new setting is detected at transmitted from the central server and received by the device. It will further be appreciated that process 700*g* can be repeated throughout a user's adjustment of an input component causing corresponding setting adjustments.

According to one embodiment that stands in contrast to that of FIG. 7G, the decision about whether to display the feedback is made or "owned" by the local device itself, with all relevant feedback-triggering thresholds being maintained by the local device itself. This can be particularly advantageous for purposes of being able to provide immediate time-critical feedback (including the "fading leaf" effect) just as the user's adjustments are crossing the meaningful thresholds as they control the local device. In addition to offloading central server from this additional computing responsibility, undesired latencies that might otherwise occur if the central server "owned" the decision are avoided. For cases in which the local device "owns" the feedback display decision, one issue arises for cases in which a remote device, such as a smartphone, is being used to remotely adjust the relevant setting on the local device, because there may be a substantial latency between the time the local device has triggered the feedback display decision and the time that a corresponding feedback display would actually be shown to the remote user on the remote device. Thus, in the case of a thermostat, it could potentially happen that the remote user has already turned the setpoint temperature to a very responsible level, but because the feedback did not show up immediately, the user is frustrated and may feel the need to continue to change the setpoint temperature well beyond the required threshold. According to one embodiment, this scenario is avoided by configuring the thermostat to upload the feedback-triggering decision criteria (such as temperature thresholds needed to trigger a "leaf" display) to the remote device in advance of or at the outset of the user control interaction. In this way, the remote device will "decide for itself" whether to show the feedback to the user, and will not wait for the decision to be made at the local device, thereby avoiding the display latency and increasing the immediacy of user feedback, thereby leading to a more positive user experience.

According to another embodiment, in one variant of the process of FIG. 7G, the device could transmit an instruction to present the feedback rather than transmitting the new setting. However, an advantage of process 700*g* is that the central server then has access to the actual setting, such that if a user later adjusts the setting via the interface, the central server can quickly determine whether additional feedback is to be awarded. Thus, both the device and central server have access to user settings, which are also sufficient to determine whether to award feedback. The user can then receive immediate feedback regarding a setting adjustment regardless of whether the user is viewing the device or an interface and regardless of at which point the adjustment was made.

FIGS. 8A-8F illustrate flowcharts for processes of causing device-related feedback to be presented in response to analyzing thermostat-device settings in accordance with an embodiment of the invention. These processes illustrate how absolute and/or relative criteria can be used when determining whether feedback is to be presented. In these processes, the presented feedback is positive feedback and amounts to a display of a leaf.

Figure 8A:
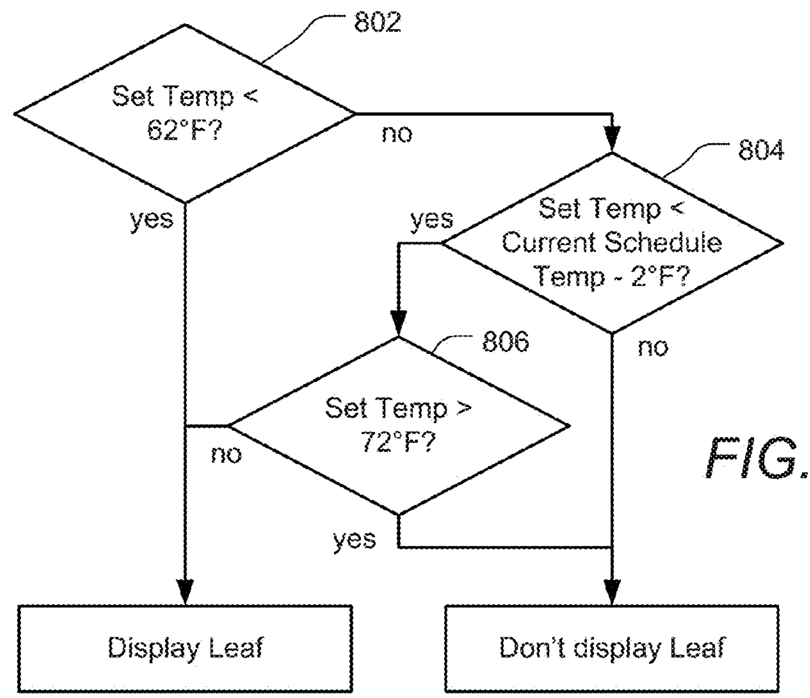
FIGS. 8A-8F illustrate flowcharts for processes of causing device-related feedback to be presented in response to analyzing thermostat-device settings in accordance with an embodiment of the invention.

FIG. 8A illustrates a process for displaying the leaf when heating is active. At block 802, the leaf always shows when the setpoint is below a first absolute threshold (e.g., 62 degrees F.). At block 804, if the setpoint is manually changed by at least a threshold amount (e.g., 2 degrees F.) below the current schedule setpoint, then the leaf is displayed (e.g., for a fixed time interval or until the setpoint is again adjusted), except that a leaf is not displayed if the setpoint is above a second absolute threshold (e.g., 72 degrees F.), according to block 806. Thus, in this embodiment, feedback-criteria assessments involve comparing the new setpoint to absolute thresholds (62 and 72 degrees F.). Further, it involves a relative analysis, in which the assessment involves characterizing a degree by which the new setpoint has changed relative to a setpoint that would have otherwise been in effect (e.g., based on a schedule). The relative analysis can thus involve, e.g., comparing a change in the setpoint to an amount, or comparing the new setpoint to a third threshold value determined based on the current schedule setpoint.

The change can be analyzed by comparing what the setpoint temperature would be had no adjustment been made to what the setpoint temperature is given the change. Thus, identifying the change can involve comparing a newly set current setpoint temperature to a temperature in a schedule that would have determined the current setpoint temperature. The schedule-based comparison can prevent a user from receiving feedback merely due to, e.g., first ramping a setpoint temperature up before ramping it back down. It will be appreciated that similar analysis can also be applied in response to a user's adjustment to a scheduled (non-current) setpoint temperature. In this instance, identifying the change can involve comparing a newly set scheduled setpoint temperature (corresponding to a day and time) to a temperature that would have otherwise been effected at the day and time had no adjustment occurred. Further, while the above text indicates that the setpoint adjustment is a manual adjustment, similar analysis can be performed in response to an automatic change in a setpoint temperature determined based on learning about a user's behaviors.

Figure 8B:
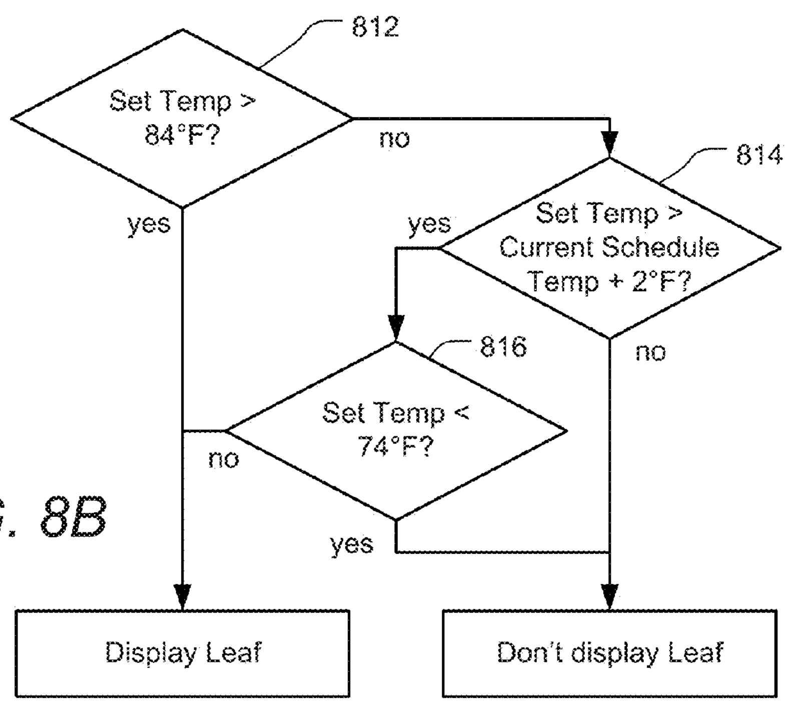

FIG. 8B illustrates a process for displaying the leaf when cooling is active. At block 812, a leaf is always displayed if the setpoint is above a first absolute threshold (e.g., 84 degrees F.). At block 814, the leaf is displayed if the setpoint is manually changed by at least a threshold amount (e.g., 2 degrees F.) above the current schedule setpoint, except that according to block 816, the leaf is not displayed if the setpoint is below a second absolute threshold (e.g., 74 degrees F.).

Figure 8C:
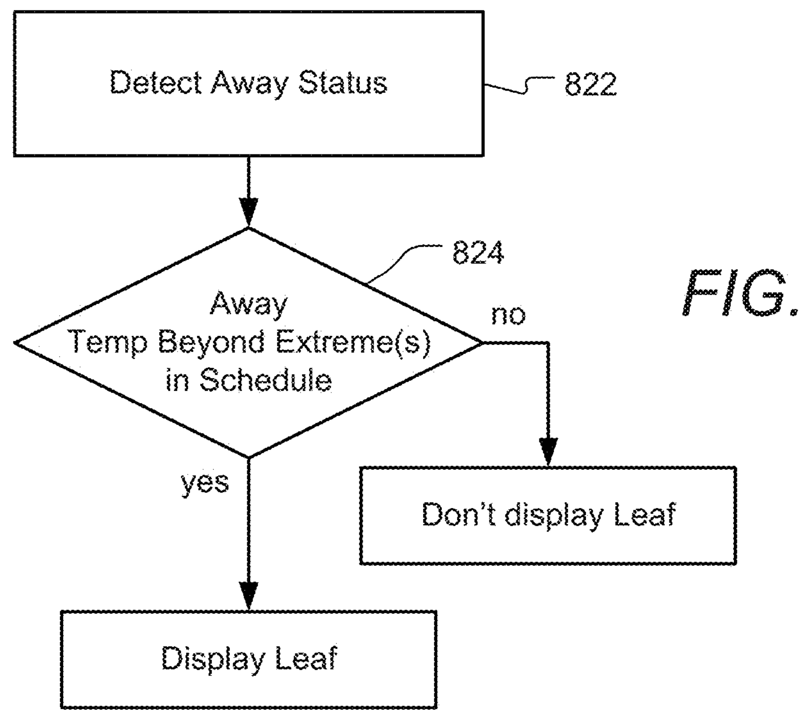

FIG. 8C illustrates a process for displaying the leaf when selecting the away temperatures. At block 822, an away status is detected. For example, a user can manually select an away mode, or the away mode can be automatically entered based on a schedule. An away temperature can be associated with the away mode, such that a setpoint is defined as the away temperature while in the mode. At block 824, the away temperature is compared to extremes in a schedule (e.g., a daily schedule). If the away temperature is beyond an associated extreme (e.g., a heating away temperature that is below all other temperatures in a schedule and/or a cooling away temperature that is above all other temperatures in the schedule), a leaf is displayed.

In some instances, a feedback criterion relates to learning algorithms, in the case such algorithms are being used. For example, in association with an initial setup or a restart of the thermostat, a user can be informed that their subsequent manual temperature adjustments will be used to train or "teach" the thermostat. The user can then be asked to select between whether a device (e.g., a thermostat) should enter into a heating mode (for example, if it is currently winter time) or a cooling mode (for example, if it is currently summer time). If "COOLING" is selected, then the user can be asked to set the "away" cooling temperature, that is, a low-energy-using cooling temperature that should be maintained when the home or business is unoccupied, in order to save energy and/or money. According to some embodiments, the default value offered to the user is set to an away-cooling initial temperature (e.g., 80 degrees F.), the maximum value selectable by the user is set to an away-cooling maximum temperature (e.g., 90 degrees F.), the minimum value selectable is set to an away-cooling minimum temperature (e.g., 75 degrees F.), and a leaf (or other suitable indicator) is displayed when the user selects a value of at least a predetermined leaf-displaying away-cooling temperature threshold (e.g., 83 degrees F.).

If the user selects "HEATING", then the user can be asked to set a low-energy-using "away" heating temperature that should be maintained when the home or business is unoccupied. According to some embodiments the default value offered to the user is an away-heating initial temperature (e.g., 65 degrees F.), the maximum value selectable by the user is defined by an away-heating maximum temperature (e.g., 75 degrees F.), the minimum value selectable is defined by an away-heating minimum temperature (e.g., 55 degrees F.), and a leaf (or other suitable energy-savings-encouragement indicator) is displayed when the user selects a value below a predetermined leaf-displaying away-heating threshold (e.g., 63 degrees F.).

Figure 8D:
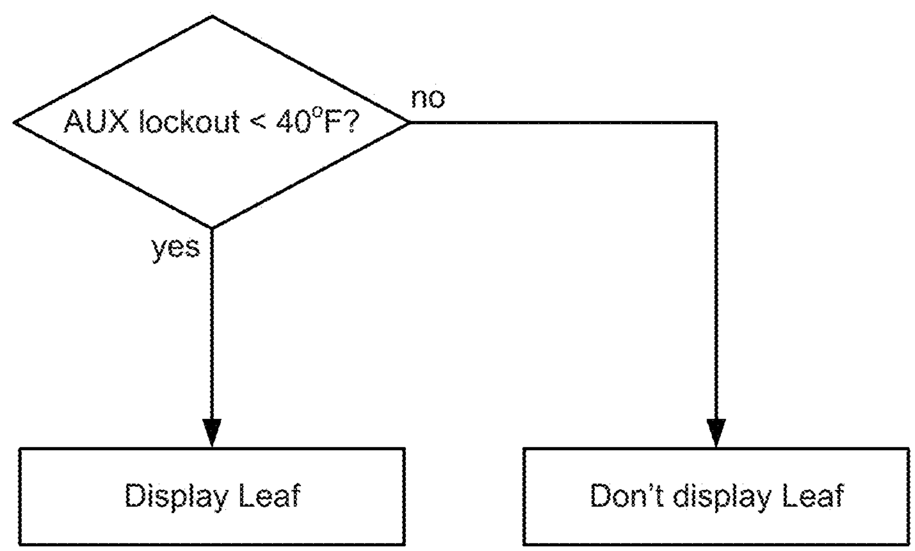
Figure 8E:
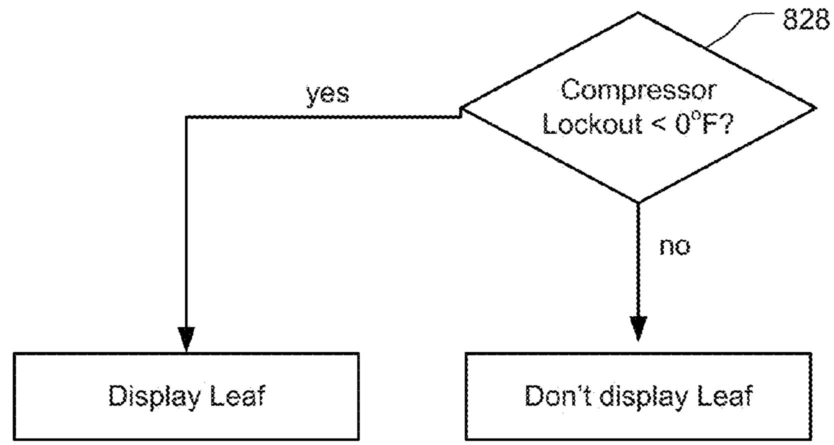

FIGS. 8D and 8E illustrate processes for displaying the leaf when an auxiliary heating (AUX) lockout temperature for a heat pump-based heating system is adjusted. The AUX lockout temperature is a temperature above which a faster but more expensive electrical resistance heater (AUX heater) will be "locked out", that is, not invoked to supplement a slower but more energy efficient heat pump compressor in achieving the target temperature. Because a lower AUX lockout temperature leads to less usage of the resistive AUX heating facility, a lower AUX lockout temperature is generally more environmentally conscious than a higher AUX lockout temperature. According to one embodiment, as illustrated in FIG. 8D, the leaf is displayed if the AUX lockout temperature is adjusted to be below a predetermined threshold temperature, such as 40 degrees F., thereby positively rewarding the user who turns down their AUX lockout temperature to below that level. Referring now to FIG. 8E, a compressor lockout temperature is a temperature below which the heat pump compressor will not be used at all, but instead only the AUX heater will be used. Because a lower compressor lockout temperature leads to more usage of the heat pump compressor, a lower compressor lockout temperature is generally more energy efficient than a higher compressor lockout temperature. Thus, according to the embodiment of FIG. 8E, the leaf is displayed if the compressor lockout temperature is adjusted to be below a predetermined threshold temperature, such as 0 degrees F., thereby positively rewarding the user who turns down their compressor lockout temperature to below that level.

Figure 8F:
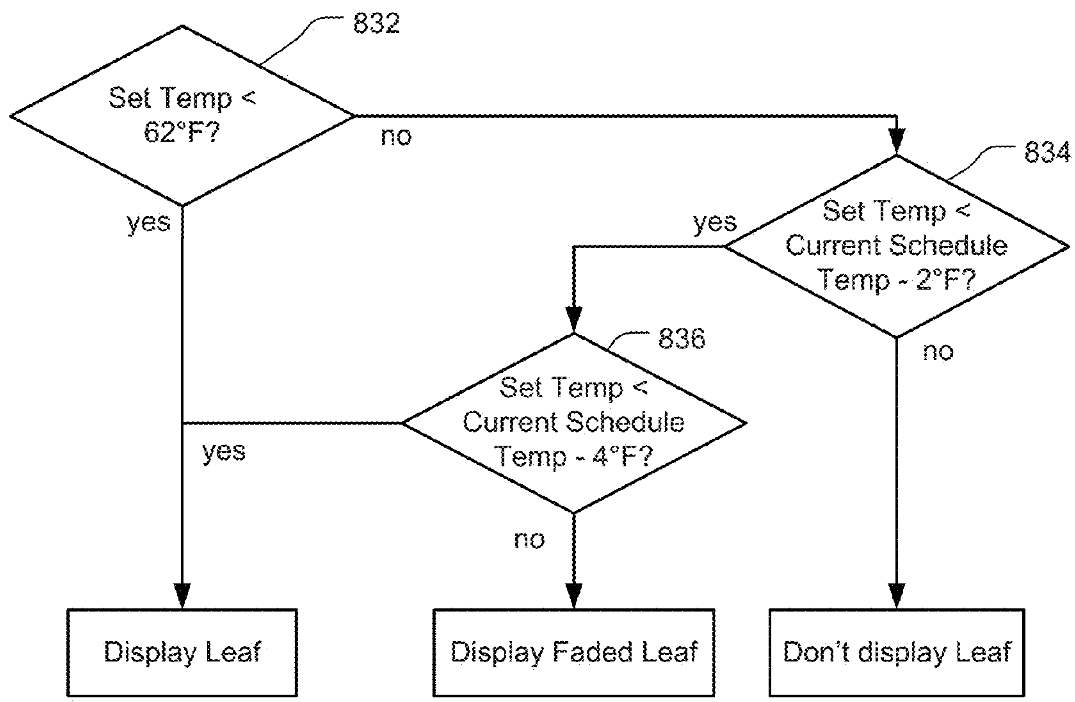

FIG. 8F illustrates a process for displaying a dynamically fading/brightening leaf in a manner that encourages and, in many ways, "coaxes" the user into actuating a continuously adjustable dial toward a more energy-conserving value. At block 832, a leaf is always displayed if the setpoint is below a first absolute threshold (e.g., 62 degrees F.). At block 834 and 836, the leaf is displayed if the setpoint is manually set to 4 degrees F. or more below the current schedule setpoint. If the setpoint is not set to at least a first amount (e.g., 2 degrees F.) below the current schedule setpoint, no leaf is presented in accordance with block 834. Meanwhile, if the setpoint is set to be within a range that is at least the first amount but less than a second amount (e.g., 4 degrees F.) below the current schedule setpoint, a faded leaf is presented. Preferably, the analog or continuous intensity of the leaf may depend on the continuous setpoint value, such that a more intense leaf is presented if the setpoint is closer to the second amount (e.g., 4 degrees F.) below the current schedule setpoint and a less intense leaf is presented if the setpoint is closer to the first amount (e.g., 2 degrees F.) below the current schedule setpoint. The intensity can, e.g., linearly depend on the setpoint within the range.

Figure 9:
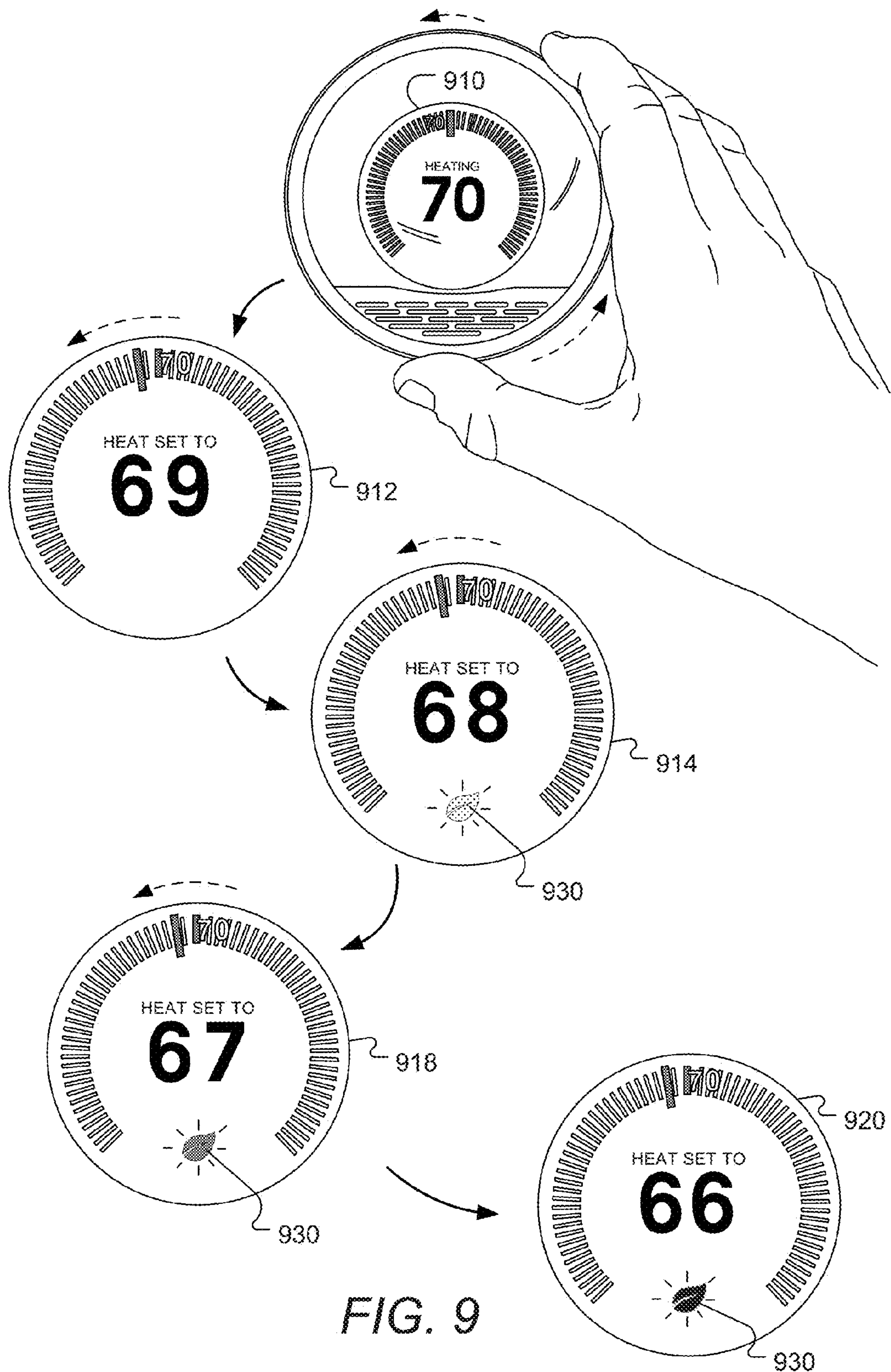
FIG. 9 illustrates series of display screens on a thermostat in which a feedback is slowly faded to on or off, according to some embodiments of the invention.

FIG. 9 illustrates series of display screens on a thermostat in which a feedback is slowly faded to on or off, according to some embodiments of the invention. A thermostat is shown with at a current setpoint of 70 degrees and a current ambient temperature of 70 degrees in screen 910. The user begins to rotate the outer ring counter clockwise to lower the setpoint. In screen 912, the user has lowered the setpoint to 69 degrees. Note that the leaf is not yet displayed. In screen 914 the user has lowered the setpoint to 68 degrees. The adjustment can be sufficient (e.g., more than a threshold adjustment, such as more than a two-degree adjustment, as identified in the illustration of FIG. 8F) to display leaf icon 930. According to these embodiments, however, the leaf is first shown in a faint color (i.e. so as to blend with the background color). In screen 918, the user continues to turn down the setpoint, now to 67 degrees. Now the leaf icon 930 is shown in a brighter more contrasting color (of green, for example). Finally, if the user continues to turn set the setpoint to a lower temperature (so as to save even more energy), in the case of screen 920 the setpoint is now 66 degrees, leaf icon 930 is displayed in full saturated and contrasting color. In this way the user is given useful and intuitive feedback information that further lowering of the heating setpoint temperature provides greater energy savings.

Thus, FIG. 9 illustrates how feedback can be used to provide immediate feedback, via a device, to a user about the responsibility of their setting adjustments. FIGS. 10A-10C illustrate instances in which feedback can be provided via a device and can be associated with non-current actions. At judiciously selected times (for example, on the same day that the monthly utility bill is e-mailed to the homeowner), or upon user request, or at other times including random points in time, the a thermostat device 1000 displays information on its visually appealing user interface that encourages reduced energy usage. In one example shown in FIG. 10A, the user is shown a message of congratulations regarding a particular energy-saving (and therefore money-saving) accomplishment they have achieved for their household. Positive feedback icons (e.g., including pictures or symbols, such as leaf icons 1002) can be simultaneously presented to evoke pleasant feelings or emotions in the user, thus providing positive reinforcement of energy-saving behavior.

FIG. 10B illustrates another example of an energy performance display that can influence user energy-saving behavior, comprising a display of the household's recent energy use on a daily basis (or weekly, monthly, etc.) and providing a positive-feedback leaf icon 1002 for days of relatively low energy usage. For another example shown in FIG. 10C, the user is shown information about their energy performance status or progress relative to a population of other device owners who are similarly situated from an energy usage perspective. It has been found particularly effective to provide competitive or game-style information to the user as an additional means to influence their energy-saving behavior. As illustrated in FIG. 10B, positive-feedback leaf icons 1002 can be added to the display if the user's competitive results are positive. Optionally, the leaf icons 1002 can be associated with a frequent flyer miles-type point-collection scheme or carbon credit-type business method, as administered for example by an external device data service provider such there is a tangible, fiscal reward that is also associated with the emotional reward.

Figure 11A:
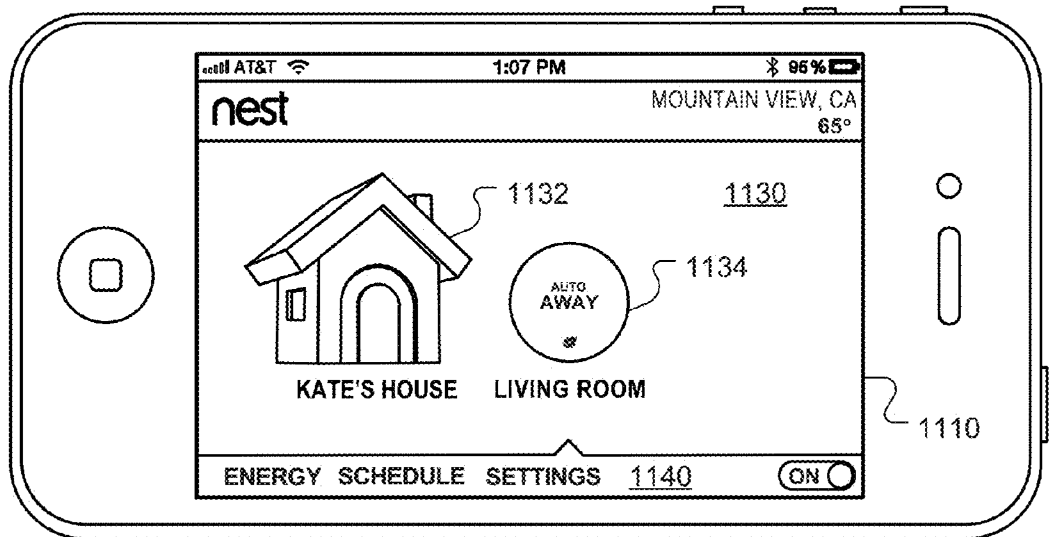
FIGS. 11A-11E illustrate instances in which feedback can be provided via an interface tied to a device and can be associated with non-current actions.

FIGS. 11A-11E illustrate instances in which feedback can be provided via an interface tied to a device and can be associated with non-current actions. Specifically, FIGS. 11A-11E illustrate aspects of a graphical user interface on a portable electronic device 266 configured to provide feedback pertaining to responsible usage of a thermostat device controlling operation of a heating, ventilation and air conditioning (HVAC) system. In FIG. 11A, portable electronic device 266 has a large touch sensitive display 1110 on which various types of information can be shown and from which various types of user input can be received. A main window area 1130 shows a house symbol 1132 with the name assigned in which thermostat is installed. A thermostat symbol 1134 is also displayed along with the name assigned to the thermostat. The lower menu bar 1140 has an arrow shape that points to the symbol to which the displayed menu applies. In the example shown in FIG. 11A, the arrow shape of menu 1140 is pointed at the thermostat symbol 1134, so the menu items, namely: Energy, Schedule, and Settings, pertain to the thermostat named "living room."

Figure 11B:
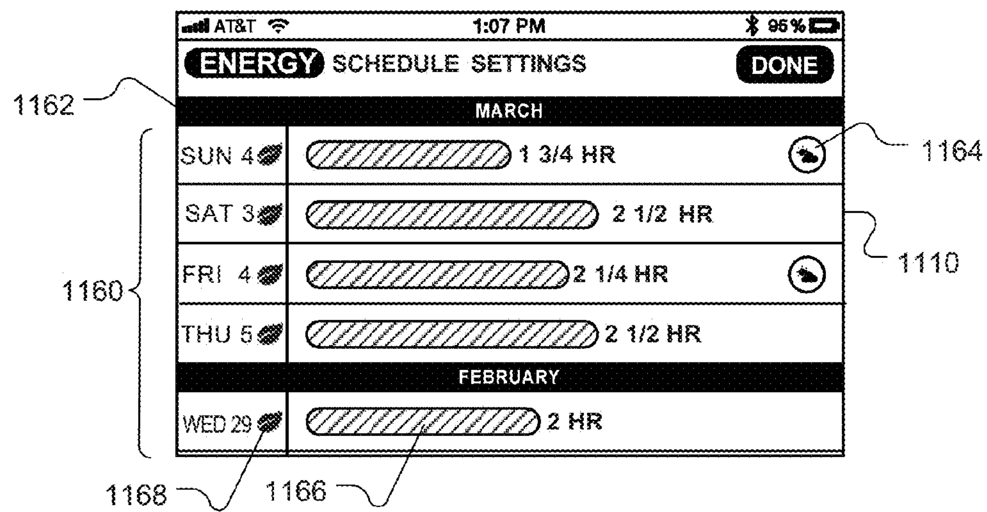

When the "Energy" menu option of selected from menu 1140 in FIG. 11A by the user, the display 1110 transitions to that shown in FIG. 11B. A central display area 1160 shows energy related information to the user in a calendar format. The individual days of the month are shown below the month banners, such as banner 1162, as shown. For each day, a length of a horizontal bar, such as bar 1166, and a number of hours is used to indicate to the user the amount of energy used and an activity duration on that day for heating and/or cooling. The bars can be colored to match the HVAC function such as orange for heating and blue for cooling.

FIG. 11B also shows two types of feedback icons. One icon is a daily positive-feedback icon 1168, which is shown as a leaf in this instance. Daily positive-feedback icon 1168 is presented in association with each day in which a user's behavior was determined to be generally responsible throughout the day. For example, daily positive-feedback icon 1168 may be presented when a user performed a threshold number of responsible behaviors (e.g., responsibly changing a setting) or when a user maintained energy-conscious settings for a threshold time duration (e.g., lowering a heating temperature to and maintaining the temperature at the lowered value for a given time interval). In some instances, daily positive-feedback icon 1168 is tied to presentations of an instantaneous feedback icon. For example, an instantaneous feedback icon can be presented immediately after a user adjusted a setting to result in an immediate consequence or can be presented after a setting adjustment takes effect. Daily positive-feedback icon 1168 can be presented if the instantaneous feedback icon was presented for at least a threshold time duration during the day.

Also shown on the far right side of each day is a responsibility explanation icon 1164 which indicates the determined primary cause for either over or under average energy usage for that day. According to some embodiment, a running average is used for the past seven days for purposes of calculating whether the energy usage was above or below average. According to some embodiments, three different explanation icons are used: weather (such as shown in explanation icon 1164), users (people manually making changes to thermostat's set point or other settings), and away time (either due to auto-away or manually activated away modes).

Figure 11C:
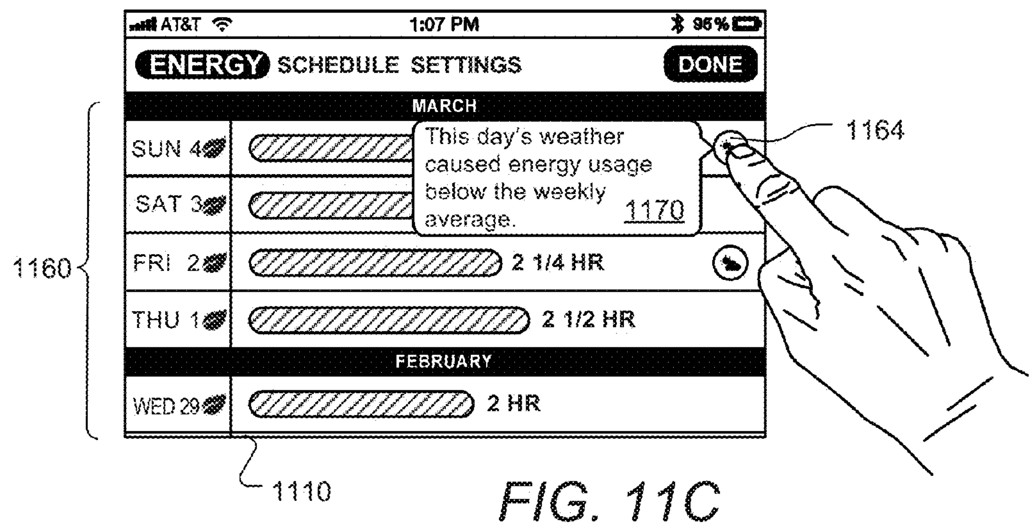

FIG. 11C shows the screen of FIG. 11B where the user is asking for more information regarding explanation icon 1164. The user can simply touch the responsibility symbol to get more information. In the case shown in FIG. 11C, the pop up message 1170 indicates to the user that the weather was believed to be primarily responsible for causing energy usage below the weekly average.

Figure 11D:
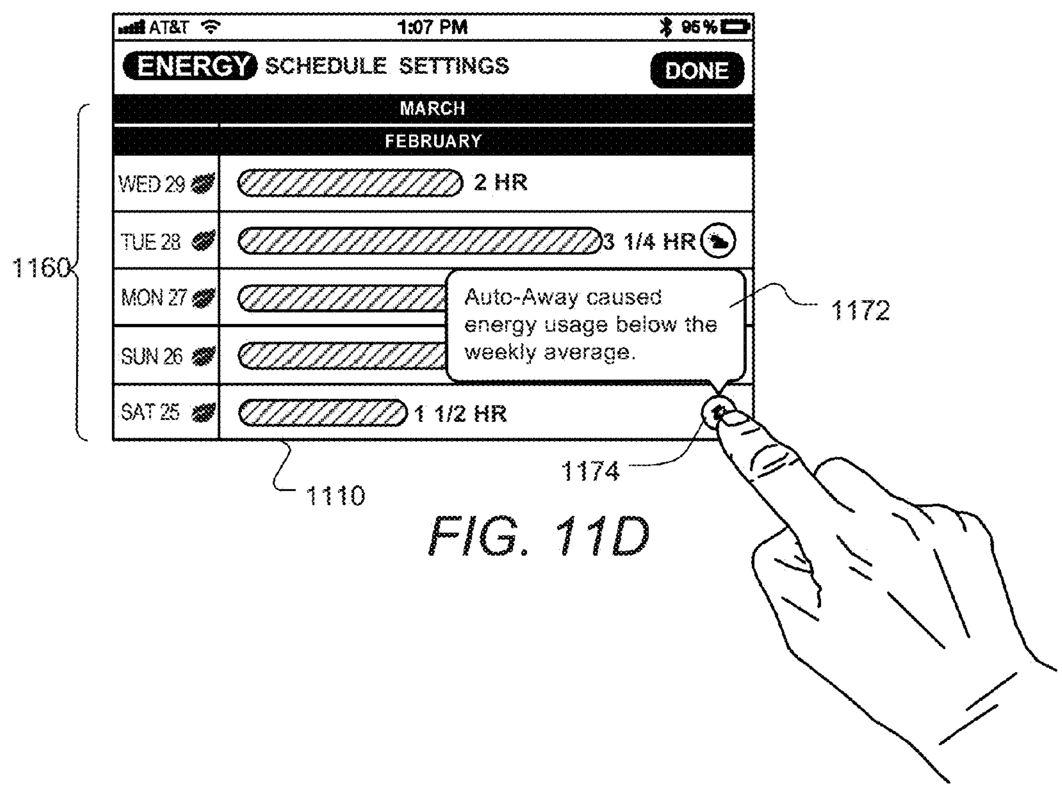

FIG. 11D shows another example of a user inquiring about a responsibility icon. In this case, the user has selected an "away" symbol 1174 which causes the message 1172 to display. Message 1172 indicates that the auto-away feature is primarily responsible for causing below average energy use for that day.

Figure 11E:
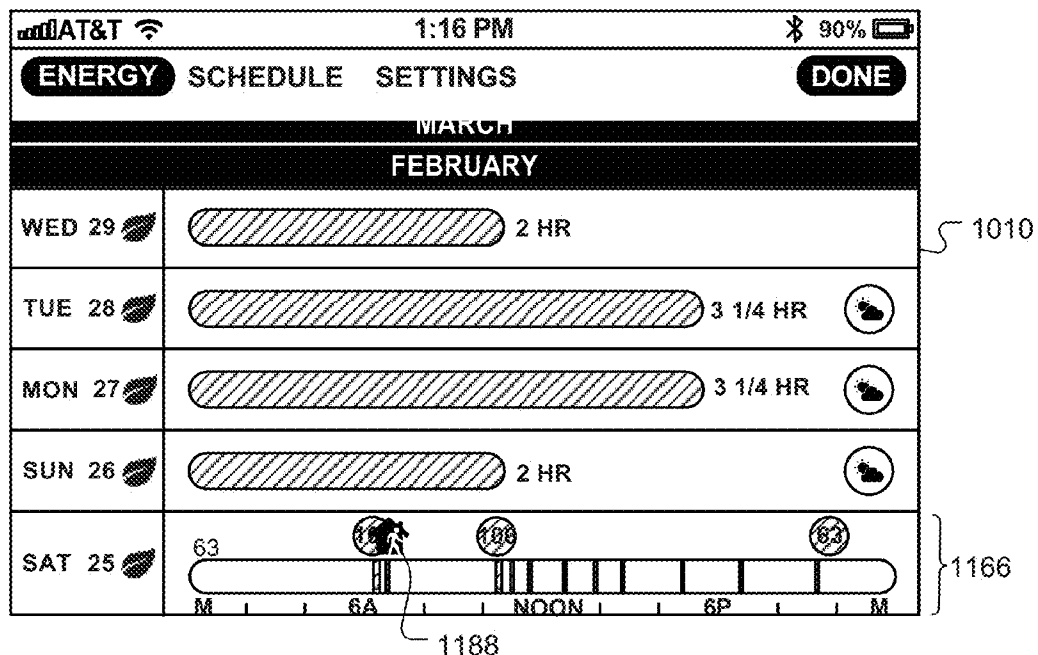

According to some embodiments, further detail for the energy usage throughout any given day is displayed when the user requests it. When the user touches one of the energy bar symbols, or anywhere on the row for that day, a detailed energy usage display for that day is activated. In FIG. 11E the detailed energy information 1186 for February 25$^{th}$ is displayed in response to the user tapping on that day's area. The detailed display are 1180 includes a time line bar for the entire day with hash marks or symbols for each two hours. The main bar 1182 is used to indicate the times during the day and duration of each time the HVAC function was active (in this case single stage heating). The color of the horizontal activity bar, such as bar 1186 matches the HVAC function being used, and the width of the activity bar corresponds to the time of day during which the function was active. Above the main timeline bar are indicators such as the set temperature and any modes becoming active such as an away mode (e.g. being manually set by a user or automatically set by auto-away). The small number on the far upper left of the timeline indicates the starting set point temperature (i.e. from the previous day). The circle symbols such as symbol 1184 indicate the time of day and the temperature of a set point change. The symbols are used to indicate both scheduled setpoints and manually change setpoints.

Feedback can be associated with various portions of the timeline bar. For example, a leaf can be displayed above the time bar at horizontal locations indicating times of days in which responsible actions were performed. In FIG. 11E, an away icon 1188 is used to indicate that the thermostat went into an away mode (either manually or under auto-away) at about 7 AM.

FIG. 12 shows an example of an email 1210 that is automatically generated and sent to users to report behavioral patterns, such as those relating to energy consumption, according to some embodiments. Area 1230 gives the user an energy usage summary for the month. In this calculations indicate that 35% more energy was used this month versus last month. Bar symbols are included for both cooling and heating for the current month versus the past month. The bars give the user a graphical representation of the energy, including different shading for the over (or under) user versus the previous month.

Area 1240 indicates responsibility feedback information. In this instance, leafs are identified as positive "earned" feedbacks. In some instances, a user has the opportunity to earn one or more fixed number of earned feedbacks within a time period. For example, a user can have the opportunity to earn one feedback per day, in which case, the earned feedbacks can be synonymous with daily feedbacks. In some instances, the earned credits are tied to a duration of time or a number of times that an instantaneous feedback is presented (e.g., such that one earned feedback is awarded upon detecting that the instantaneous feedback has been consecutively or non-consecutively presented for a threshold cumulative time since the last awarded earned feedback).

For the depicted report, the user earned a total of 46 leafs overall (since the initial installation), each leaf being indicative of a daily positive feedback. A message indicates how the user compares to the average user. A calendar graphic 1242 shows the days (by shading) in which a leaf was earned. In this case leafs were earned on 12 days in the current month.

Figure 13A:
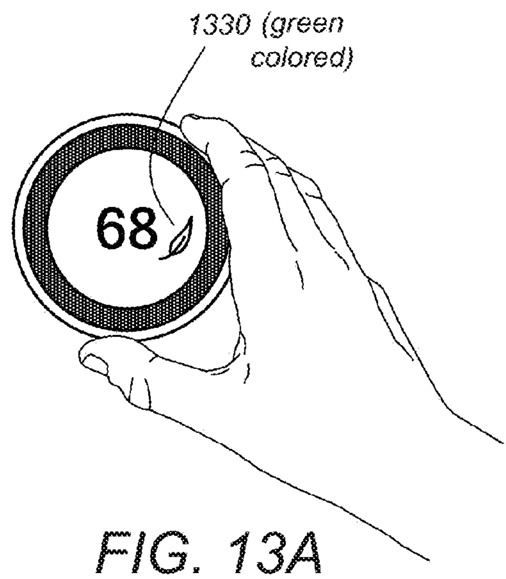
FIGS. 13A-13D illustrate a dynamic user interface of a thermostat device in which negative feedback can be presented according to an embodiment of the invention.
Figure 13B:
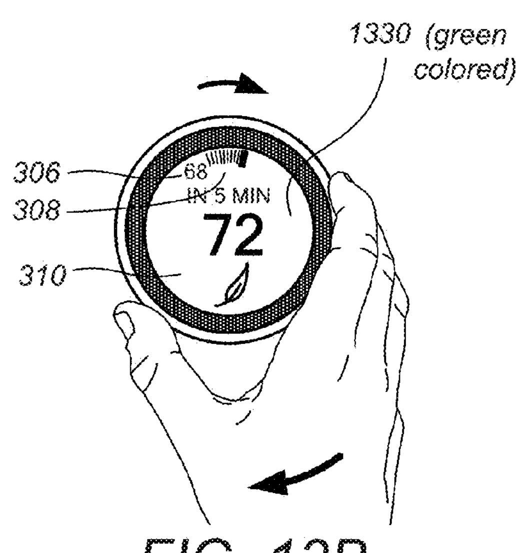
Figure 13C:
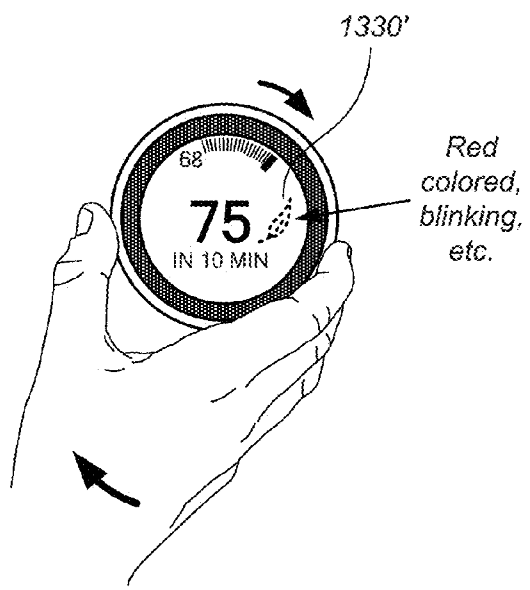
Figure 13D:
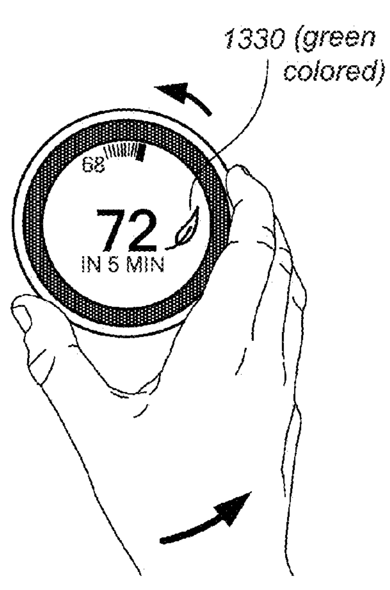

It will be appreciated that feedback need not necessarily be positive. Images, colors, intensities, animation and the like can further be used to convey negative messages indicating that a user's behaviors are not responsible. FIGS. 13A-13D illustrate a dynamic user interface of a thermostat device in which negative feedback can be presented according to an embodiment of the invention. Where, as in FIG. 13A, the heating setpoint is currently set to a value known to be within a first range known to be good or appropriate for energy conservation, a pleasing positive-reinforcement icon such as the green leaf 1330 is displayed. As the user turns up the heat (see FIG. 13B), the green leaf continues to be displayed as long as the setpoint remains in that first range. However, as the user continues to turn up the setpoint to a value greater than the first range (see FIG. 13C), there is displayed a negatively reinforcing icon indicative of alarm, consternation, concern, or other somewhat negative emotion, such icon being, for example, a flashing red version 1330' of the leaf, or a picture of a smokestack, or the like. It is believed that the many users will respond to the negatively reinforcing icon 1330' by turning the set point back down. As illustrated in FIG. 13D, if the user returns the setpoint to a value lying in the first range, they are "rewarded" by the return of the green leaf 1330. Many other types of positive-emotion icons or displays can be used in place of the green leaf 1330, and likewise many different negatively reinforcing icons or displays can be used in place of the flashing red leaf 1330', while remaining within the scope of the present teachings.

Figure 14A:
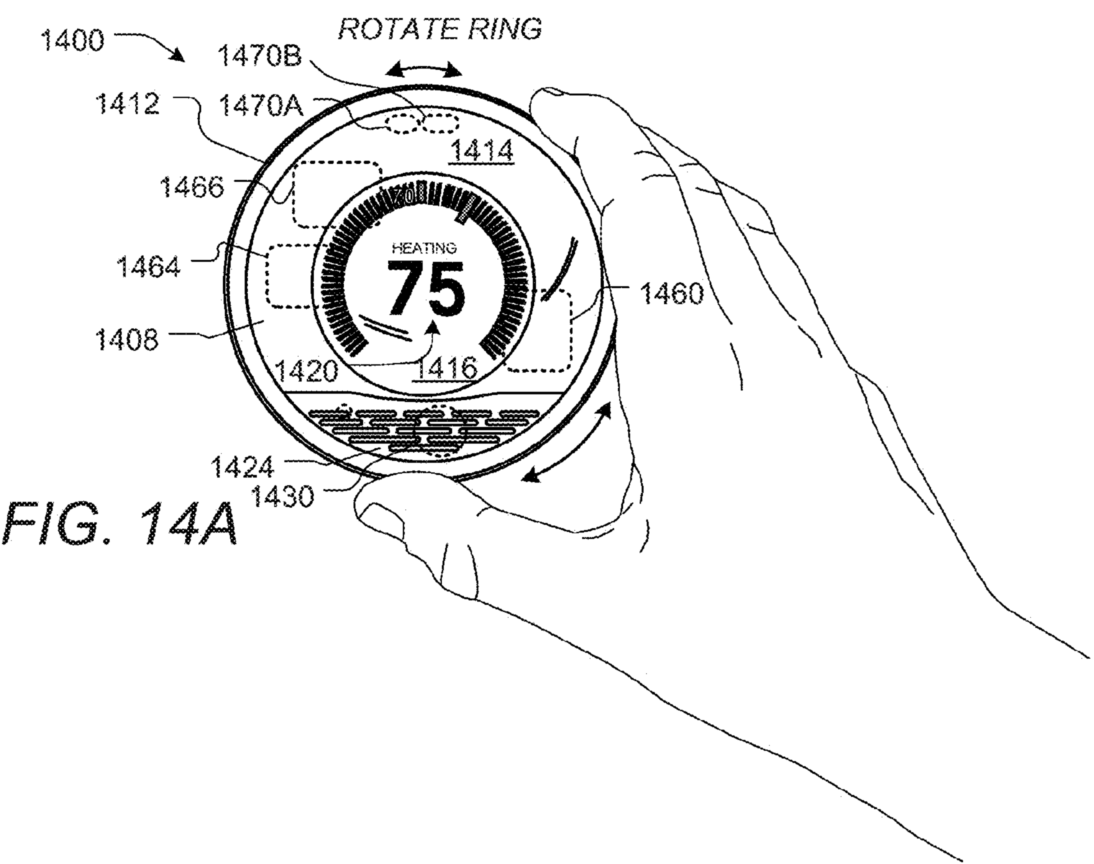
FIGS. 14A-14B illustrate one example of a thermostat device 1400 that may be used to receive setting inputs, learn settings and/or provide feedback related to a user's responsibility.
Figure 14B:
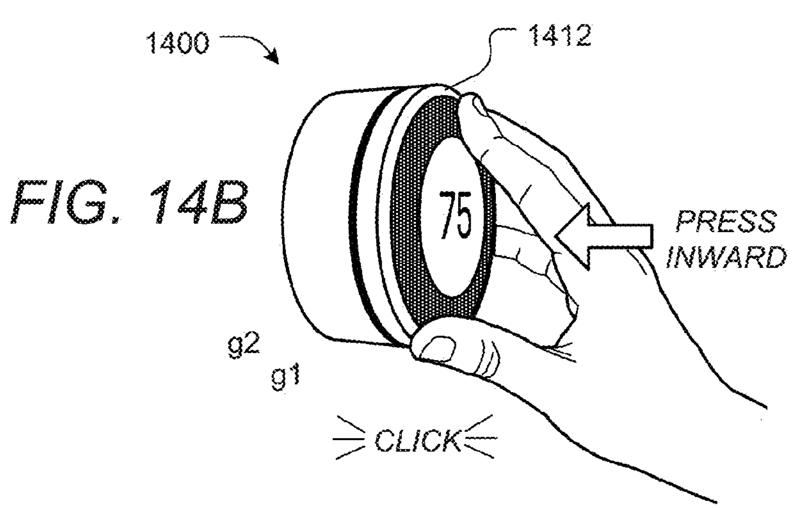

FIGS. 14A-14B illustrate one example of a thermostat device 1400 that may be used to receive setting inputs, learn settings and/or provide feedback related to a user's responsibility. The term "thermostat" is used to represent a particular type of VSCU unit (Versatile Sensing and Control) that is particularly applicable for HVAC control in an enclosure. As used herein the term "HVAC" includes systems providing both heating and cooling, heating only, cooling only, as well as systems that provide other occupant comfort and/or conditioning functionality such as humidification, dehumidification and ventilation. Although "thermostat" and "VSCU unit" may be seen as generally interchangeable for the context of HVAC control of an enclosure, it is within the scope of the present teachings for each of the embodiments hereinabove and hereinbelow to be applied to VSCU units having control functionality over measurable characteristics other than temperature (e.g., pressure, flow rate, height, position, velocity, acceleration, capacity, power, loudness, brightness) for any of a variety of different control systems involving the governance of one or more measurable characteristics of one or more physical systems, and/or the governance of other energy or resource consuming systems such as water usage systems, air usage systems, systems involving the usage of other natural resources, and systems involving the usage of various other forms of energy.

As illustrated, thermostat 1400 includes a user-friendly interface, according to some embodiments. Thermostat 1400 includes control circuitry and is electrically connected to an HVAC system. Thermostat 1400 is wall mounted, is circular in shape, and has an outer rotatable ring 1412 for receiving user input.

Outer rotatable ring 1412 allows the user to make adjustments, such as selecting a new target temperature. For example, by rotating outer ring 1412 clockwise, a target setpoint temperature can be increased, and by rotating the outer ring 1412 counter-clockwise, the target setpoint temperature can be decreased.

A central electronic display 1416 may include, e.g., a dot-matrix layout (individually addressable) such that arbitrary shapes can be generated (rather than being a segmented layout); a combination of a dot-matrix layout and a segmented layout' or a backlit color liquid crystal display (LCD). An example of information displayed on electronic display 1416 is illustrated in FIG. 14A, and includes central numerals 1420 that are representative of a current setpoint temperature. It will be appreciated that electronic display 1416 can display other types of information, such as information identifying or indicating an event occurrence and/or forecasting future event properties.

Thermostat 1400 has a large front face lying inside the outer ring 1412. The front face of thermostat 1400 comprises a clear cover 1414 that according to some embodiments is polycarbonate, and a metallic portion 1424 preferably having a number of slots formed therein as shown. According to some embodiments, metallic portion 1424 has number of slot-like openings so as to facilitate the use of a passive infrared motion sensor 1430 mounted therebeneath. Metallic portion 1424 can alternatively be termed a metallic front grille portion. Further description of the metallic portion/front grille portion is provided in the commonly assigned U.S. Ser. No. 13/199,108, which is hereby incorporated by reference in its entirety for all purposes.

Motion sensing as well as other techniques can be use used in the detection and/or predict of occupancy, as is described further in the commonly assigned U.S. Ser. No. 12/881,430, which is hereby incorporated by reference in its entirety. According to some embodiments, occupancy information is used in generating an effective and efficient scheduled program. Preferably, an active proximity sensor 1470A is provided to detect an approaching user by infrared light reflection, and an ambient light sensor 1470B is provided to sense visible light. Proximity sensor 1470A can be used to detect proximity in the range of about one meter so that the thermostat 1400 can initiate "waking up" when the user is approaching the thermostat and prior to the user touching the thermostat. Ambient light sensor 1470B can be used for a variety of intelligence-gathering purposes, such as for facilitating confirmation of occupancy when sharp rising or falling edges are detected (because it is likely that there are occupants who are turning the lights on and off), and such as for detecting long term (e.g., 24-hour) patterns of ambient light intensity for confirming and/or automatically establishing the time of day.

According to some embodiments, for the combined purposes of inspiring user confidence and further promoting visual and functional elegance, thermostat 1400 is controlled by only two types of user input, the first being a rotation of the outer ring 1412 as shown in FIG. 14A (referenced hereafter as a "rotate ring" or "ring rotation" input), and the second being an inward push on an outer cap 1408 (see FIG. 14B) until an audible and/or tactile "click" occurs (referenced hereafter as an "inward click" or simply "click" input). Upon detecting a user click, new options can be presented to the user. For example, a menu system can be presented, as detailed in U.S. Ser. No. 13/351,668, which is hereby incorporated by reference in its entirety for all purposes. The user can then navigate through the menu options and select menu settings using the rotation and click functionalities.

According to some embodiments, thermostat 1400 includes a processing system 1460, display driver 1464 and a wireless communications system 1466. Processing system 1460 is adapted to cause the display driver 1464 and display area 1416 to display information to the user, and to receiver user input via the rotatable ring 1412. Processing system 1460, according to some embodiments, is capable of carrying out the governance of the operation of thermostat 1400 including the user interface features described herein. Processing system 1460 is further programmed and configured to carry out other operations as described herein. For example, processing system 1460 may be programmed and configured to dynamically determine when to collect sensor measurements, when to transmit sensor measurements, and/or how to present received alerts. According to some embodiments, wireless communications system 1466 is used to communicate with, e.g., a central server, other thermostats, personal computers or portable devices (e.g., laptops or cell phones).

Figure 15:
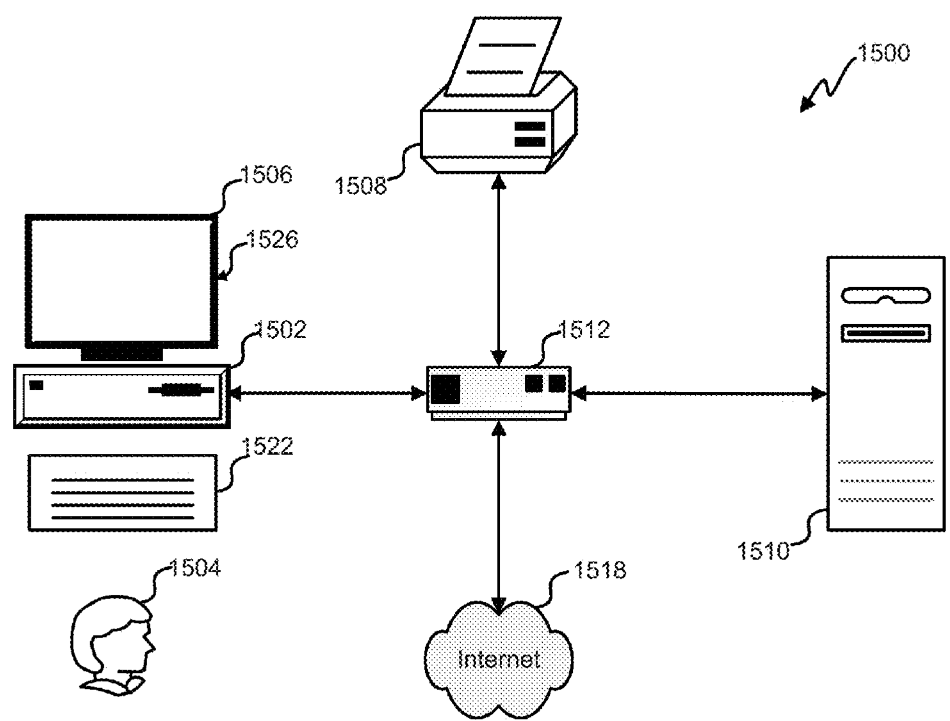
FIG. 15 illustrates a block diagram of an embodiment of a computer system.

Referring next to FIG. 15, an exemplary environment with which embodiments may be implemented is shown with a computer system 1500 that can be used by a user 1504 to remotely control, for example, one or more of the sensor-equipped smart-home devices according to one or more of the embodiments. The computer system 1510 can alternatively be used for carrying out one or more of the server-based processing paradigms described hereinabove, can be used as a processing device in a larger distributed virtualized computing scheme for carrying out the described processing paradigms, or for any of a variety of other purposes consistent with the present teachings. The computer system 1500 can include a computer 1502, keyboard 1522, a network router 1512, a printer 1508, and a monitor 1506. The monitor 1506, processor 1502 and keyboard 1522 are part of a computer system 1526, which can be a laptop computer, desktop computer, handheld computer, mainframe computer, etc. The monitor 1506 can be a CRT, flat screen, etc.

A user 1504 can input commands into the computer 1502 using various input devices, such as a mouse, keyboard 1522, track ball, touch screen, etc. If the computer system 1500 comprises a mainframe, a designer 1504 can access the computer 1502 using, for example, a terminal or terminal interface. Additionally, the computer system 1526 may be connected to a printer 1508 and a server 1510 using a network router 1512, which may connect to the Internet 1518 or a WAN.

The server 1510 may, for example, be used to store additional software programs and data. In one embodiment, software implementing the systems and methods described herein can be stored on a storage medium in the server 1510. Thus, the software can be run from the storage medium in the server 1510. In another embodiment, software implementing the systems and methods described herein can be stored on a storage medium in the computer 1502. Thus, the software can be run from the storage medium in the computer system 1526. Therefore, in this embodiment, the software can be used whether or not computer 1502 is connected to network router 1512. Printer 1508 may be connected directly to computer 1502, in which case, the computer system 1526 can print whether or not it is connected to network router 1512.

Figure 16:
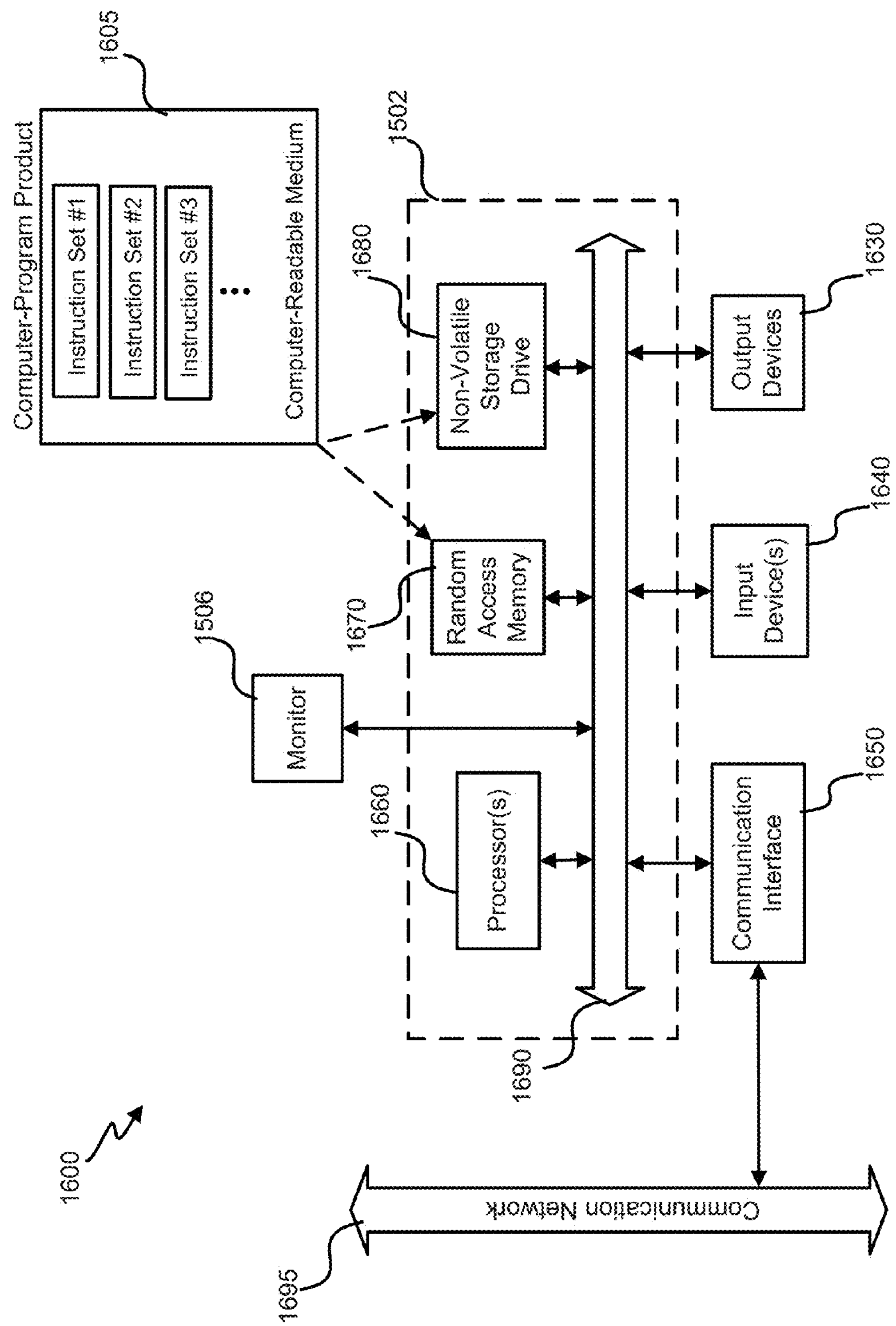
FIG. 16 illustrates a block diagram of an embodiment of a special-purpose computer.

With reference to FIG. 16, an embodiment of a special-purpose computer system 1600 is shown. For example, one or more of intelligent components 116, processing engine 306, feedback engine 500 and components thereof may be a special-purpose computer system 1600. The above methods may be implemented by computer-program products that direct a computer system to perform the actions of the above-described methods and components. Each such computer-program product may comprise sets of instructions (codes) embodied on a computer-readable medium that directs the processor of a computer system to perform corresponding actions. The instructions may be configured to run in sequential order, or in parallel (such as under different processing threads), or in a combination thereof. After loading the computer-program products on a general purpose computer system 1526, it is transformed into the special-purpose computer system 1600.

Special-purpose computer system 1600 comprises a computer 1502, a monitor 1506 coupled to computer 1502, one or more additional user output devices 1630 (optional) coupled to computer 1502, one or more user input devices 1640 (e.g., keyboard, mouse, track ball, touch screen) coupled to computer 1502, an optional communications interface 1650 coupled to computer 1502, a computer-program product 1605 stored in a tangible computer-readable memory in computer 1502. Computer-program product 1605 directs system 1600 to perform the above-described methods. Computer 1502 may include one or more processors 1660 that communicate with a number of peripheral devices via a bus subsystem 1690. These peripheral devices may include user output device(s) 1630, user input device(s) 1640, communications interface 1650, and a storage subsystem, such as random access memory (RAM) 1670 and non-volatile storage drive 1680 (e.g., disk drive, optical drive, solid state drive), which are forms of tangible computer-readable memory.

Computer-program product 1605 may be stored in non-volatile storage drive 1680 or another computer-readable medium accessible to computer 1502 and loaded into memory 1670. Each processor 1660 may comprise a microprocessor, such as a microprocessor from Intel® or Advanced Micro Devices, Inc.®, or the like. To support computer-program product 1605, the computer 1502 runs an operating system that handles the communications of product 1605 with the above-noted components, as well as the communications between the above-noted components in support of the computer-program product 1605. Exemplary operating systems include Windows® or the like from Microsoft Corporation, Solaris® from Sun Microsystems, LINUX, UNIX, and the like.

User input devices 1640 include all possible types of devices and mechanisms to input information to computer system 1502. These may include a keyboard, a keypad, a mouse, a scanner, a digital drawing pad, a touch screen incorporated into the display, audio input devices such as voice recognition systems, microphones, and other types of input devices. In various embodiments, user input devices 1640 are typically embodied as a computer mouse, a trackball, a track pad, a joystick, wireless remote, a drawing tablet, a voice command system. User input devices 1640 typically allow a user to select objects, icons, text and the like that appear on the monitor 1506 via a command such as a click of a button or the like. User output devices 1630 include all possible types of devices and mechanisms to output information from computer 1502. These may include a display (e.g., monitor 1506), printers, non-visual displays such as audio output devices, etc.

Communications interface 1650 provides an interface to other communication networks and devices and may serve as an interface to receive data from and transmit data to other systems, WANs and/or the Internet 1518. Embodiments of communications interface 1650 typically include an Ethernet card, a modem (telephone, satellite, cable, ISDN), a (asynchronous) digital subscriber line (DSL) unit, a FireWire® interface, a USB® interface, a wireless network adapter, and the like. For example, communications interface 1650 may be coupled to a computer network, to a FireWire® bus, or the like. In other embodiments, communications interface 1650 may be physically integrated on the motherboard of computer 1502, and/or may be a software program, or the like.

RAM 1670 and non-volatile storage drive 1680 are examples of tangible computer-readable media configured to store data such as computer-program product embodiments of the present invention, including executable computer code, human-readable code, or the like. Other types of tangible computer-readable media include floppy disks, removable hard disks, optical storage media such as CD-ROMs, DVDs, bar codes, semiconductor memories such as flash memories, read-only-memories (ROMs), battery-backed volatile memories, networked storage devices, and the like. RAM 1670 and non-volatile storage drive 1680 may be configured to store the basic programming and data constructs that provide the functionality of various embodiments of the present invention, as described above.

Software instruction sets that provide the functionality of the present invention may be stored in RAM 1670 and non-volatile storage drive 1680. These instruction sets or code may be executed by the processor(s) 1660. RAM 1670 and non-volatile storage drive 1680 may also provide a repository to store data and data structures used in accordance with the present invention. RAM 1670 and non-volatile storage drive 1680 may include a number of memories including a main random access memory (RAM) to store of instructions and data during program execution and a read-only memory (ROM) in which fixed instructions are stored. RAM 1670 and non-volatile storage drive 1680 may include a file storage subsystem providing persistent (non-volatile) storage of program and/or data files. RAM 1670 and non-volatile storage drive 1680 may also include removable storage systems, such as removable flash memory.

Bus subsystem 1690 provides a mechanism to allow the various components and subsystems of computer 1502 communicate with each other as intended. Although bus subsystem 1690 is shown schematically as a single bus, alternative embodiments of the bus subsystem may utilize multiple busses or communication paths within the computer 1502.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other storage mediums capable of storing that contain or carry instruction(s) and/or data.

EXAMPLES

Example 1

A thermostat is provided. Thermostat settings can be explicitly adjusted by a user or automatically learned (e.g., based on patterns of explicit adjustments, motion sensing or light detection). The thermostat wirelessly communicates with a central server, and the central server supports a real-time interface. A user can access the interface via a website or app (e.g., a smartphone app). Through the interface, the user can view device information and/or adjust settings. The user can also view device information and/or adjust settings using the device itself.

A feedback criterion indicates that a leaf icon is to be displayed to the user when the user adjusts a heating temperature to be two or more degrees cooler than a current scheduled setpoint temperature. A current scheduled setpoint temperature is 75 degrees F. Using a rotatable ring on the thermostat, a user adjusts the setpoint temperature to be 74 degrees F. No feedback is provided. The device nevertheless transmits the new setpoint temperature to the central server.

The next day, at nearly the same time of day, the user logs into a website configured to control the thermostat. The current scheduled setpoint temperature is again 75 degrees F. The user then adjusts the setpoint temperature to be 71 degrees F. The central server determines that the adjustment exceeds two degrees. Thus, a green leaf icon is presented via the interface. Further, the central server transmits the new setpoint temperature to the thermostat. The thermostat, also aware that the scheduled setpoint temperature was 75 degrees F., also determines that the adjustment exceeds two degrees and similarly displays a green leaf icon.

Example 2

A computer is provided. A user can control the computer's power state (e.g., on, off, hibernating, or sleeping), monitor brightness and whether accessories are connected to and drawing power from the computer. The computer monitors usage in five-minute intervals, such that the computer is "active" if it receives any user input or performs any substantive processing during the interval and "inactive" otherwise.

An efficiency variable is generated based on the power used by the computer during inactive periods. The variable scales from 0 to 1, with 1 being most energy conserving. A feedback criterion indicates that a positive reinforcement or reward icon is to be displayed each morning to the user when the variable is either about 0.9 or has improved by 10% relative to a past weekly average of the variable.

On Monday, a user is conscientious enough to turn off the computer when it is not in use. Thus, the variable exceeds 0.9 and a positive message is displayed to the user when the user powers on the computer on Tuesday morning.

Example 3

A vehicle component is provided that monitors acceleration patterns. A feedback criterion indicates that a harsh tone is to be provided if a user's cumulative absolute acceleration exceeds a threshold value during a two-minute interval. Two-minute intervals are evaluated every 15 seconds, such that the intervals overlap between evaluations. The criterion further indicates that a loudness of the tone is to increase as a function of how far the cumulative sum exceeds the threshold value.

The user encounters highway traffic and rapidly varies the vehicle's speed between 25 miles per hour and 70 miles per hour. He grows increasingly frustrated and drives increasingly recklessly. The tone is presented and becomes louder as he drives.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

While the principles of the disclosure have been described above in connection with specific apparatuses and methods, it is to be clearly understood that this description is made only by way of example and not as limitation on the scope of the disclosure.

What is claimed is:

1. A system for efficient HVAC control comprising:

an HVAC control device that is configured to control an HVAC system to condition an enclosure, the HVAC control device having a walk-up display that displays information to a user, the display including a first energy efficiency icon that is displayed in response to an on-device temperature change corresponding to an increased degree of responsible energy usage of the HVAC system in conditioning the enclosure, the first energy efficiency icon being displayed to present immediate feedback to the user about the responsible energy usage of the HVAC system;

said HVAC control device being remotely controllable by a mobile device having software that is configured to:

document an energy usage of the HVAC system for the enclosure during one or more historical periods; and display a second energy efficiency icon for a period of the one or more historical periods when the energy usage of the HVAC system for the period is representative of an environmentally responsible behavior in conditioning the enclosure;

wherein said first and second energy efficiency icons are substantially visually identical in order to positively reinforce to the user the environmentally responsible behavior in conditioning the enclosure.

2. The system of claim 1, wherein the software of the mobile device is further configured to display a real time control device that is operable to control the HVAC system to effect a temperature adjustment of the enclosure.

3. The system of claim 2, wherein the software of the mobile device is further configured to display a third energy efficiency icon in response to a temperature change effected via the real time control device when said temperature change is representative of an environmentally responsible behavior in conditioning the enclosure.

4. The system of claim 3, wherein the third energy efficiency icon is substantially visually identical to the first and second energy efficiency icons in order to positively reinforce the environmentally responsible behavior.

5. The system of claim 3, wherein the real time control device and the third energy efficiency icon that are displayed on the mobile device are substantially visually identical to the HVAC control device and the first energy efficiency icon.

6. The system of claim 1, wherein a visual representation of the first and second energy efficiency icons is adjustable to indicate a degree of responsible energy usage of the HVAC system in conditioning the enclosure.

7. The system of claim 6, wherein the visual representation of the first and second energy efficiency icons are brightened or faded to indicate the degree of responsible energy usage.

8. The system of claim 1, wherein the second energy efficiency icon is displayed on a schedule or calendar that is representative of the one or more historical periods.

9. A HVAC system comprising:

a control device that is configured to control the HVAC system in order to condition an enclosure, the control device having a display that displays a first energy efficiency icon in response to a temperature change initiated via the control device when the temperature change corresponds to an increased degree of responsible energy usage of the HVAC system in conditioning the enclosure, wherein the first energy efficiency icon is displayed to present immediate feedback about the responsible energy usage of the HVAC system;

said control device being remotely controllable by a mobile device having software that is configured to:

document an energy usage of the HVAC system for the enclosure during one or more historical periods; and display a second energy efficiency icon when the energy usage of the HVAC system for a period of the one or more historical periods is representative of an environmentally responsible behavior in conditioning the enclosure;

wherein said first and second energy efficiency icons are substantially visually identical in order to visually reinforce the environmentally responsible behavior in conditioning the enclosure.

10. The HVAC system of claim 9, wherein the software of the mobile device is further configured to display a real time control device that is operable to control the HVAC system to effect a temperature adjustment of the enclosure.

11. The HVAC system of claim 10, wherein the software of the mobile device is further configured to display a third energy efficiency icon in response to a temperature change effected via the real time control device when said temperature change is representative of an environmentally responsible behavior in conditioning the enclosure.

12. The HVAC system of claim 11, wherein the third energy efficiency icon is substantially visually identical to the first and second energy efficiency icons in order to positively reinforce the environmentally responsible behavior.

13. The HVAC system of claim 11, wherein the real time control device and the third energy efficiency icon that are displayed on the mobile device are substantially visually identical to the control device and the first energy efficiency icon.

14. The HVAC system of claim 9, wherein a visual representation of the first and second energy efficiency icons is adjustable to indicate a degree of responsible energy usage of the HVAC system in conditioning the enclosure.

15. The HVAC system of claim 14, wherein the visual representation of the first and second energy efficiency icons are brightened or faded to indicate the degree of responsible energy usage.

16. The HVAC system of claim 9, wherein the second energy efficiency icon is displayed on a schedule or calendar that is representative of the one or more historical periods.

17. A method of encouraging responsible energy usage of an HVAC system, the HVAC system being configured to condition an enclosure and the HVAC system including a control device having an input component and a display, the method comprising:

receiving a first input via the input component of the control device, the first input corresponding to a temperature adjustment of the HVAC system;

determining that said temperature adjustment of the HVAC system corresponds to an increased degree of responsible energy usage of the HVAC system in conditioning the enclosure;

displaying a first energy efficiency icon on the control device in response to said determination in order to present immediate feedback about the responsible energy usage of the HVAC system;

recording an energy usage of the HVAC system for the enclosure during one or more historical periods;

determining that the energy usage of the HVAC system for a period of the one or more historical periods is representative of an environmentally responsible behavior in conditioning the enclosure; and in response to said determination, displaying a second energy efficiency icon on a mobile device for the period to present feedback about the environmentally responsible behavior of the HVAC system for the period;

wherein said first and second energy efficiency icons are substantially visually identical in order to visually reinforce the environmentally responsible behavior in conditioning the enclosure.

18. The method of claim 17, further comprising displaying a real time control device on the mobile device, the real time control device being operable to control the HVAC system to effect a temperature adjustment of the enclosure.

19. The method of claim 18, further comprising displaying a third energy efficiency icon on the mobile device in response to a temperature change effected via the real time control device displayed on the mobile device when said temperature change is representative of an environmentally responsible behavior in conditioning the enclosure.

20. The method of claim 19, wherein the third energy efficiency icon is substantially visually identical to the first and second energy efficiency icons in order to positively reinforce the environmentally responsible behavior.

* * * * *